United States Patent
Hays et al.

(10) Patent No.: US 9,789,017 B2
(45) Date of Patent: Oct. 17, 2017

(54) CENTERLESS WHEEL ASSEMBLY

(71) Applicant: Orbis Wheels, Inc., Mill Valley, CA (US)

(72) Inventors: Marcus G. Hays, San Rafael, CA (US); Scott Streeter, Santa Rosa, CA (US); Gary Leo, Fairfax, CA (US); Richard Rice, Palm Springs, CA (US)

(73) Assignee: ORBIS WHEELS, INC., Mill Valley, CA (US)

( * ) Notice: Subject to any disclaimer, the term of this patent is extended or adjusted under 35 U.S.C. 154(b) by 0 days.

(21) Appl. No.: 15/146,729

(22) Filed: May 4, 2016

(65) Prior Publication Data

US 2016/0325585 A1    Nov. 10, 2016

Related U.S. Application Data

(60) Provisional application No. 62/179,357, filed on May 4, 2015.

(51) Int. Cl.
    *A63B 19/02*    (2006.01)
    *B60B 19/00*    (2006.01)
    (Continued)

(52) U.S. Cl.
    CPC .......... *A61G 5/045* (2013.01); *A61G 5/1054* (2016.11); *A61G 5/1089* (2016.11); *B60B 19/00* (2013.01);
    (Continued)

(58) Field of Classification Search
    CPC .......... A63B 19/02; B60B 19/00; B60B 3/048
    See application file for complete search history.

(56) References Cited

U.S. PATENT DOCUMENTS 1,819,924 A * 8/1931 Seppola ............... B60K 17/043
                                                    180/10
2,843,426 A   7/1958 Nojima
              (Continued)

FOREIGN PATENT DOCUMENTS

CN      102328680 A     1/2012

OTHER PUBLICATIONS

International Search Report dated Oct. 4, 2016 as received in Application No. PCT/US2016/030817.
(Continued)

*Primary Examiner* — Bryan Evans
(74) *Attorney, Agent, or Firm* — Maschoff Brennan

(57) ABSTRACT

The present disclosure may relate to a wheel that may include first and second exoskeleton plates. The wheel may also include first and second roller guide assemblies that each include one or more bearings, a roller guide coupled with the one or more bearings, and a shaft spanning the first and second exoskeleton plates and coupled with the roller guide such that the roller guide rotates around the shaft. The wheel may also include a tire and a centerless rim coupled with the tire. The centerless rim may be configured to have a shape that corresponds to a shape of the roller guide, and the roller guide may be configured to contact the centerless rim as the centerless rim rotates. The wheel may also include a first limiter to maintain contact between the centerless rim and the roller guide, and a second limiter.

26 Claims, 35 Drawing Sheets

(51) Int. Cl.
*A61G 5/04* (2013.01)
*B60B 21/12* (2006.01)
*B60K 7/00* (2006.01)
*B60B 21/02* (2006.01)
*B60L 3/00* (2006.01)
*A61G 5/10* (2006.01)

(52) U.S. Cl.
CPC .............. *B60B 21/02* (2013.01); *B60B 21/12* (2013.01); *B60K 7/00* (2013.01); *B60K 7/0007* (2013.01); *B60L 3/00* (2013.01); *A61G 5/04* (2013.01); *A61G 5/10* (2013.01); *A61G 2203/10* (2013.01); *B60K 2007/0046* (2013.01); *B60K 2007/0061* (2013.01); *B60Y 2200/84* (2013.01)

(56) References Cited

U.S. PATENT DOCUMENTS

| | | |
|---|---|---|
| 2,996,306 A | 8/1961 | Johnson |
| 3,329,444 A | 7/1967 | Lidov |
| 3,663,031 A | 5/1972 | Young |
| 4,163,567 A * | 8/1979 | Barber ................... A63B 19/02 180/218 |
| 5,248,019 A | 9/1993 | Sbarro |
| 5,419,619 A | 5/1995 | Lew |
| 5,826,674 A | 10/1998 | Taylor |
| 6,135,475 A | 10/2000 | Brown et al. |
| 6,224,080 B1 | 5/2001 | Ross |
| 6,705,630 B1 | 3/2004 | Karpman |
| 6,839,939 B2 | 1/2005 | Donakowski |
| 6,871,735 B2 * | 3/2005 | Kawai ................... F16D 41/067 192/38 |
| 7,014,272 B1 | 3/2006 | Williamson et al. |
| 7,426,970 B2 | 9/2008 | Olsen |
| 7,657,969 B2 | 2/2010 | Trivini |
| 7,980,568 B2 | 7/2011 | Chen |
| 8,113,524 B2 | 2/2012 | Karpman |
| 8,376,378 B2 | 2/2013 | Keel |
| 8,464,822 B2 | 6/2013 | Spector et al. |
| 8,523,212 B2 | 9/2013 | Ryan et al. |
| 8,746,383 B2 | 6/2014 | Basadzishvili |
| 2003/0085065 A1 | 5/2003 | Weisz |
| 2004/0036248 A1 | 2/2004 | Karpman |
| 2011/0074127 A1 | 3/2011 | Karpman |
| 2011/0181014 A1 | 7/2011 | Ryan et al. |
| 2011/0209938 A1 | 9/2011 | Basadzishvili |
| 2012/0175179 A1 | 7/2012 | Spector et al. |
| 2012/0299371 A1 | 11/2012 | Simula et al. |
| 2013/0087983 A1 | 4/2013 | Ngai |
| 2014/0058600 A1 | 2/2014 | Hoffmann et al. |
| 2016/0068056 A1 | 3/2016 | Burtov et al. |

OTHER PUBLICATIONS

Written Opinion of the International Searching Authority dated Oct. 4, 2016 as received in Application No. PCT/US2016/030817.
TW Office Action dated Mar. 16, 2017 as received in Application No. 105113865 (English Translation).

* cited by examiner

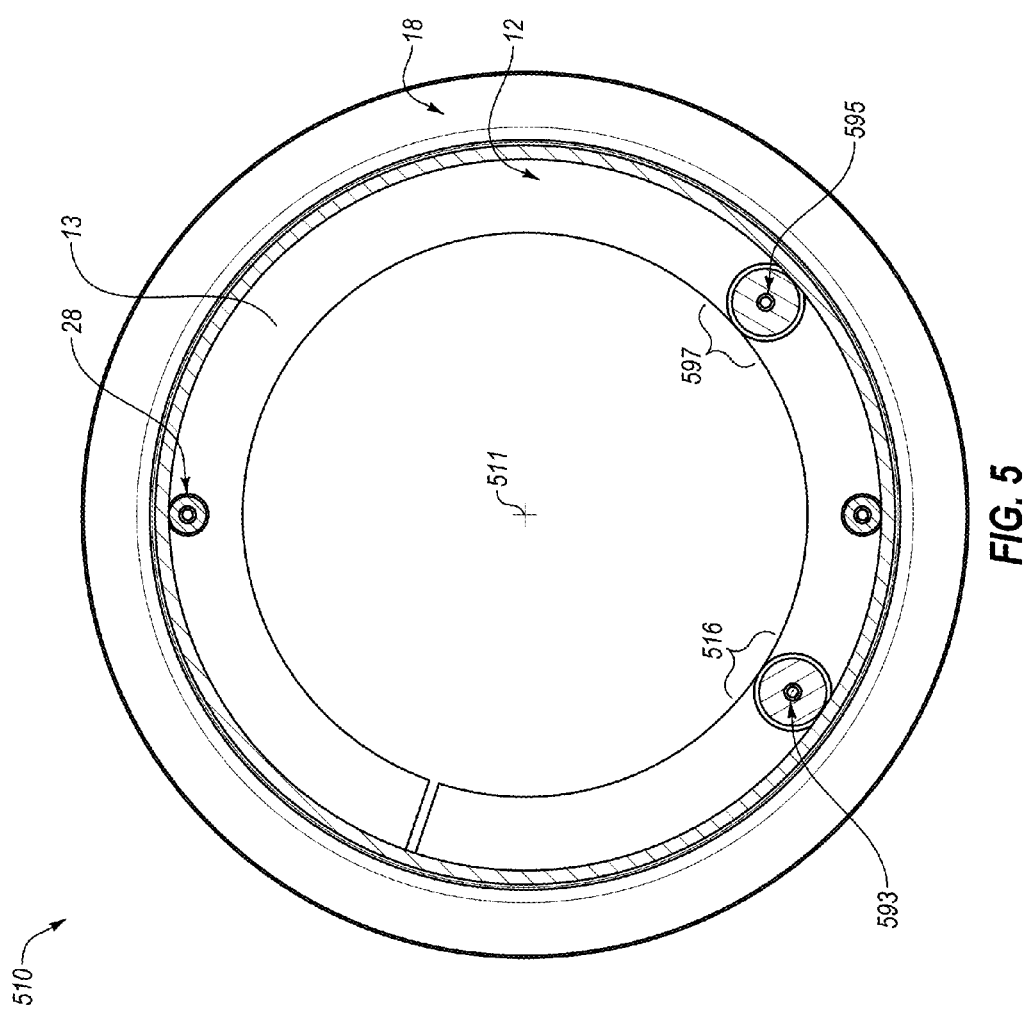

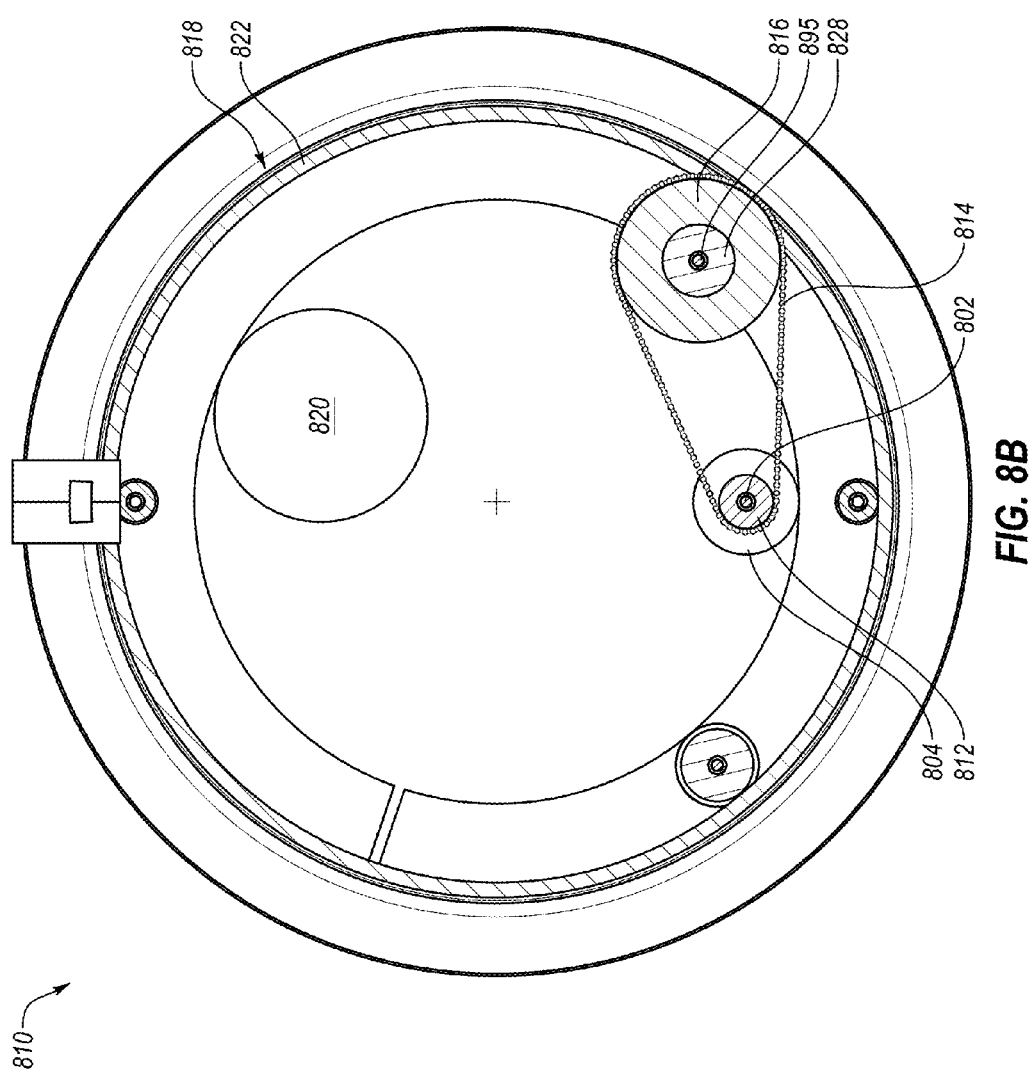

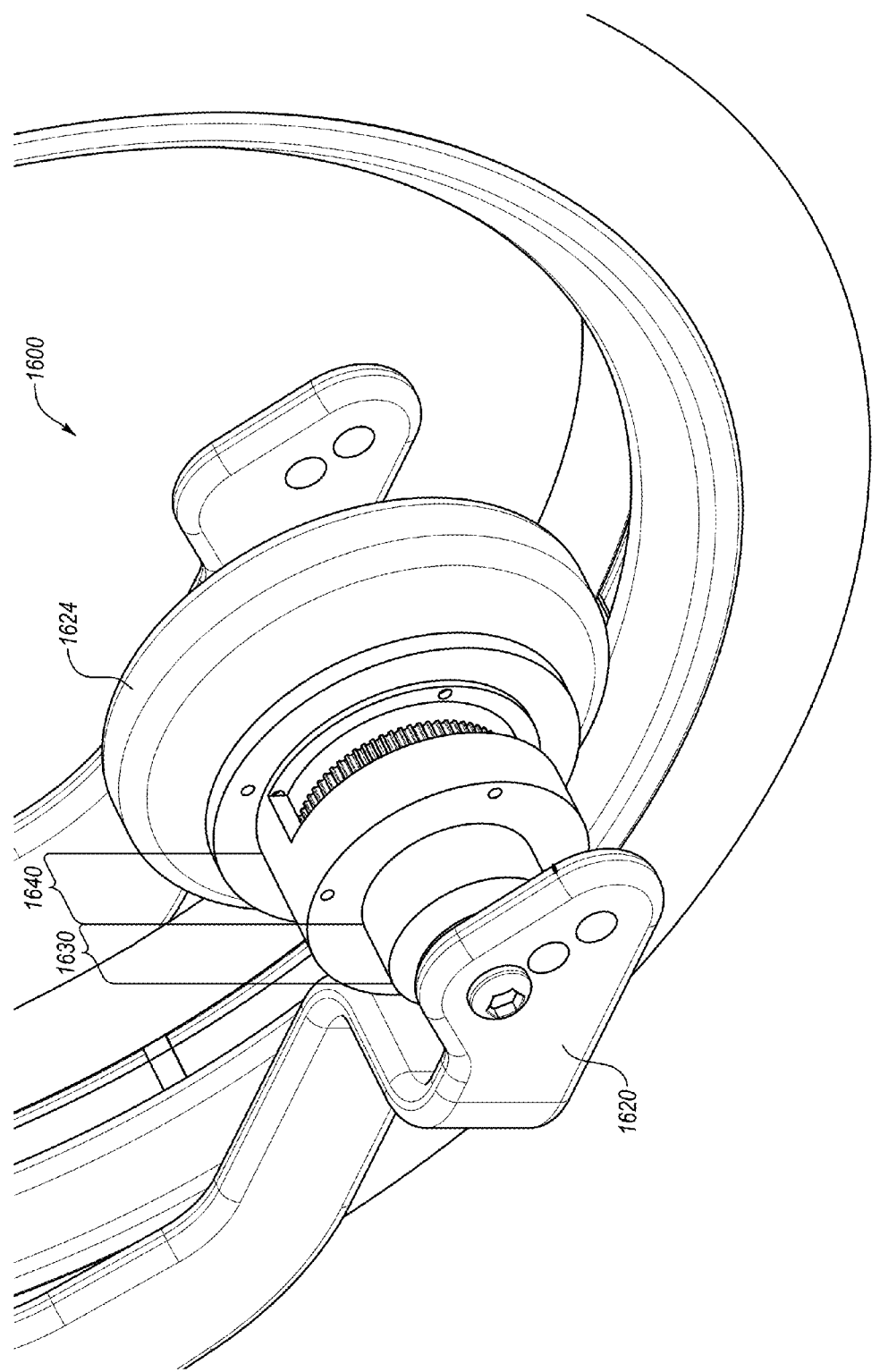

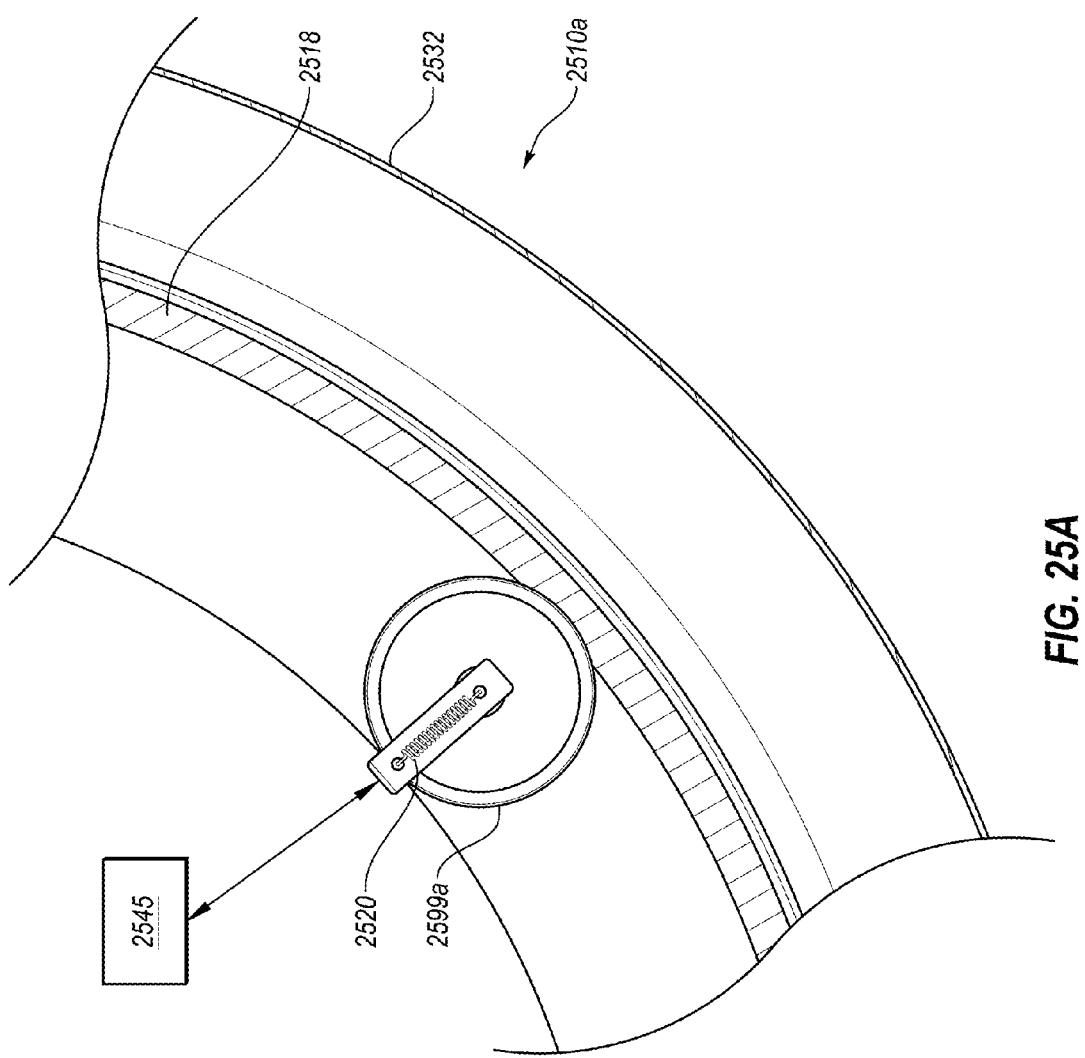

CENTERLESS WHEEL ASSEMBLY

CROSS-REFERENCE TO RELATED APPLICATION

This application claims the benefit of U.S. Provisional Application No. 62/179,357, filed on May 4, 2015, which is incorporated herein by reference in its entirety.

FIELD

The embodiments discussed in the present disclosure relate to a centerless wheel assembly.

BACKGROUND

Some wheels have spokes made of tensioned, adjustable metal wires, or some other connecting body between the edge and the middle of the wheel. The spokes may connect a rim of a particular wheel to a hub of the particular wheel and may help support an applied load. Wheels with tensioned spokes may be used in bicycles, wheelchairs, motorcycles, automobiles, and other vehicles.

The subject matter claimed in the present disclosure is not limited to embodiments that solve any disadvantages or that operate only in environments such as those described above. Rather, this background is only provided to illustrate one example technology area where some embodiments described may be practiced.

SUMMARY

One or more embodiments of the present disclosure may include a wheel assembly that may include first and second exoskeleton plates that are spaced apart and have generally circular configurations. The wheel assembly may also include a first roller guide assembly that includes a first set of bearings, a first roller guide coupled with the first set of bearings, and a first shaft spanning the first and second exoskeleton plates and coupled with the first roller guide such that the first shaft is an axle for the first roller guide and the first bearings facilitate rotation of the first roller guide about the first shaft. The wheel assembly may also include a second roller guide assembly that includes a second set of bearings, a second roller guide coupled with the second set of bearings, and a second shaft spanning the first and second exoskeleton plates and coupled with the second roller guide such that the second shaft is an axle for the second roller guide and the second bearings facilitate rotation of the second roller guide about the second shaft. The wheel assembly may additionally include a tire and a centerless rim coupled with the tire that may be configured to have a shape that corresponds to a shape of the first roller guide and the second roller guide, so that the first roller guide is configured to roll along the centerless rim as the centerless rim rotates. The wheel assembly may also include a first limiter coupled to the first and second exoskeleton plates and configured to cause the centerless rim and the first roller guide to maintain contact despite irregularities in the rim, and a second limiter coupled to the first and second exoskeleton plates.

The object and advantages of the present disclosure will be realized and achieved at least by the elements, features, and combinations particularly pointed out in the claims.

It is to be understood that both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 5 illustrates a diagram representing an example centerless wheel assembly;

FIG. 8B illustrates a diagram of the centerless wheel assembly of FIG. 8A;

FIG. 16 illustrates an exploded view of an example drive mechanism of a wheelchair;

FIG. 25A illustrates an example of a centerless wheel assembly able to invoke a corrective action;

DESCRIPTION OF EMBODIMENTS

Figure 1:
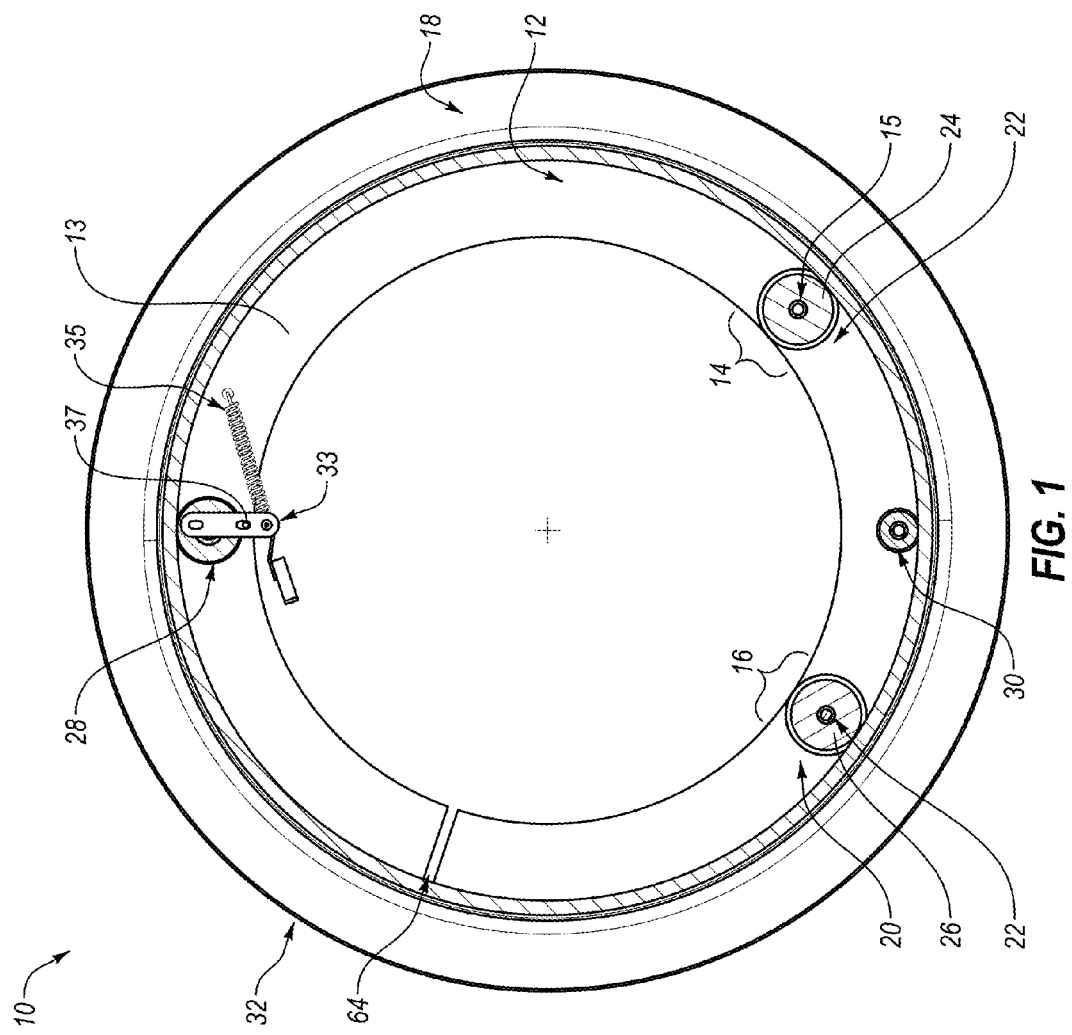
FIG. 1 illustrates a diagram representing an example centerless wheel assembly.

The present disclosure relates to a centerless wheel assembly. In some embodiments, such an assembly may include a tire configured to contact the ground and a centerless rim coupled to the tire such that rotation of the centerless rim also causes the tire to rotate. The centerless rim may have a void of material in the middle of the rim, although a point referred to as the "center" may be referenced for ease in discussing operation, relative positions, etc. of the present disclosure. In some embodiments, the centerless wheel assembly may also include a pair of generally circular exoskeleton plates located proximate the centerless rim and shaped such that the middle of the centerless wheel may be generally void of material. The exoskeleton plates may support one or more roller guide assemblies. The roller guide assemblies may include a bridging shaft that spans between the exoskeleton plates and functions as an axle for a roller guide of the roller guide assembly (e.g., by being fixed to each of the exoskeleton plates so the roller guide may rotate around the bridging shaft). The roller guide may be shaped and configured to roll along the centerless rim, either continually during use or under protective circumstances (e.g., when the centerless wheel assembly hits a pothole). In some embodiments, one or more of the roller guides may operate based on static friction between the roller guide and the centerless rim. For example, as the roller guide rotates, the rotation may in turn cause the centerless rim to rotate about the roller guide, thus, effectively rotating the tire about an axis through the center point of the centerless rim. In some embodiments, one or more roller guides may be caused to rotate via a manual drive (e.g., bicycle pedals) or through an engine or motor (e.g., an electric motor).

Some embodiments of centerless wheel assemblies described in the present disclosure may have one or more of the following advantages: simplicity, low weight, low cost, low rotational friction, stable thermal properties, aerodynamic, and improved gear efficiencies. Centerless wheel assemblies in accordance with one or more embodiments may be used on any number of vehicles or transportation devices, including, for example, vehicles with any number of wheels, self-propelled vehicles, manually powered vehicles, motorized vehicles, mobility-aiding vehicles, cars, wheelchairs, etc. The centerless wheel assembly may be used to transport people and/or goods.

In some embodiments, various roller guide assemblies may be referenced. Any roller guide provided with a motive force (e.g., from a motor, an engine, bike pedals, lever arms, etc.) may be referred to as a drive roller guide or a friction roller guide. In these and other embodiments, a drive roller guide may be shaped, positioned, and/or configured to drive a wheel. Additionally or alternatively, a roller guide that may not be provided with a motive force may be referred to as an idler roller guide or a limiter roller guide. In these and other embodiments, an idler roller guide may be shaped, positioned, and/or configured to roll along a rim of a wheel. In these and other embodiments, a limiter roller guide may be shaped, positioned, and/or configured to limit the limiter roller guide and/or other roller guides from coming off of the rim of the wheel assembly.

Some embodiments of the present disclosure relate to a wheelchair that may use centerless wheel assemblies as at least one of the wheels of a wheelchair. The wheelchair may also include a payload region (e.g., where a user of the wheelchair would ride) and a drive mechanism to drive at least one of the wheel assemblies. The drive mechanism may include one or more manually driving features (e.g., by hand-rails, or a lever mechanism), one or more powered driving features (e.g., an electric motor), or any combinations thereof.

Embodiments of the present disclosure are explained with reference to the accompanying drawings.

FIG. 1 illustrates a diagram of a wheel assembly 10, according to some embodiments. In some embodiments, the wheel assembly 10 may include an exoskeleton assembly 12, which may include one or more of the following: a first roller guide assembly 14, a second roller guide assembly 16, a centerless rim 18, a first exoskeleton plate 13, a second exoskeleton plate opposite the first exoskeleton plate 13 (not illustrated), a first limiter 28, a second limiter 30, and a first expansion bushing 64. The exoskeleton assembly 12 may be coupled to a tire 32. For example, the centerless rim 18 may be directly coupled to the tire 32 such that as the rim 18 is rotated, the tire 32 also rotates.

In some embodiments, the first roller guide assembly 14 may include a first bridging shaft 15 spanning between the first exoskeleton plate 13 and the second exoskeleton plate, and the first bridging shaft 15 may function as an axle for the first roller guide 24. The first roller guide 24 may roll along the rim 18. Additionally or alternatively, the second roller guide assembly 16 may include a second bridging shaft 17 that may be similar or identical to the first bridging shaft 15 of the first roller guide assembly 14.

In some embodiments, the first roller guide 24 may be made of any material that is able to roll along the centerless rim 18 due to static friction. For example, the material may be selected to provide wear resistance and sufficient friction to drive or otherwise roll along the centerless rim 18. For example, the first roller guide 24 (and any roller guide of the present disclosure) may be made of a polymer, such as polyurethane, poly vinyl chloride (PVC), acetal (homopolymer), acetal (copolymer), nylon 66, nylon 66 (with 30% glass), phenolic (glass filled), polyetherimide, polyethersulphone, polyimide, polyphenylenene sulfide, polysulfone, polytetrafluoroethylene (PTFE) (e.g., Teflon®), polyethylene (including ultra-high molecular weight (UHMW)), carbon fiber, aluminum, titanium, polyoxymethylene (e.g., Delrin®), etc.

In some embodiments, the first roller guide assembly 14 may include one or more first bearings 20 and/or the second roller guide assembly 16 may include one or more second bearings 22. In some embodiments, the first bearings 20 may be rotatably disposed within the first roller guide assembly 14 and/or the second bearings 22 may be rotatably disposed within the second roller guide assembly 16. For example, the first bearings 20 may facilitate or otherwise make easier or more efficient the rotation of the first roller guide 24 about the first bridging shaft 15.

In some embodiments, the first and second bridging shafts 15, 17 may be coupled with the first exoskeleton plate 13 and the second exoskeleton plate. In some embodiments, the first exoskeleton plate 13 and the second exoskeleton plate may be spaced apart, and the first and second bridging shafts 15, 17 may each form a bridge across a gap between the first exoskeleton plate 13 and the second exoskeleton plate. For example, any of the first roller guide assembly 14, the second roller guide assembly 16, the first limiter 28 and the second limiter 30 may be disposed within the gap between the first exoskeleton plate 13 and the second exoskeleton plate. In some embodiments, the first and second exoskeleton plates may correspond to right-hand and left-hand exoskeleton plates. In some embodiments, the first bearings 20 and/or the second bearings 22 may be disposed within a circumference of the centerless rim 18.

In some embodiments, an angle between the first bearings 20 and the second bearings 22 and/or the first roller guide assembly 14 and the second roller guide assembly 16 may be between approximately ten degrees (10°) and one hundred and forty degrees) (140°) with respect to a center 11 of the rim 18. In some embodiments, the angle may be between zero degrees (0°) and three hundred and sixty degrees (360°), or may be placed at any of a variety of locations around the wheel assembly 10. In these and other embodiments, the location of the first roller guide assembly 14 and the second roller guide assembly 16 may be symmetrical. Stated another way, if the wheel assembly 10 were analogized to a clock face, the angle between the first roller guide assembly 16 and the second roller guide assembly 14 may distribute forces acting on the wheel assembly 10 at a six o'clock position. For example, if the first roller guide assembly 14 and the second roller guide assembly 16 were located at a five o'clock and seven o'clock positions, the forces would be distributed to be balanced at the six o'clock position where the wheel assembly 10 contacts the ground. The angle between the first roller guide assembly 14 and the second roller guide assembly 16 may also reduce rotational friction and/or facilitate withstanding of extreme G-forces, such as, for example, 5 g, by the centerless rim 18 when the wheel assembly 10 is dropped from a height and/or experiences an external load.

In some embodiments, the first roller guide 24 and/or the second roller guide 26 may be configured to include a shape or profile that matches a corresponding shape or profile of the rim 18. For example, the rim 18 may be completely void of material in the middle of the centerless rim 18 and the first roller guide 24 and/or the second roller guide 26 may be disposed within the void of material. In some embodiments, the first roller guide 24 and/or the second roller guide 26 may contact the rim 18. In some embodiments, the first roller guide 24 and/or the second roller guide 26 may be configured to act upon and guide the rim 18 as the rim 18 rotates around the first roller guide assembly 14 and/or the second roller guide assembly 16. In some embodiments, the first and second roller guides 24, 26 may be coupled with the first bearings 20 and the second bearings 22, respectively, and may be rotatably disposed about the first and second bridging shafts 15, 17, respectively.

In some embodiments, each of the first exoskeleton plate 13 and the second exoskeleton plate may have a generally circular configuration, and may include a void in material through a central region. Additionally or alternatively, the exoskeleton plates may be a solid sheet of material (including square or rectangular sheets of material), tubular, or any other shape or form such that the roller guides are supported proximate the centerless rim. In some embodiments, each of the first and second exoskeleton plates may have a lip about an outer circumference or outer edge. In some embodiments, the rim 18 may be retained between the first and second exoskeleton plates as the rim 18 rotates about the first and/or second roller guide assemblies 14, 16. In some embodiments, the exoskeleton plate 13 may span the rim and function as both the first exoskeleton plate 13 and the second exoskeleton plates (an example of such an embodiment is illustrated in FIG. 6C). In these and other embodiments, the exoskeleton plate 13 may be constructed of a single piece of material that supports both ends of a bridging shaft.

In some instances, such as when a pothole, debris, or another roadway imperfection is struck by the wheel assembly 10, one or more of the following may be subject to side-loading and/or forces: the wheel assembly 10, the exoskeleton assembly 12, and the rim 18. In some embodiments, when the side-loading and/or the forces are experienced, the rim 18 may remain in a constant or near constant state of alignment with respect to the exoskeleton assembly 12 such that oscillation and/or rotational friction is reduced.

In some embodiments, the rim 18 may be spaced apart from one or more of the following components by a distance: the first exoskeleton plate 13, the second exoskeleton plate, the first limiter 28, the second limiter 30, and/or the first expansion bushing 64. The distance may include any amount, for example, one, two, three, four, five, ten, fifteen, etc. thousandths of an inch. Further, the distances between the rim 18 and different components may be different.

In some embodiments, in response to the wheel assembly 10 becoming airborne, the rim 18 may descend such that the rim 18 may contact and/or may no longer be spaced apart from one or more of the roller guide assemblies and/or one or more of the limiters (e.g., the first roller guide 14, the second roller guide 16, the first limiter 28, and/or the second limiter 30). In these and other embodiments, the first limiter 28 and/or the second limiter 30 may prevent the rim 18 from becoming separated and/or dislodged from the exoskeleton assembly 12 in response to, for example, the wheel assembly 10 becoming airborne. For example, as the wheel assembly 10 becomes airborne such that the ground no longer exerts a force on the wheel assembly 10, a spring force may cause the first and/or the second limiter 28, 30 to contact the rim 18. Additionally or alternatively, as the wheel assembly 10 becomes airborne, gravity may cause the rim 18 to drop, but only far enough to contact one of the limiters, thus, only changing position as far as the gap between the rim 18 and the limiters.

In some embodiments, one or more of the limiters may be configured to cause the first roller assembly 14 to maintain contact with the rim 18. For example, a limiter may be disposed upon a spring loaded lever arm such that as the position of the rim 18 is changed relative to the first and second exoskeleton plates (e.g., due to irregularities in the centerless rim 18 or the tire 32), the limiter on the lever arm may engage the rim 18 so that the rim 18 maintains contact with the first roller guide 14. As another example, the limiter may be positioned very close to the rim 18 such that if the rim 18 moves such that the rim 18 may no longer be in contact with the first roller guide 14, the rim 18 may contact the limiter and be maintained in contact with the first roller guide 14. In some embodiments, the limiters may include a roller that may be similarly shaped to engage with the rim 18. In these and other embodiments, the limiters may include a roller guide that may be driven.

In some embodiments, the rim 18 and/or the tire 32 may be non-uniformly circular. For example, the rim 18 and/or the wheel may expand or contract or otherwise change shape due to variations in temperature or other weather conditions, or may be non-uniformly circular due to manufacturing errors, imperfections that may result in dynamic run out, or eccentricity caused by damage in various states of utilization. Expansion or contraction of the rim 18 may cause the rim 18 and/or the wheel assembly 10 to take on an irregular or eccentric shape. In some embodiments, in response to the rim 18 being subjected to an external or internal load and/or in response to the rim 18 expanding or contracting, the wheel assembly 10 may operate in a reasonably predictable manner with respect to rotational friction, tracking, alignment, and braking performance due to one or more of the following: the first limiter 28, the second limiter 30, and the first expansion bushing 64. For example, the first expansion bushing 64 may allow contraction or expansion of the first exoskeleton plate 13 and/or the second exoskeleton plate while still maintaining a desired shape or maintaining one or more of the roller guide assemblies relative to the centerless rim 18. For example, the expansion busing 64 may include rubber or other compressible material disposed in a gap of the first exoskeleton plate 13 and/or the second exoskeleton plate such that a certain amount of change in shape or size may occur in a controlled manner. As another example, the expansion bushing 64 may include a metal material at a gap in the first exoskeleton plate 13 and/or the second exoskeleton plate such that as the exoskeleton plates experience variations in size a target orientation between the first roller guide 14 and the rim 18 may be maintained. As another example, the first limiter 28 and/or the second limiter 30 may provide multiple points of contact or potential contact with the rim 18 such that even in a non-uniformly circular shape, one or more of the roller guides maintains contact with the rim. As another example, the first limiter 28 and/or the second limiter 30 may be spring loaded such that as the rim 18 or another element of the wheel assembly 10 departs from a uniformly circular shape, that departure is compensated for by the flexibility in movement provided by the spring force while also maintaining contact with the rim 18.

In some embodiments, the expansion bushing 64 may be include in place of the first and/or the second limiters 28, 30. Additionally or alternatively, the expansion bushing 64 may be included in addition to the first and/or the second limiters 28, 30.

In some embodiments, the first and/or the second limiter 28, 30 may be sized and/or disposed such that during normal operation, the rim 18 may not be in physical contact with the first and/or the second limiter 28, 30. In these and other embodiments, when the rim 18 and/or the tire 32 departs from a generally uniformly circular shape (e.g., due to hitting a pothole), at least one of the first and/or the second limiter 28, 30 may be in physical contact with the rim 18.

In some embodiments, the first limiter 28 and/or the second limiter 30 may prevent damage to the rim 18 when the wheel assembly 10 is exposed to harsh environments, impacts, uneven road surfaces, drop offs, forces, and other conditions that may otherwise cause damage to the rim 18. In these and other embodiments, the first limiter 28 and/or the second limiters 30 may be spaced apart from an interior circumference or edge of the rim 18 by a gap. For example, there may be a gap of approximately at least one, two, three, four, five, ten, fifteen, etc. thousandths of an inch. The gap may be reduced or eliminated in response to the exoskeleton assembly 12 experiencing a drop from an elevation and/or a compression due to a great force or impact such as, for example, an abrupt or sudden stop. The first limiter 28 and/or the second limiter 30 may contact the rim 18 in response to the drop and/or the compression, which may mitigate effects of the drop and/or the compression.

In some embodiments, the wheel assembly 10 may include any number of roller guide assemblies disposed at various positions with respect to the exoskeleton assembly 12, which may be identical or similar to the first and second roller guide assemblies 20, 22 and/or the first and second limiters 28, 30. For example, in some embodiments the exoskeleton assembly 12 may include at least three roller guides or limiters. In some embodiments, the first limiter 28 and/or the second limiter 30 may include a roller guide assembly similar or identical to the first roller guide assembly 14. Additionally or alternatively, the first limiter 28 and/or the second limiter 30 may include a bridging shaft, but one or more other components of the first roller guide assembly 14 may be absent.

In some embodiments, the wheel assembly 10 may include at least four roller guides (e.g., the first and second roller guide assemblies 20, 22 and the first and second limiters 28, 30). Such an embodiment of four roller guides may be advantageous over three roller guides for a variety of reasons. For example, in a number of experiments it has been found that the roller guides are more likely to derail or otherwise become disconnected from the rim when three roller guides are used instead of four roller guides. Such a result has particularly been seen in embodiments in which the wheels are side by side, such as a wheelchair, automobile, skateboard, etc.

In some embodiments, the wheel assembly 10 may include the limiter 28 disposed on a lever arm 33. In these and other embodiments, the lever arm 33 may operate as a quick release mechanism to allow the centerless rim 18 and the tire 32 to be disengaged from the remainder of the wheel assembly 10 in a simple and easy manner. For example, the lever arm 33 may be coupled to a spring 35 that may bias the limiter 28 towards the centerless rim 18. The limiter 28 may keep the centerless rim 18 in consistent contact with the limiter 28 and/or the other roller guides due to the spring force of the spring 35. In some embodiments, as the lever arm 33 is rotated about a pivot point 37 (for example, by pulling or pushing the handle on the lever arm 33), the limiter 28 may be pulled away from the centerless rim 18. After moving the limiter 28 away from the centerless rim 18, the centerless rim 18 and the tire 32 may be pulled away or drop away from the other components of the wheel assembly 10 (e.g., from the exoskeleton plates and the roller guides).

In these and other embodiments, one or more roller guides may be used to drive the wheel assembly 10, for example, a roller guide at a six o'clock position. There may be two idler roller guides, for example, between a nine o'clock position and the six o'clock position roller guides. In these and other embodiments, the roller guides may be at different locations between the nine o'clock/three o'clock positions and the twelve o'clock position. However, in such an embodiment lever arm 33 may not release the tire 32 and centerless rim 18 from the roller guides and exoskeleton plates as the roller guides above the nine o'clock/three o'clock position may maintain the connection between the roller guides and the centerless rim 18.

In some embodiments, one or more of the bridging shafts may be secured to the first exoskeleton plate 13 and the second exoskeleton plate using any suitable securing mechanisms, such as, for example, snap rings, threaded ends with nuts, quick-release levers with springs, etc. In some embodiments, the securing mechanisms may be disposed at outboard ends of the bridging shaft at least proximate the first and second exoskeleton plates. In some embodiments, removal of the securing mechanisms may allow the rim 18 to drop from the exoskeleton assembly 12 for speedy removal of the rim 18 and tire 32, which may facilitate replacement and/or repair of the rim 18 and/or the tire 32.

In some embodiments, the first exoskeleton plate 13 and/or the second exoskeleton plate may be spaced apart from a first side and a second side of the rim 18, respectively, such that there is a small gap between an interior surface of the first exoskeleton plate 13 and the first side of the rim 18 and the second exoskeleton plate and the second side of the rim 18. For example, there may be a gap of approximately at least one, two, three, four, five, ten, fifteen, etc. thousandths of an inch. In some embodiments, the first and second sides of the rim 18 may be vertical and/or may correspond to right and left sides of the rim 18, respectively.

In these and other embodiments, the rim 18 may be disposed proximate and between the first exoskeleton plate 13 and the second exoskeleton plate without touching the first or second exoskeleton plates. For example, the first exoskeleton plate 13 may be disposed exterior to the first side of the rim 18, and the second exoskeleton plate may be disposed exterior to the second side of the rim 18. In these and other embodiments, in normal rotation, the rim 18 may not contact the first or the second exoskeleton plates. Additionally or alternatively, in response to the rim 18 being subjected to a force that is counter to a direction of travel, the first and second exoskeleton plates may physically constrain the rim 18 such that the first side of the rim 18 may contact the first exoskeleton plate 13 and/or the second side of the rim 18 may contact the second exoskeleton plate. In these and other embodiments, in response to the rim 18 being subjected to a force that is counter to a direction of travel, a gap between the first exoskeleton plate 13 and the first side of the rim 18 and/or a gap between the second exoskeleton plate and the second side of the rim 18 may be reduced and/or eliminated. Thus, in some embodiments, the first and/or second exoskeleton plates may prevent the rim 18 from deviating from a desired direction of travel by more than the size of the gap (e.g., five thousandths of an inch in either a left-hand or right-hand direction).

In some embodiments, the wheel assembly 10 may be configured to mitigate rotational friction by having only two points of contact with the rim 18. The points of contact may occur at the first roller guide assembly 14 and the second roller guide assembly 16. In these and other embodiments, the first and/or second limiters 28, 30 may provide additional points of contact in certain circumstances, such as in response to extreme forces, such as the drop, the compression, etc., and may otherwise not be in physical contact with the rim 18 during normal operation of the wheel assembly 10.

In some embodiments, the lips of the first and second exoskeleton plates may include a low-friction coating disposed on an inner surface of a portion of the corresponding lip closest to the rim 18. The low-friction coating may reduce rotational friction and/or noise from any contact between the first and second exoskeleton plates and the rim 18 (e.g., when the rim 18 departs from normal operation and scuffs against one of the exoskeleton plates).

Modifications, additions, or omissions may be made to FIG. 1 without departing from the scope of the present disclosure. For example, the wheel assembly 10 may include more or fewer elements than those illustrated and described in the present disclosure. For example, the wheel assembly 10 may include any number of roller guide assemblies disposed at various locations around the exoskeleton assembly 12. As another example, the exoskeleton plates may take any shape or form that provides the functionality described in the present disclosure. For example, a square or rectangular plate without a void in the middle may be utilized in the wheel assembly 10.

Figure 2:
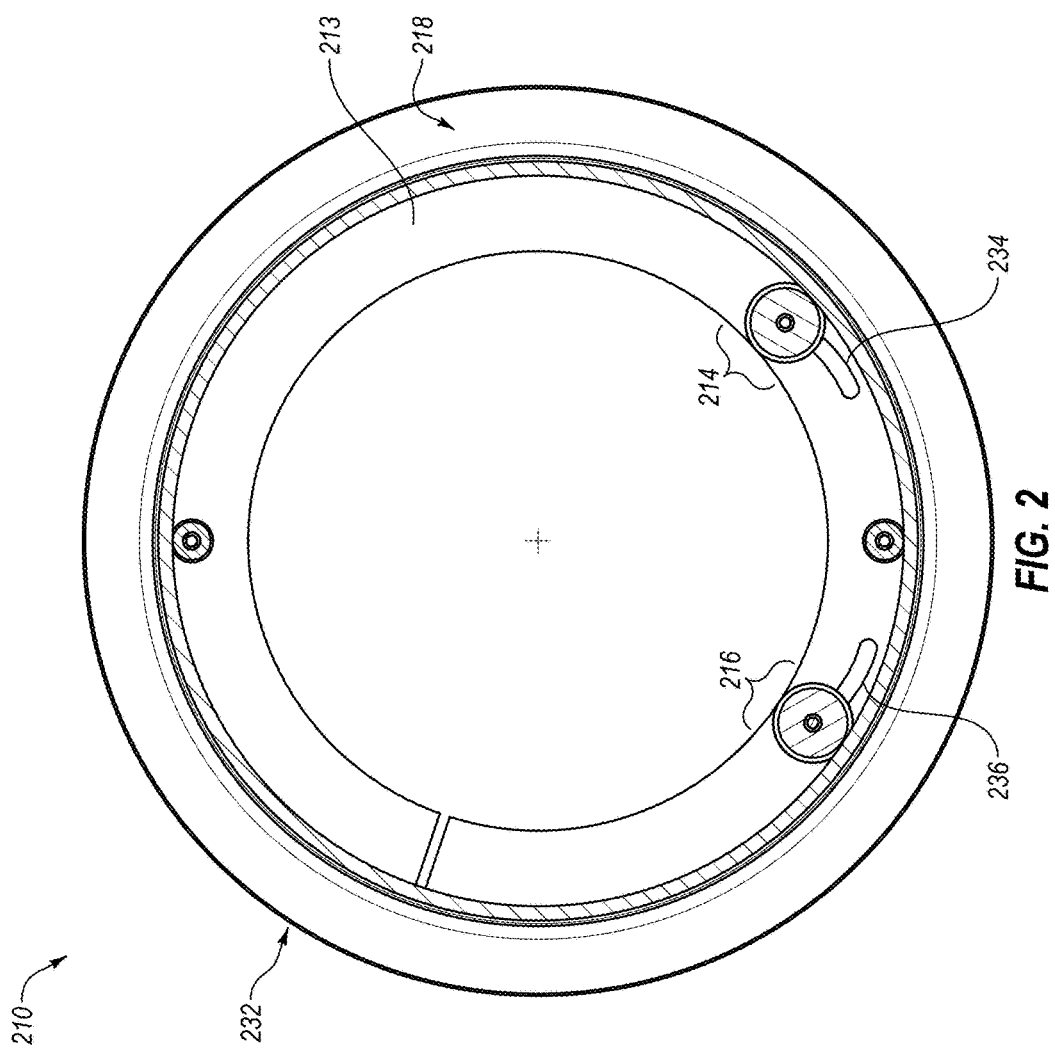
FIG. 2 illustrates a diagram representing an example centerless wheel assembly with slots.

FIG. 2 illustrates an example embodiment of a wheel assembly 210 with one or more slots for one or more of the roller guide assemblies and/or limiters. The wheel assembly 210 may be similar or analogous to the wheel assembly 10 of FIG. 1. In some embodiments, the relative position of roller guide assemblies associated with the one or more slots may be adjusted by selectively moving the roller guide assemblies within the slots. In some embodiments, the wheel assembly 210 may include a centerless rim 218 (which may be similar or analogous to the rim 18 of FIG. 1), a first roller guide assembly 214 (which may be similar or analogous to the first roller guide 14 of FIG. 1), and a second roller guide assembly 216 (which may be similar or analogous to the second roller guide 16 of FIG. 1).

As illustrated, in some embodiments a first exoskeleton plate 213 (which may be similar or analogous to the exoskeleton plate 13 of FIG. 1) may include one or more slots. For example, in the illustrated example, the first exoskeleton plate 213 may include a first slot 234 that may correspond to the first roller guide assembly 214 and may include a second slot 236 that may correspond to the second roller guide assembly 216). The second exoskeleton plate (not illustrated) may include one or more slots aligned with the one or more slots of the first exoskeleton plate 213. In these and other embodiments, the corresponding slots of the first exoskeleton plate 213 may be sized and configured to be identical or similar in size, shape, and/or orientation to corresponding slots in the second exoskeleton plate.

In some embodiments, the first roller guide assembly 214 may be disposed within the first slot 234 of the first exoskeleton plate and/or the second roller guide assembly 216 may be disposed within the second slot 236 of the first exoskeleton plate 213. For example, a first end of the first bridging shaft of the first roller guide assembly 214 may be disposed within the first slot 234 and/or a first end of the second bridging shaft of the second roller guide assembly 216 may be disposed within the second slot 236. In some embodiments, a second end of the first bridging shaft may be disposed within a slot corresponding to the first slot 234 in the second exoskeleton plate. In these and other embodiments, the second end of the second bridging shaft may be disposed within a slot corresponding to the second slot 236 in the second exoskeleton plate.

In some embodiments, the first slot 234 and/or the second slot 236 may be configured generally in an arc shape. The first roller guide assembly 214 may be configured to selectively move within the first slot 234 and/or the second roller guide assembly 16 may be configured to selectively move within the second slot 236. Adjusting a position of the first and/or the second roller guide assembly 214, 216 within the slots 234, 236, and within corresponding slots in the second exoskeleton plate, may change an angle between the roller guide assemblies 214, 216 with respect to a center of the wheel assembly 210. For example, by moving the first roller guide assembly 214 within the first slot 234 and/or a slot corresponding to the first slot 234 in the second exoskeleton plate, and by moving the second roller guide assembly 216 within the second slot 236 and a slot corresponding to the second slot 36 in the second exoskeleton plate, the angle between the first roller guide assembly 214 and the second roller guide assembly 216 may be adjusted to anywhere between approximately ten degrees (10°) and one hundred and forty degrees (140°) with respect to a center 211 of the wheel assembly 210. In some embodiments, the position of the first roller guide assembly 214 in the first slot 234 and the position of the second roller guide assembly 216 in the second slot 236 may be adjusted symmetrically. For example, if the first roller guide assembly 214 is moved within the first slot 234 away from a six o'clock position (e.g., analogizing the centerless wheel assembly 210 to a clock face), the second roller guide assembly 216 may be moved within the second slot 236 approximately an equal distance away from the six o'clock position. Such a symmetrical adjustment may balance the forces at the six o'clock position. Additionally or alternatively, the adjustment may be non-symmetrical.

In some embodiments, the first and second roller assemblies 214, 216 may be disposed in proximity or at a distance by virtue of the first and second roller assemblies 214, 216 being situated in the first and second slots 234, 236, respectively, and in corresponding slots in the second exoskeleton plate. In some embodiments, the first exoskeleton plate 213 may include markings at least proximate the first slot 234 and/or the second slot 236 and/or the second exoskeleton plate may include markings at least proximate a slot corresponding to the first slot 234 and/or a slot corresponding to the second slot 236, which may aid in positioning the first and/or second roller assemblies 214, 216.

In some embodiments, the first and/or second roller assemblies 214, 216 may be positioned within the first slot 234 and/or the second slot 236 based on the intended use of the wheel assembly 210. For example, if the wheel assembly 210 is to be used in a low speed vehicle or a low speed setting (e.g., less than ten miles per hour), the first and second roller assemblies 214, 216 may be disposed closer together. As another example, if the wheel assembly 210 is to be used in a high speed vehicle or a high speed setting (e.g., greater than ten miles per hour), the first and second roller guide assemblies 214, 216 may be disposed further apart.

In some embodiments, the rim 218 may be rotatably disposed about the first and second roller guides 214, 216, which may have shapes corresponding to a shape or profile of the rim 18. Longitudinal and/or angular adjustments of the first and second roller assemblies 214, 216 within the first and second slot 234, 236, respectively, may be based on, for example, rim diameters, dynamic run-out, or rim imperfections, which may decrease static friction between the first and second roller guides of the first and second roller guide assemblies 214, 216 and the rim 218. Longitudinal and/or angular adjustments of the first and/or second roller guide assemblies 214, 216 within the slots 234, 236, and slots corresponding to the slots 234, 236 in the second exoskeleton plate, may reduce scrubbing, which may occur, for example, when a cornering load or braking forces are applied to the rim 218 by braking devices and/or an external payload. For example, adjusting the first and/or the second roller guide assemblies 214, 216 within the slots 234, 236 and slots corresponding to the slots 234, 236 in the second exoskeleton plate may place the roller guide assemblies 214, 216 closer to the six o'clock position of the rim 218, creating a better rolling connection and thus reducing shifting of the rim 218. Also, adjustment of positions of the first and second roller assemblies 214, 216 within the first and second slot 234, 236, respectively, may allow the wheel assembly 210 to withstand shocks and/or impacts greater than a conventional spoked wheel may withstand because of the increased support from the first exoskeleton plate 213 and the second exoskeleton plate and/or because the forces are distributed across a wider area than a conventional wheel.

In some embodiments, one end of a bridging shaft may be moved within a slot (e.g., the first slot 234) without adjusting the other end of the bridging shaft. Such a movement may create a different angle or elevation of the bridging shaft. By doing so, a scrubbing angle may be modified when used in a side-by-side wheel vehicle or assembly. For example, in a side-by-side assembly with negative camber or when a side-by-side assembly is pivoted about the point where the wheel assembly 210 touches the ground, vectoring forces may dislodge one or more of the roller guide assemblies (e.g., the first and/or second roller guide assemblies 214, 216) from the rim 218. By adjusting the angle or elevation of the bridging shaft, the roller guide assemblies may maintain contact with the rim even if subjected to such vectoring forces.

Modifications, additions, or omissions may be made to FIG. 2 without departing from the scope of the present disclosure. For example, the wheel assembly 210 may include more or fewer elements than those illustrated and described in the present disclosure. For example, the wheel assembly 210 may include any number of roller guide assemblies disposed at various locations around the exoskeleton assembly. As another example, any number of the roller guide assemblies may have an associated set of slots, including only one set of slots. As an additional example, the slots may take any shape, size or configuration (e.g., a straight or angled line rather than an arc shape).

Figure 3:
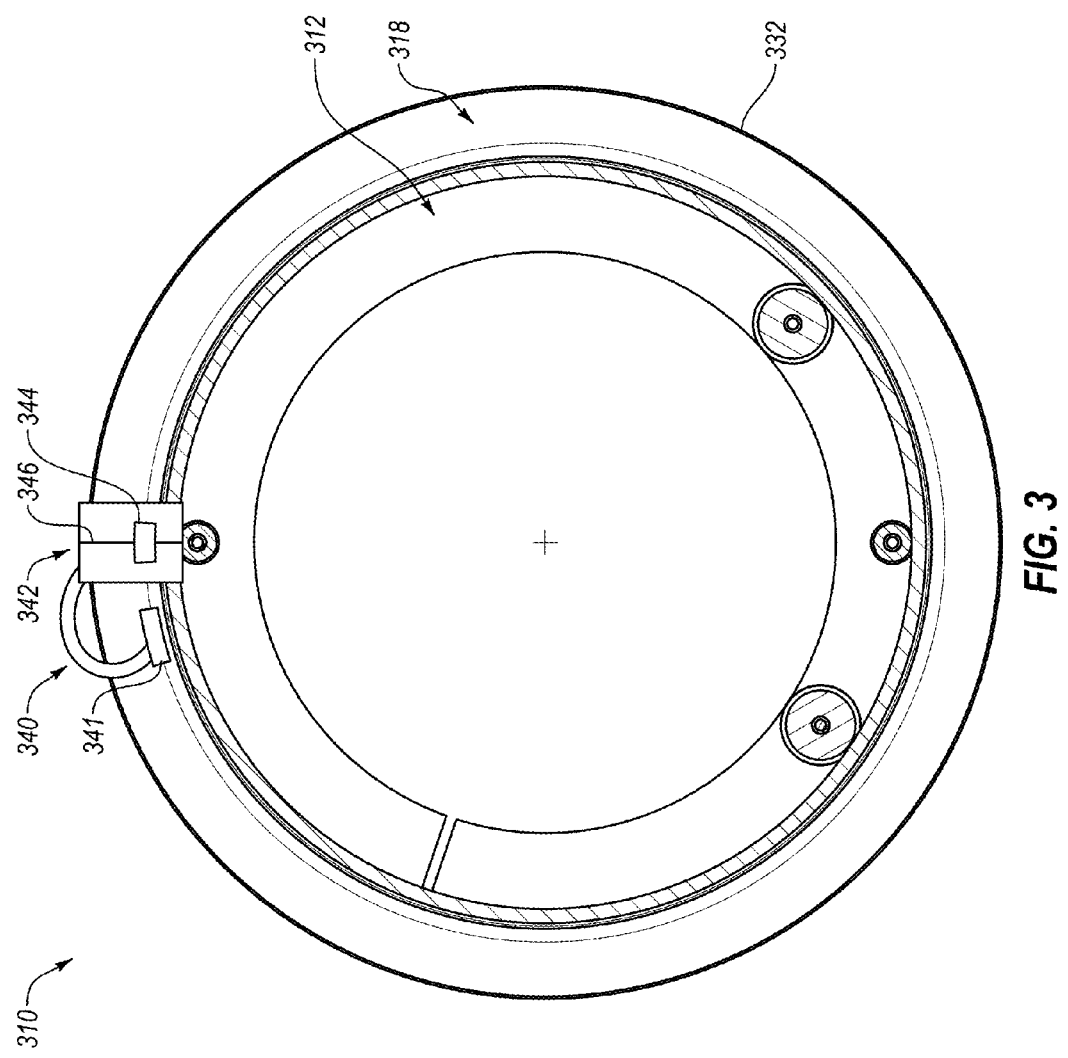
FIG. 3 illustrates a diagram representing an example centerless wheel assembly with an example rim-braking mechanism.

FIG. 3 illustrates an example embodiment of a wheel assembly 310 (which may be similar to the wheel assembly 10 and/or 210 of FIGS. 1 and/or 2) with a rim-braking mechanism 340. The rim-braking mechanism 340 may include brake shoes 341, and may be disposed at least proximate the first and second exoskeleton plates. For example, the rim-braking mechanism 340 may operate similar to a traditional bicycle rim brake with a pad attached to the brake shoes 341 that may contact a centerless rim 318 (which may be similar or analogous to the centerless rim 18 of FIG. 1), slowing down the rim 318 and thus braking the tire 332.

In some embodiments, one or more stabilizer structures may be coupled with portions of a first exoskeleton plate 313 (which may be similar or analogous to the first exoskeleton plate 13 of FIG. 1) and a second exoskeleton plate (not illustrated in FIG. 3). For example, a first stabilizer structure 342, including a first stabilizer wheel 344 that rotates about a first stabilizer shaft 346, and a second stabilizer structure (not illustrated in FIG. 3), including a second stabilizer wheel that rotates about a second stabilizer shaft, may be coupled with an outer portion of the first and second exoskeleton plate, respectively. In some embodiments, the stabilizer wheels (e.g., the first stabilizer wheel 344) may be horizontal and/or the stabilizer shafts (e.g., the first stabilizer shaft 346) may be vertical. When cornering forces are exerted on an exoskeleton assembly 312 (which may be similar or analogous to the exoskeleton assembly 12 of FIG. 1) and/or the rim 318, the first stabilizer wheel 344 and/or the second stabilizer wheel may contact the rim 318 and oscillation, vibration, and/or displacement of the rim 318 may decrease.

In some embodiments, the first stabilizer wheel 344 and/or the second stabilizer wheel may be spaced apart from the first and second side of the centerless rim 318, respectively, by a gap. For example, there may be a gap of approximately at least one, two, three, four, five, ten, fifteen, etc. thousandths of an inch. When the cornering forces are exerted on the exoskeleton assembly 312 and/or the rim 18, such as when striking a pothole or when stopping abruptly, for example, the gap between the first stabilizer wheel 344 and the first side of the rim 318 and/or the gap between the second stabilizer wheel and the second side of the rim 318 may be reduced or eliminated. When in physical contact with the rim 318, the first stabilizer wheel 344 and/or the second stabilizer wheel may be shaped, disposed, and/or configured to roll along the rim 318 without slipping based on static friction. In some embodiments, there may be slipping between the first and/or second stabilizer wheels and the rim 318.

Modifications, additions, or omissions may be made to FIG. 3 without departing from the scope of the present disclosure. For example, the wheel assembly 310 may include more or fewer elements than those illustrated and described in the present disclosure. For example, the wheel assembly 310 may include any number of roller guide assemblies disposed at various locations around the exoskeleton assembly. As another example, any number of the roller guide assemblies may have an associated set of slots, including only one set of slots. As an additional example, the slots may take any shape, size or configuration (e.g., a straight or angled line rather than an arc shape).

Figure 4:
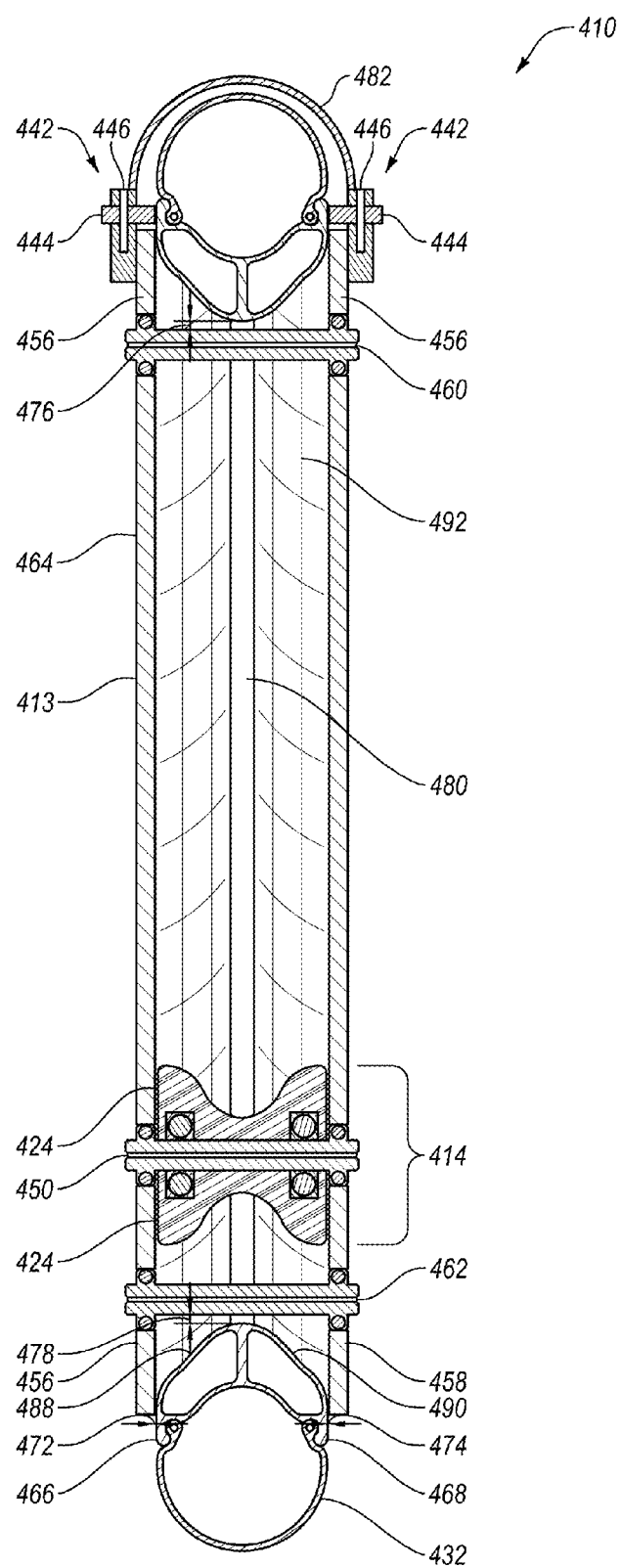
FIG. 4 illustrates a cutaway view of an example centerless wheel assembly.

FIG. 4 illustrates a cutaway view of a wheel assembly 410 (which may be similar to the wheel assembly 10, 210, and/or 310 of FIGS. 1, 2, and/or 3). In some embodiments, the wheel assembly 410 may include a centerless rim 418 and a tire 432 (which may be similar or analogous to the centerless rim 18 and the tire 32 of FIG. 1), a first roller guide assembly 414 with a first roller guide 424 and a first bridging shaft 415 (which may be similar or analogous to the first roller guide assembly 14, first roller guide 24, and first bridging shaft 15 of FIG. 1), an exoskeleton assembly 412 with a first exoskeleton plate 413 (which may be similar or analogous to the exoskeleton assembly 12 and the first exoskeleton plate 13 of FIG. 1. In some embodiments, the first roller guide assembly 414 may include one or more first primary bearings 448, which may be configured to rotate about the first bridging shaft 415. In some embodiments, the first bridging shaft 415 may be coupled with the first exoskeleton plate 413 and the second exoskeleton plate 454.

As illustrated in FIG. 4, in some embodiments, the first roller guide assembly 414 may also include a first roller guide 424 configured to include a shape or profile that matches a corresponding shape or profile of the rim 418. In some embodiments, the first roller guide 424 may include a concave shape that corresponds to a convex shape of the rim 418.

In some embodiments, the first exoskeleton plate 413 may include a distal portion 456 about an outer circumference or outer edge of the first exoskeleton plate 413. Similarly, in some embodiments, the second exoskeleton plate 454 may include a distal portion 458 about an outer circumference or outer edge of the second exoskeleton plate 454. In some embodiments, the distal portions 456, 458 may be disposed further from the center of the wheel assembly 410 than one or more of the following: the first bridging shaft 450, the second bridging shaft (not illustrated in FIG. 4), the third bridging shaft 460, and the fourth bridging shaft 462. In some embodiments, the wheel assembly 410 may include a first limiter including a third bridging shaft 460 and a second limiter including a fourth bridging shaft 462. In some embodiments, the first limiter may include a roller guide assembly with one or more bearings (not illustrated in FIG. 4), a roller guide (not illustrated in FIG. 4), etc. In these and other embodiments, the second limiter may be implemented in a similar or identical manner to the first limiter, or implemented in a different manner.

In some embodiments, the rim 418 may be spaced apart from one or more of the following by a gap: the distal portions 456, 458 of the first and second exoskeleton plates 452, 454, the first limiter, the third bridging shaft 460, the fourth bridging shaft 462, and/or an expansion bushing 464 (which may be similar or analogous to the expansion bushing 64 of FIG. 1). For example, there may be a gap of approximately at least one, two, three, four, five, ten, fifteen, etc. thousandths of an inch. For example, a first side 466 of the rim 18 may be spaced apart from the distal portion 456 of the first exoskeleton plate 413 by a first gap 472 and/or a second side 468 of the centerless rim 418 may be spaced apart from the distal portion 459 of the second exoskeleton plate 454 by a second gap 474. In these and other embodiments, the first gap 472 and the second gap 474 may be the same, or may be different. As another example, the third and fourth bridging shafts 460, 462 or roller guides coupled with the third and fourth bridging shafts 460, 462 may each be spaced apart from an interior circumference or centerline 480 of the rim 418 by a third gap 476 and a fourth gap 478, respectively. In these and other embodiments, the third gap 476 and the fourth gap 478 may be the same, or may be different. One or more of the third and fourth gaps 476, 478 may be reduced or eliminated in response to the exoskeleton assembly 412 experiencing a drop from an elevation and/or a compression due to a great force or impact such as, for example, an abrupt or sudden stop. The third and fourth bridging shafts 460, 462 or roller guides coupled with the third and fourth bridging shafts 460, 462 may contact the centerline 480 of the centerless rim 418 in response to the drop and/or the compression, which may mitigate effects of the drop and/or the compression.

As illustrated in FIG. 4, in some embodiments, the exoskeleton assembly 412 may include a connecting hoop 482, which may join the first and second exoskeleton plates 413, 454 and/or the first and second stabilizer structures 442, 489 (which may be similar or analogous to the first stabilizer structure 42 of FIG. 3). In some embodiments, the connecting hoop 482 may bridge the tire 432. In some embodiments, the connecting hoop 482 may be disposed at an upper portion or top of the centerless wheel assembly 410. For example, the centerless wheel assembly 410 may contact the ground at one-hundred and eighty degrees (e.g., a six o'clock position), while the connecting hoop 482 may be disposed at zero degrees (e.g., a twelve o'clock position). The connecting hoop 482 may provide added structural support for a first stabilizer wheel 444 (which may be similar or analogous to the first stabilizer wheel 44 of FIG. 3) and the second stabilizer wheel 484. In some embodiments, the centerless rim 418 may be sized and/or configured to fit between the first and second exoskeleton plates 413, 454, the first and second exoskeleton pates 413, 454 constraining the centerless rim 418 and/or acting as a track or guide for the centerless rim 418.

In some embodiments, the first stabilizer wheel 444 and the second stabilizer wheel 484 may rotate with respect to the first stabilizer shaft 446 and the second stabilizer shaft 486 (which may be similar or analogous to the first stabilizer shaft 46 of FIG. 3), respectively. In some embodiments, the first and second stabilizer shafts 446, 486 and the first and second stabilizer wheels 444, 484 may be supported by first and second stabilizer structures 442, 489. In response to oscillation of the rim 418, and the rim 418 contacting the first stabilizer wheel 444 and/or the second stabilizer wheel 484, the first stabilizer wheel 444 and/or the second stabilizer wheel 484 may rotate to minimize rotational friction and/or may prevent or inhibit the rim 418 from oscillating by more than a width of a gap between the stabilizer wheels 444, 484 and the rim 418. For example, the rim 418 may oscillate by no more than five-thousandths of an inch to either side due to contact with the stabilizer wheels 444, 484 in some embodiments. Oscillation of the centerless rim 418 may occur, for example, when the tire 432 strikes or impacts a fixed object and/or an obstruction. Horizontal deflection of the centerless rim 418 by the stabilizer wheels 444, 484 in response to oscillation of the centerless rim 418 may facilitate predictable tracking of the tire 432 and may reduce rotational friction.

In some embodiments, the first roller guide 424 may be configured to include a shape or profile that matches a corresponding shape or profile of the centerless rim 418, which may reduce rotational friction and/or scrubbing. In some embodiments, the shape or profile of the roller guide 424 may be based on an intended use of the wheel assembly 410. For example, if used in a side-by-side wheel configuration, forces are different than for an in-line wheel configuration. In a side-by-side configuration, the roller guide 424 may have a spherical shape. By using a spherical shape, as cambering, wheel speed, adjusting bridging shafts in slots, etc. change the orientation of the roller guide 424 with the rim 418, the roller guide 424 may maintain contact with the rim 418. Such a shape may allow for other mitigation of scrubbing or other vectoring forces while maintaining contact between the roller guide 424 and the rim 418. As another example, by having the first roller guide 424 match a profile of the centerless rim 418, the surface area in contact between the first roller guide 424 and the centerless rim 418 may be maximized, decreasing the likelihood of slipping by matching torque requirements.

In some embodiments, the centerless rim 418 may slope downward to either side of the centerline 480. In some embodiments, a first sloped portion 488 may be disposed at least proximate the first side 466 of the centerless rim 418 and/or a second sloped portion 490 may be disposed at least proximate the second side 468 of the centerless rim 418.

In some embodiments, the centerless rim 418 may be oriented vertically with respect to the ground. In some embodiments, the centerless rim 418 may include one or more longitudinal or angular grooves 492 disposed along the sloped portions 488, 490 and/or the sides 466, 468 of the centerless rim 418. For example, the grooves 492 may be in relief on the surface of the centerless rim 418. The grooves 492 may facilitate removal of water, grime, debris, and/or foreign material from the centerless rim 418, which may increase static friction between surfaces of the first and second roller guides and the centerless rim 418. For example, due to gravitational and/or centrifugal forces, water, grime, debris, and/or other foreign material may gravitate to the grooves 492 and along the grooves 492 towards an edge of the centerless rim 418 and off of the centerless rim 418.

In some embodiments, the exoskeleton assembly 412 may additionally include cladding that may provide a covering over any moving parts to increase aerodynamics, for example by reducing turbulence, drag, air resistance, wind resistance, etc. For example, a smooth form factor cladding may overlay the first and second exoskeleton plates 413, 454 to enclose any moving parts (e.g., the roller guide assembly 414). In some embodiments, the cladding may also include a void in material about the middle of the centerless wheel assembly 410. In some embodiments, the grooves 492 may be included the cladding. In these and other embodiments, the cladding and the first and second exoskeleton plates 413, 454 may be combined into a single piece of material to further reduce weight and improve aerodynamics, turbulence, drag, air resistance, wind resistance, etc. For example, in some embodiments (e.g., as illustrated in FIG. 6C), the first and second exoskeleton plates 413, 454 and/or the cladding may form a generally U-shaped profile. As another example, the first and second exoskeleton plates 413, 454 and/or the cladding may form an asymmetrical shape (e.g., with the leading and trailing edges aerodynamically optimized). In these and other embodiments, the increased performance in aerodynamics may offset performance tradeoffs due to a friction-based drive system, For example, at speeds above twenty miles per hour, the increased aerodynamic performance due to the lack of spokes and the U-shaped profile may overcome any observed performance loss due to friction.

Modifications, additions, or omissions may be made to FIG. 4 without departing from the scope of the present disclosure. For example, the centerless wheel assembly 410 may include more or fewer elements than those illustrated and described in the present disclosure.

FIG. 5 illustrates a diagram representing an example wheel assembly 510 (which may be similar to the wheel assembly 10, 210, 310, and/or 410 of FIGS. 1, 2, 3, and/or 4). For example, as illustrated in FIG. 5, one or more of the roller guide assemblies may be a drive friction roller guide assembly, such as a first friction roller guide assembly 597. Such a friction roller guide assembly may be shaped, sized, and/or configured to be in constant or near constant physical contact with a centerless rim 518 (which may be similar or analogous to the centerless rim 18 of FIG. 1) such that the friction roller guide assembly may roll along the rim 518. For example, if the first friction roller guide assembly 597 is caused to rotate (e.g., by a motor or other motive force), static friction between the first friction roller guide assembly 597 and the rim 518 may cause the rim 518 to rotate.

In some embodiments, the first friction roller guide assembly 597 may include a driven shaft with keys that allow the rim 518 to be driven by the first friction roller guide assembly 597. For example, a first bridging driven shaft 595 of the first friction roller guide assembly 597 may have keys, teeth, or other features to engage or otherwise lock a roller guide of the first friction roller guide assembly 597 to the first bridging driven shaft 595. Using the keys, teeth, or other features, when the first bridging driven shaft 595 is rotated, the corresponding roller guide may also rotate.

In some embodiments a torque may be applied to the first bridging driven shaft 595, for example, by a motor, crank, or other motive force. In response to the torque being applied to the first bridging driven shaft 595, the first friction roller guide assembly 597 may rotate the rim 518 by virtue of static friction between the first friction roller guide assembly 597 and the rim 518. Thus, the rim 518 may function as both an output gear and a driven wheel. In some embodiments, the first friction roller guide assembly 597 may have a small diameter compared to a diameter of the rim 518, allowing a high gear ratio. The high gear ratio may offer a mechanical advantage over conventional wheels and/or conventional power transmission models and may improve efficiency, reduce weight, and/or reduce cost. In some embodiments, such a high gear ratio may include a ratio of between approximately seven to one and approximately one hundred and twenty-five to one. In these and other embodiments, the gear ratio may be based on the intended use of the wheel assembly. Additionally or alternatively, the gear ratio may be based on a size of the wheel, which may be limited in size based on the application. For example, a vehicle may be limited in wheel size to the expected height of the vehicle, etc. In some embodiments a planetary gear may be used, for example, by being coupled to the first bridging driven shaft 595.

In some embodiments, the wheel assembly 510 may be configured to have an open center or a void of material in the center of the wheel assembly 510, which may provide a storage region with spatial capacity for storage of any of a variety of items such as a mechanized drive, cargo, fuel tanks, motors, engines, battery packs, luggage, an electricity storage system, etc.

In some embodiments, a second bridging shaft 593 of a second roller assembly (which may be similar to the second roller guide assembly 16 of FIG. 1) may be non-symmetrically disposed relative to the first bridging driven shaft 595 about a center 511 of the wheel assembly 510. For example, the second bridging shaft 593 may be disposed slightly higher than the first bridging driven shaft 595. For example, the second bridging shaft 593 may be disposed one, two, three, four, five, ten, fifteen, twenty, etc. thousandths of an inch above the first bridging driven shaft 595. In some embodiments, compression of the first friction roller guide assembly 597 may occur when the exoskeleton assembly 512 is pushed downward against the rim 518 in response to a payload being exerted on the exoskeleton assembly 512 (e.g., a person getting on a bicycle with centerless wheels), and the rim 518 is pushed upward by a countering force of the ground. The compression may cause the height between the first bridging driven shaft 595 and a center of the second bridging shaft 593 to close to zero and may cause that a high static friction be produced between the first friction roller guide assembly 97 and the rim 518.

In some embodiments, an angle between the first friction roller guide assembly 597 and the second roller guide assembly 516 may be different than when not using a drive roller guide assembly. For example, in some embodiments, the angle between the first friction roller guide assembly 597 and the second roller guide assembly 516 may be between approximately sixty degrees and one hundred and forty degrees. The angle may also include an angle between ten degrees and one hundred and forty degrees.

Modifications, additions, or omissions may be made to FIG. 5 without departing from the scope of the present disclosure. For example, the centerless wheel assembly 510 may include more or fewer elements than those illustrated and described in the present disclosure. For example, the centerless wheel assembly 510 may include any number of drive and/or friction roller guide assemblies disposed at various locations around the exoskeleton assembly 512. As another example, the centerless wheel assembly 510 may include any motor, engine, crank, etc. which may provide torque to the first bridging driven shaft 595.

Figure 6A:
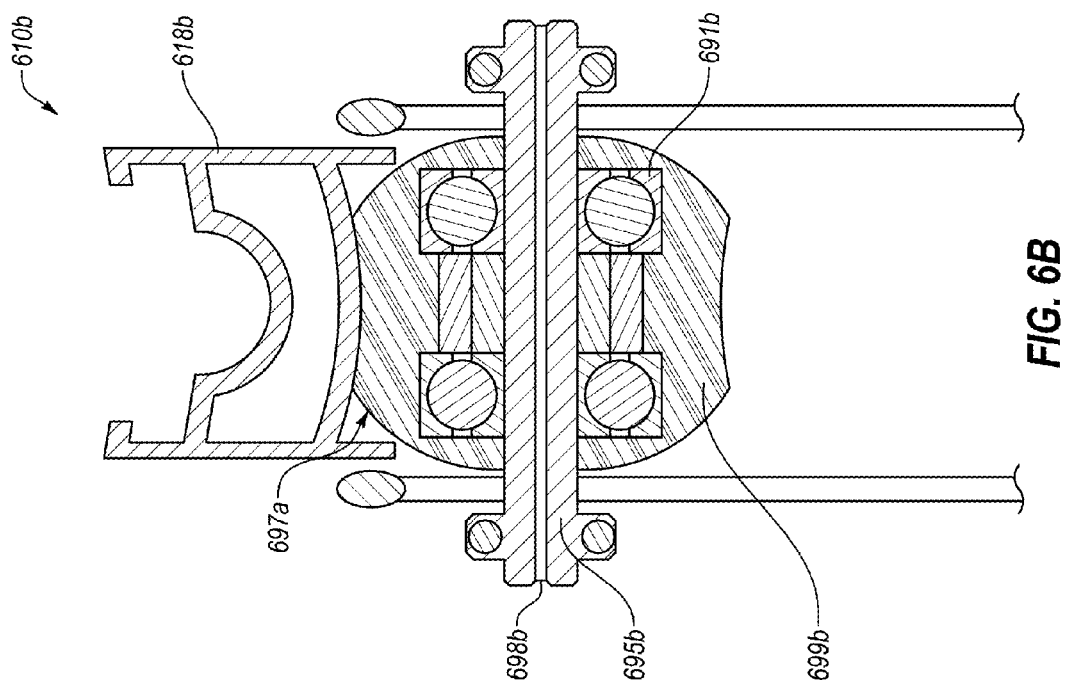
FIG. 6A illustrates a cross-sectional view of an example centerless wheel assembly.
Figure 6B:
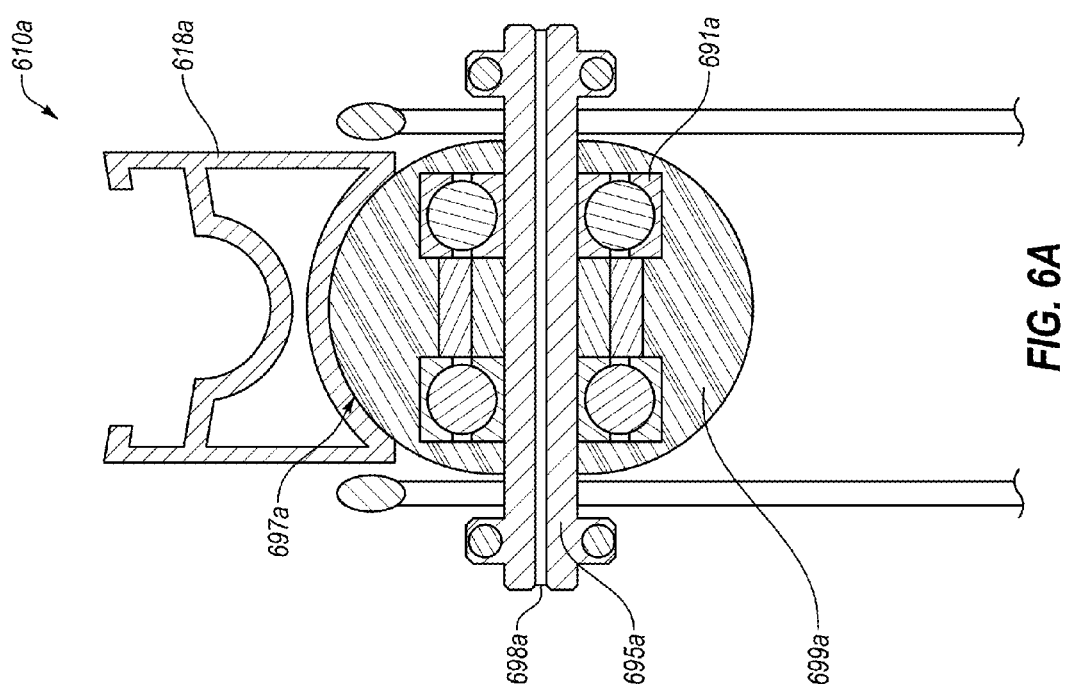
FIG. 6B illustrates a cross-sectional view of another example centerless wheel assembly.
Figure 6C:
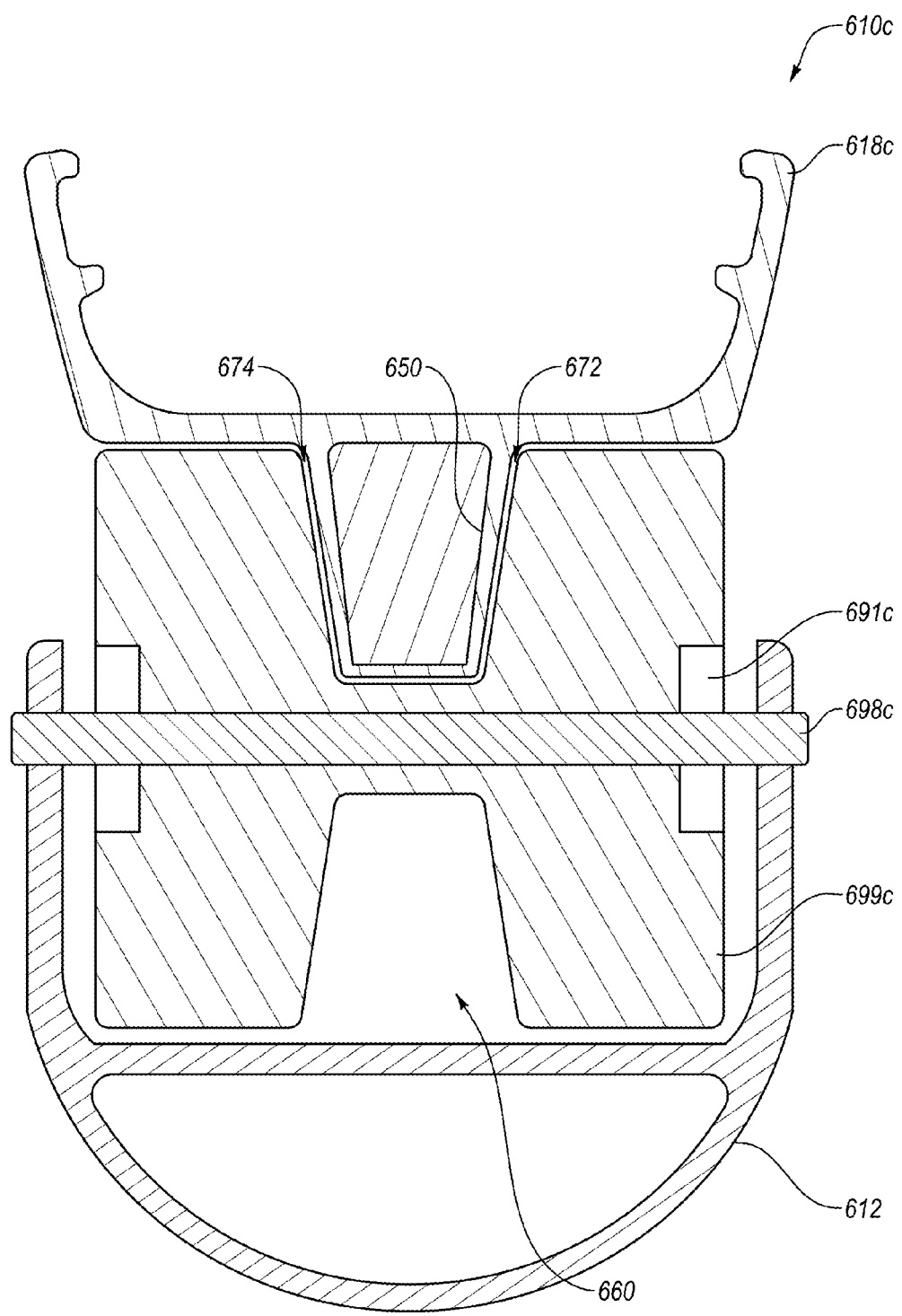
FIG. 6C illustrates a cross-sectional view of a portion of another example centerless wheel assembly.

FIGS. 6A and 6B illustrate cross-sectional views of a portion of example wheel assemblies 610a and 610b, respectively (which may be similar to the wheel assemblies 10, 210, 310, 410, and/or 510 of FIGS. 1, 2, 3, 4, and/or 5). The wheel assemblies 610a and 610b may illustrate example profiles and/or form factors for centerless rims (e.g., a concave centerless rim 618a in FIG. 6A and a convex centerless rim 618b in FIG. 6B) and roller guides (e.g., a convex roller guide 699a in FIG. 6A and a concave roller guide 699b in FIG. 6B). In some embodiments, the wheel assemblies 610a and 610b may include drive friction roller guide assemblies.

In some embodiments, the first roller guides 699a and 699b may include a shape or profile that matches a corresponding shape or profile of the rims 618a and 618b, respectively. For example, the first roller guide 699a may include a convex shape and the rim 618a may include a concave shape, as illustrated in FIG. 6A. As another example, the first roller guide 699b may include a concave shape and the rim 618b may include a convex shape, as illustrated in FIG. 6B. While the remaining description may be described with reference to FIG. 6A, the disclosure is equally applicable to FIG. 6B.

Static friction between the first roller guide 699a and the rim 618a may drive the rim 618a with minimal frictional losses and minimal scrubbing on an outer surface of first roller guide 699a. For example, because the shape and/or profile of the first roller guide 699a and the rim 618a are generally matched, the surface area between the first roller guide 699a and the rim 618a may be maximized, thus reducing slippage between the first roller guide 699a and the rim 618a.

In some embodiments, a first friction roller guide assembly 697a may include first one-way bearings 691. In some embodiments, a first bridging driven shaft 695a may include a driven shaft with a key 698. The key 698 may lock the first roller guide 699a with the first bridging driven shaft 695a such that the first bridging driven shaft 695a and the first roller guide 699a move as a single body (e.g., when the first bridging driven shaft 695a rotates, the first roller guide 699a also rotates). Using the key 698, when the first bridging driven shaft 695a is rotated, static friction between the interior of the rim 618a and the first roller guide 699a may rotate the rim 618a. In some embodiments, the first roller guide 699a may function as an input gear and the interior of the rim 618a may function as an output gear, thus, constituting a first stage of gear reduction. For example, the gear reduction may include a ratio of between approximately forty to one and two to one. For example, an electric scooter or car may have a gear reduction of thirty-five to one. As another example, a wheelchair may utilize a gear ratio (rather than reduction) of one hundred and twenty-five to one.

FIG. 6C illustrates a cross sectional view of a portion of another example profile of a wheel assembly 610c (which may be similar to the wheel assemblies 10, 210, 310, 410, and/or 510 of FIGS. 1, 2, 3, 4, and/or 5). In some embodiments, the wheel assembly 610c may include a drive roller guide assembly or an idler roller guide assembly. The wheel assembly 610c may additionally include bearings 691c (which may be similar or analogous to the bearings 691a and 691b of FIGS. 6A and 6B) and bridging shaft 695c (which may be similar or analogous to the shafts 695a and 695b of FIGS. 6A and 6B).

As illustrated in FIG. 6C, the rim 618c may include a generally flat profile abutting the surface of the roller guide 699c. The rim 618c may additionally include a rail 650 with a corresponding void 660 in the roller guide 699c. In these and other embodiments, the rim 618c and the roller guide 699c may be positioned and sized such that gaps 672 and 674 may exist between the roller guide 699c and the rail 650. Additionally or alternatively, there may be such a gap completely between the roller guide 699c and the rail 650 such that in normal operation, the roller guide 699c may not contact the rail 650. In some embodiments, the rail 650 may serve as a guide or a stop to prevent the roller guide 699c from losing contact with the rim 618c. For example, when hitting a pothole, or when turning, forces may be applied to the wheel assembly 610c that may cause one or more of the roller guides (e.g., the roller guide 699c) to disengage from the rim, and may even cause the entire assembly of roller guides and/or exoskeleton plates to disengage from the rim and the tire. Such a concern and problem may be particularly observed in an embodiment in which two wheels are side by side, such as a wheelchair or an automobile. In such embodiments, the inside wheel, when turning, may experience strong side-ways forces that may push the roller guides and/or the exoskeleton plates out of connection with the rim. In these and other embodiments, the rail 650 may act as a guide or a stop to keep the roller guide (e.g., the roller guide 699c) in contact with the rim 618c, and/or to keep the roller guides from derailing.

In some embodiments, the profile of the exoskeleton plate 612 may include a generally U-shaped profile. For example, rather than having two distinct exoskeleton plates, the exoskeleton plate 612 may include a first portion that supports one end of the bridging shafts and a second portion that supports the other end of the bridging shafts. The exoskeleton plate 612 may also include a curved connecting portion that connects the first and the second portions. The generally U-shaped profile may provide increased aerodynamic performance and may reduce drag. Additionally or alternatively, a single-piece exoskeleton plate 612 (whether the U-shaped profile illustrated or otherwise) may provide torsional rigidity and/or weight reduction. For example, the exoskeleton plate 612 may more effectively resist forces that may warp the exoskeleton plates and may require less material overall (and thus less weight) than a two-exoskeleton plate design.

Modifications, additions, or omissions may be made to FIG. 6A, 6B, or 6C without departing from the scope of the present disclosure. For example, the wheel assemblies 610a, 610b, and/or 610c may include more or fewer elements than those illustrated and described in the present disclosure. For example, the first roller guide 699a and/or the rim 618a may take any shape, form or profile.

Figure 7:
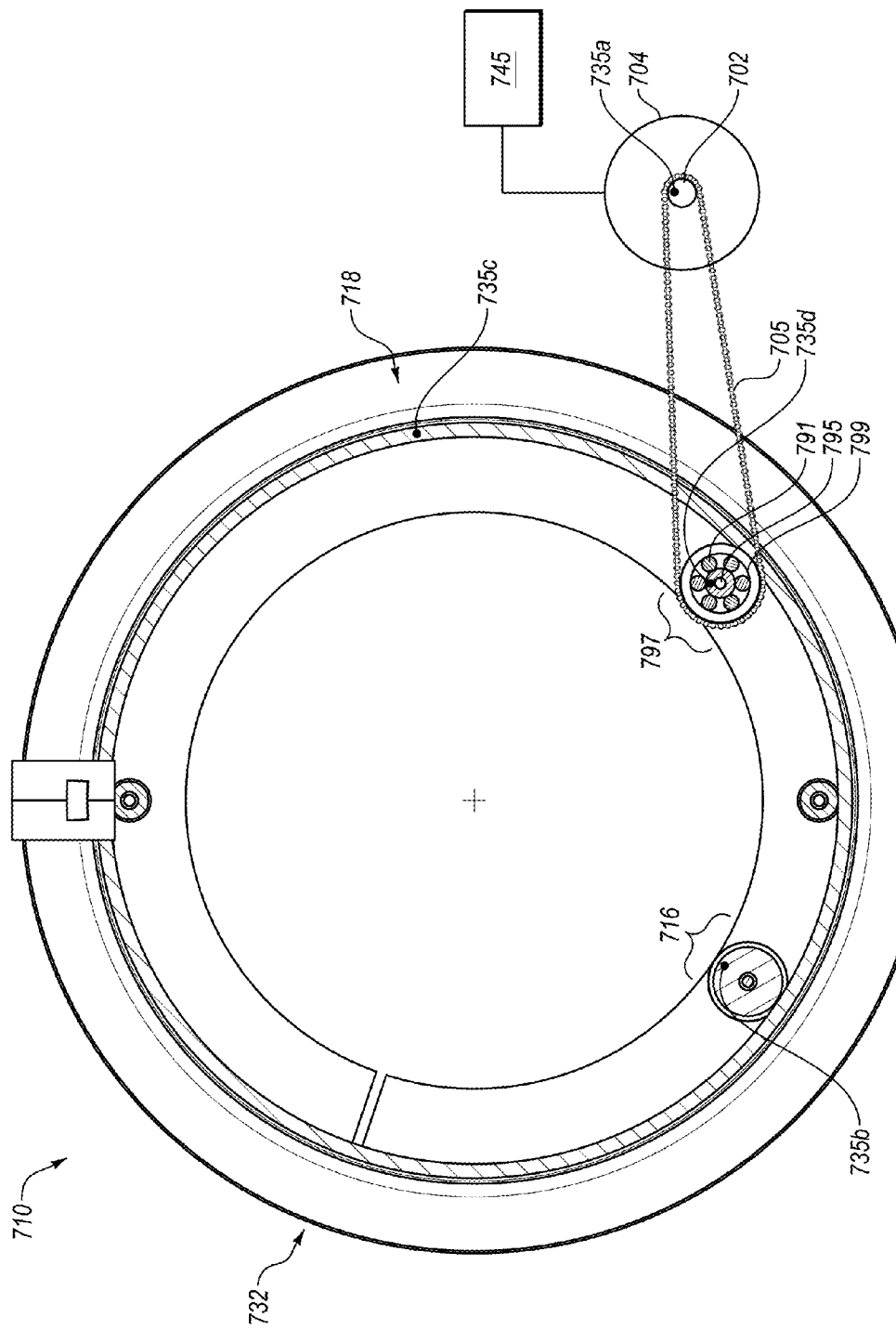
FIG. 7 illustrates a diagram of another example centerless wheel assembly that may be driven.

FIG. 7 illustrates a diagram of an example wheel assembly 710 (which may be similar to the wheel assemblies 10, 210, 310, 410, 510, 610A, and/or 610B of FIGS. 1, 2, 3, 4, 5, 6a, and/or 6b) that may be driven. In some embodiments, a first bridging driven shaft 795 (which may be similar or analogous to the first bridging driven shaft 595 of FIG. 5) of a first friction roller guide assembly 797 (which may be similar or analogous to the first friction roller guide assembly 597 of FIG. 5) may include a driven shaft with a key 798. The key 798 may operate as described with respect to the key 698 of FIG. 6a such that the first bridging driven shaft 795 and the first friction roller guide assembly 797 move as a single body. In some embodiments, the first bridging driven shaft 795 may be operably coupled to a first sprocket, first pulley, or first right angle gear, which may be operably coupled to a first chain, first drive shaft, or first belt 705. In some embodiments, the first belt 705 may be operably coupled to a second sprocket, second pulley, or second right-angle gear 702, which may be operably coupled to an output shaft of an engine or electric motor 704. Coupling between the first right-angle gear and the second right-angle gear may constitute a second state of gear reduction. In some embodiments, the second state of gear reduction may include a ratio of between approximately two to one and approximately ten to one, for example, five to one. In these and other embodiments, the internal diameter of the rim may dictate of the value of the second gear reduction. Thus, in aggregate, going from the motor 704 to the rotation of the wheel, there may be an overall ratio of between approximately two to one and approximately one hundred twenty-five to one.

When an external source of energy or power from the electric motor 704 is applied to the second right-angle gear 702, the second right-angle gear 702 may rotate, in turn causing the first belt 705 to rotate. The first belt 705 rotating may cause the first sprocket, first pulley, or first right angle gear associated with the first bridging driven shaft 795 to rotate. Rotation of the first bridging driven shaft 795 may rotate one-way bearings 791 (which may be similar or analogous to one-way bearings 699a of FIG. 6A) and a first friction roller guide 799 (which may be similar or analogous to the first friction roller guide 699a of FIG. 6A). Because of static friction between the first friction roller guide 799 and the rim 718, rotation of the first friction roller guide 799 rotating may cause the rim 718 to rotate.

In some embodiments, the engine or electric motor 704 may include any source of motive power. For example, the engine or electric motor 704 may include an electric motor such as a direct current (DC) motor, an alternating current (AC) motor, a brush motor, a brushless motor, a shunt wound motor, a separately excited motor, a series wound motor, a compound wound motor, a permanent magnet motor, a servomotor, an induction motor, a synchronous motor, a linear induction motor, a synchronous linear motor, etc. As another example, the engine or electric motor 704 may include a fuel consuming engine, such as a four stroke engine, a diesel engine, a two stroke engine, a Wankel engine, an Atkinson engine, a gnome rotary engine, etc. In some embodiments, the engine or electric motor 704 may include a small, high-speed, high-efficiency DC electric motor that may rotate at speeds greater than six thousand rotations per minute (RPM). In these and other embodiments, the use of such a small motor may be available because of the gearing ratio from the drive roller guide 799 to the rim 718. As an additional example, the engine or electric motor 704 may include a human-powered motive device, such as bicycle pedals, arm cranks, ratcheting levers, etc.

In some embodiments, slippage may occur between the first friction roller guide 799 and the rim 718. For example, during rainy conditions or when dust, debris, or any other material gets between the first friction roller guide 799 and the rim 718, the rotational force of the first friction roller guide 799 may overcome the static friction between the first friction roller guide 799 and the rim 718. In some embodiments, the present disclosure may include components and/or features to detect such slippage and/or to provide a corrective action. Additionally or alternatively, some embodiments of the present disclosure may include components and/or features to detect the end of such slippage and/or to stop providing a corrective action.

In some embodiments, multiple sensors 735 may be distributed throughout the wheel assembly 710 to facilitate slippage control. The sensors 735 may be configured to measure the speed of various components in the wheel assembly 710. For example, a first sensor 735a may be disposed in association with the motor 704 to measure a rotational speed of the right angle gear 702. A second sensor 735b may be disposed in association with an idler roller guide 716 that may not be driven to measure a rotational speed of the idler roller guide 716. A third sensor 735c may be disposed in association with the rim 718 and/or a wheel 732. The sensors 735 may include any device, component, or combination thereof configured to sense position, velocity, acceleration, or any combinations thereof. For example, the sensors 735 may include a capacitive sensor, a potentiometer, a proximity sensor, an inductive sensor, an accelerometer, a gyroscope, a magnetometer, etc., or any combinations thereof. In some embodiments, the sensors 735 may work together to determine any of position, velocity, and/or acceleration.

In some embodiments, the sensors 735 may be communicatively coupled to a computing device 745. The computing device 745 may be configured to monitor the speeds of various components of the wheel assembly 710 and adjust the power delivered to the motor 704 accordingly or otherwise alter the operation of the wheel assembly 710. Such monitoring and adjustment may be described with greater detail in FIGS. 25A-B and 26. The computing device 745 may include any special purpose or general computing device. For example, the computing device 745 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The computing device 745 may also include some computer-readable medium, such as a data storage device or memory.

In some embodiments, the computing device 745 may monitor or measure the speeds of various components of the wheel assembly 710 relative to each other. For example, the computing device 745 may monitor the speed of the first friction roller guide 799 relative to the idler roller guide 716. As another example, the computing device 745 may monitor the speed of the rim 718 relative to the right angle gear 702. As an additional example, the computing device 745 may monitor the speed of the rim 718 relative to the right angle gear 702. In these and other embodiments, under normal operation without slippage, a proportional relationship may exist between the various components monitored. For example, depending on the placement of the sensors 735 and the diameters of the various components of the wheel assembly 710, a certain rotational speed of the right angle gear 702 may correspond to a certain speed of the first friction roller guide 799, the idler roller guide 716, and/or the rim 718 or the wheel 732. If slippage occurs, the speed of the right angle gear 702 and/or the first friction roller guide 799 may increase beyond or outside of the normal operational relationships.

In some embodiments, when the speed of the right angle gear 702 and/or the first friction roller guide 799 extends outside of the normal operational relationship, the computing device 745 may invoke a corrective action to counteract the slippage. For example, the computing device 745 may take an action to adjust the power or rate of speed of the motor 704 or may take an action to adjust the first friction roller guide 799. Such corrective actions may be discussed in greater detail with respect to FIGS. 25A-B and 26.

Modifications, additions, or omissions may be made to FIG. 7 without departing from the scope of the present disclosure. For example, the centerless wheel assembly 710 may include more or fewer elements than those illustrated and described in the present disclosure. For example, the centerless wheel assembly 710 may include any number of gears and/or connections between the first bridging driven shaft 795 and the engine or electric motor. As another example, any type of chain, belt, drive shaft, or other connector may be used to connect the various gears and/or connections.

Figure 8A:
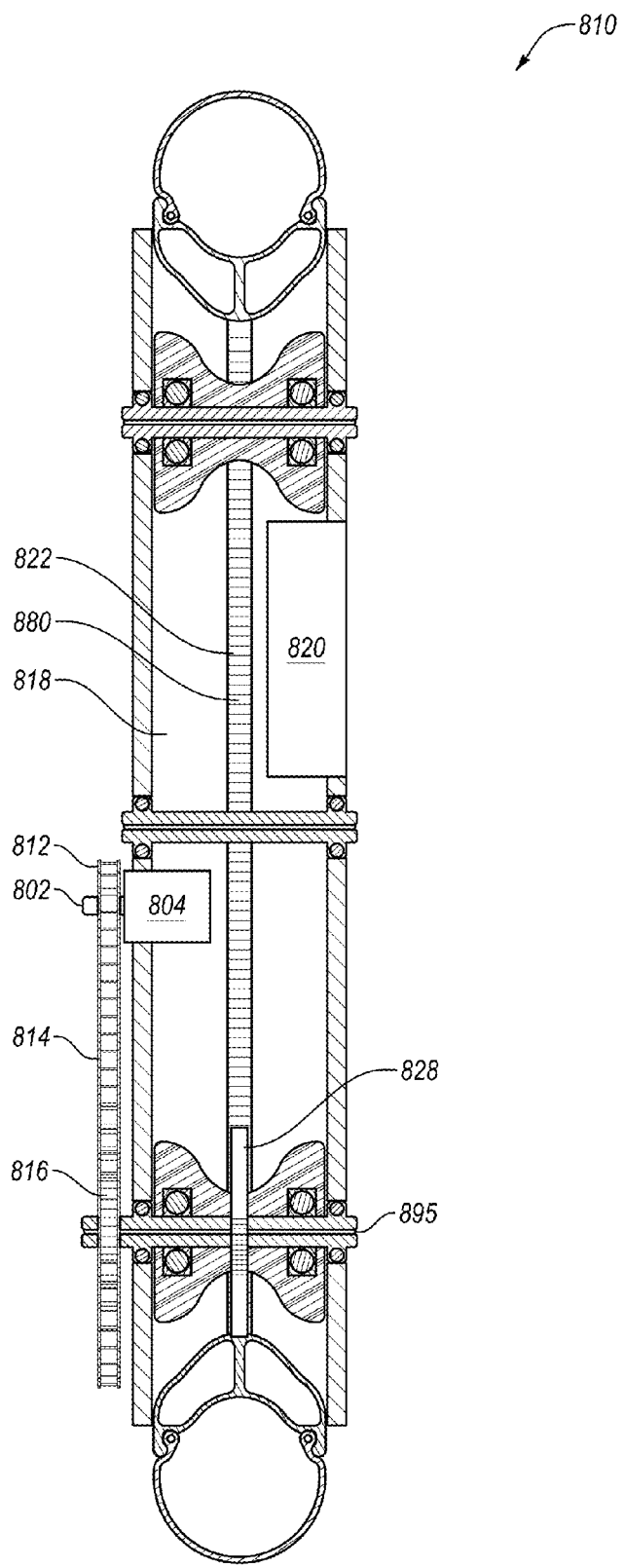
FIG. 8A illustrates a top cutaway view of another example centerless wheel assembly.

FIG. 8A illustrates a top cutaway view of an example wheel assembly 810 (which may be similar to the wheel assemblies 10, 210, 310, 410, 510, 610*a*, 610*b*, and/or 710 of FIGS. 1, 2, 3, 4, 5, 6A, 6B, and/or 710) and FIG. 8B illustrates a diagram of the wheel assembly 810 of FIG. 8A.

In some embodiments, an output shaft 802 of an engine or electric motor 804 may be operably coupled with a first sprocket, first pulley, or first right-angle gear 812. In some embodiments, the first right-angle gear 812 may be coupled with a chain, drive shaft, or belt 814, which may be operably coupled with a second sprocket, second pulley, or second right-angle gear 816. In some embodiments, the second right-angle gear 816 may be operably coupled with any bridging shaft, such as, for example, a bridging driven shaft 895 (which may be similar to the bridging driven shaft 695 of the first friction roller guide assembly 697*a* of FIG. 6A).

In some embodiments, the bridging driven shaft 895 may be coupled with an input gear 828. When power or energy is supplied to the electric motor 804, by, for example, an electricity storage system, storage battery, or fuel source 820, torque may be applied to the first right-angle gear 812, which may rotate the belt 714. Rotation of the belt 814 may in turn rotate the second right angle-gear 816, which may rotate the bridging driven shaft 895, which may rotate the input gear 818. In some embodiments, the centerline 880 of the rim 818 may include an output gear 822, which may be driven by the input gear 828. While illustrated as a gear in FIGS. 8*a* and 8*b*, the same gearing relationship may be experienced by friction based rotation. For example, in some embodiments, the input gear 828 may include a roller guide (e.g., the first friction roller guide 699*a* of FIG. 6A) and the centerless rim 818 may directly interface with the roller guide. In some embodiments, a pinion and ring gear may be used, for example, in high horsepower conditions such as above fifty horsepower from an electric motor.

In some embodiments, a hybrid system may be utilized. For example, in some embodiments, two different wheel diameters may be used and both wheels may be driven (e.g., a front wheel and a back wheel). For example, the smaller of the wheels may be used as a low gear range for hill climbing performance and the larger wheel may be used for top speed. By using the two wheel sizes, a two-speed transmission may effectively be introduced.

A gear ratio between the output gear 822 and the input gear 828 may be larger than is possible within a single stage of reduction in the case of a conventional wheel. For example, the ratio may include between approximately five to one and approximately one hundred and twenty-five to one. This gearing advantage of the centerless wheel assembly 810 may facilitate additional economies of weight and space saving via adaption to a more dimensionally compact motor 804 (e.g., a brushless electric motor), which may otherwise, due to its small size and/or high RPM, provide insufficient torque for a conventional wheel. The gearing advantage of the centerless wheel assembly 810 may also decrease one or more of the following: the amount of current or power necessary for a vehicle coupled with the centerless wheel assembly 810 to overcome inertia, resistive losses, and the operating temperature of the electric motor 804, such that efficiency of the vehicle may be improved.

Modifications, additions, or omissions may be made to FIGS. 8*a* and 8*b* without departing from the scope of the present disclosure. For example, the centerless wheel assembly 810 may include more or fewer elements than those illustrated and described in the present disclosure. For example, the centerless wheel assembly 810 may include the input gear 828 that may interface with the output gear 822 and may also include one or more friction-based rollers. As another example, the centerless rim 818 may include a profile with multiple protrusions, one that matches a friction based roller guide and one with teeth to function as the output gear 822.

Figure 9:
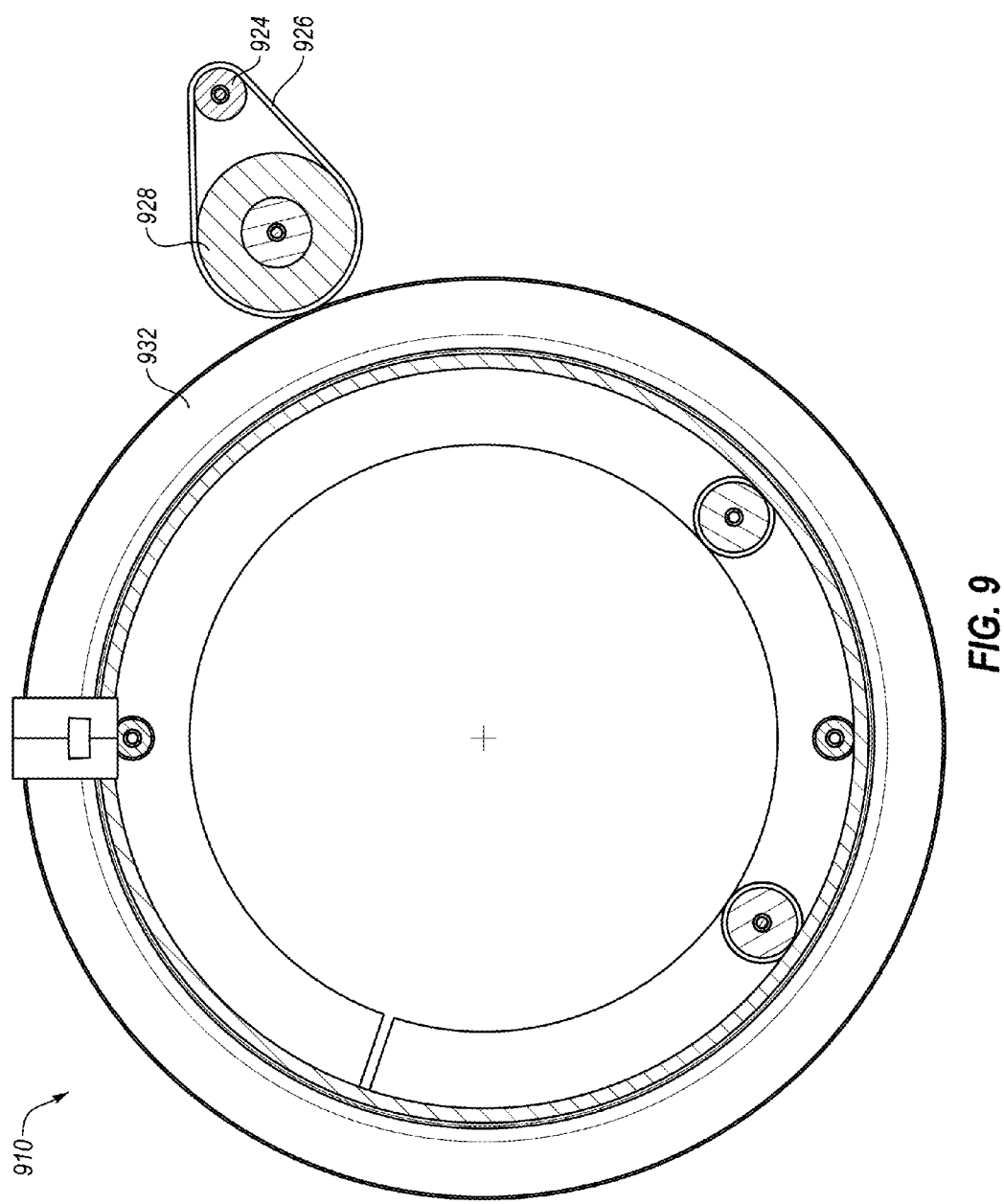
FIG. 9 illustrates a diagram of an example centerless wheel assembly that may include an exterior input driver that may drive a tire.

FIG. 9 illustrates a diagram of an example wheel assembly 910 (which may be similar to the wheel assemblies 10, 210, 310, 410, 510, 610a, 610b, 710, and/or 810 of FIGS. 1, 2, 3, 4, 5, 6A, 6B, 7, 8A, and/or 8B) that may include an exterior input driver 924 that may drive a tire 932 (which may be similar or analogous to the tire 32 of FIG. 1). In some embodiments, the exterior input driver 924 may drive the tire 932 with an external friction roller 928. For example, the external friction roller 928 may be similar to a roller guide assembly that operates on the internal side of a centerless rim (e.g., the first friction roller guide 697a and the centerless rim 618a of FIG. 6A). The external friction roller 928 may be shaped, sized, and or otherwise configured to interface with the external side of the tire 932. For example, the external friction roller 928 may have a concave shape that matches a convex profile of the external side of the tire 932. Static friction between the external friction roller 928 and the tire 932 may cause the external friction roller 928 to roll along the tire 932 such that as the external friction roller 928 is caused to rotate, the tire 932 is also caused to rotate. In these and other embodiments, the exterior input driver 924 may be caused to rotate (e.g., from a motor or engine such as the motor 804 of FIG. 8A), which may rotate a drive shaft, chain, or belt 926 to rotate. Rotation of the drive shaft, chain, or belt 926 may cause the external friction roller 928 to rotate. Rotation of the external friction roller 928 may cause the tire 932 to rotate, thus driving the tire 932.

In some embodiments, a hybrid centerless wheel assembly may be used. For example, such a centerless wheel assembly may include one or more friction roller assemblies that may provide rolling force against the internal edge of a centerless rim, and may also include one or more external friction rollers that may provide rolling force against the external edge of a tire.

Modifications, additions, or omissions may be made to FIG. 9 without departing from the scope of the present disclosure. For example, the centerless wheel assembly 910 may include more or fewer elements than those illustrated and described in the present disclosure. For example, the centerless wheel assembly 910 may include a friction roller assembly.

Figure 10A:
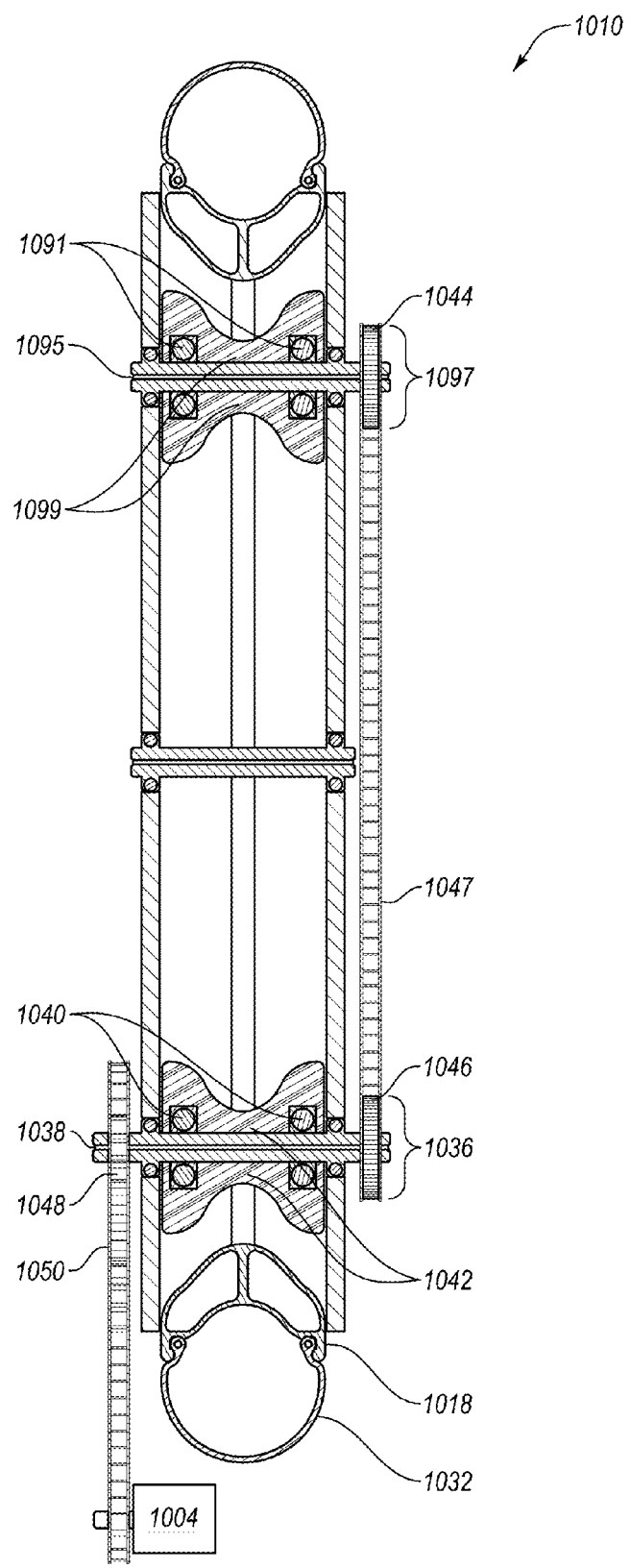
FIG. 10A illustrates a top cutaway view of a dual-driving centerless wheel assembly.
Figure 10B:
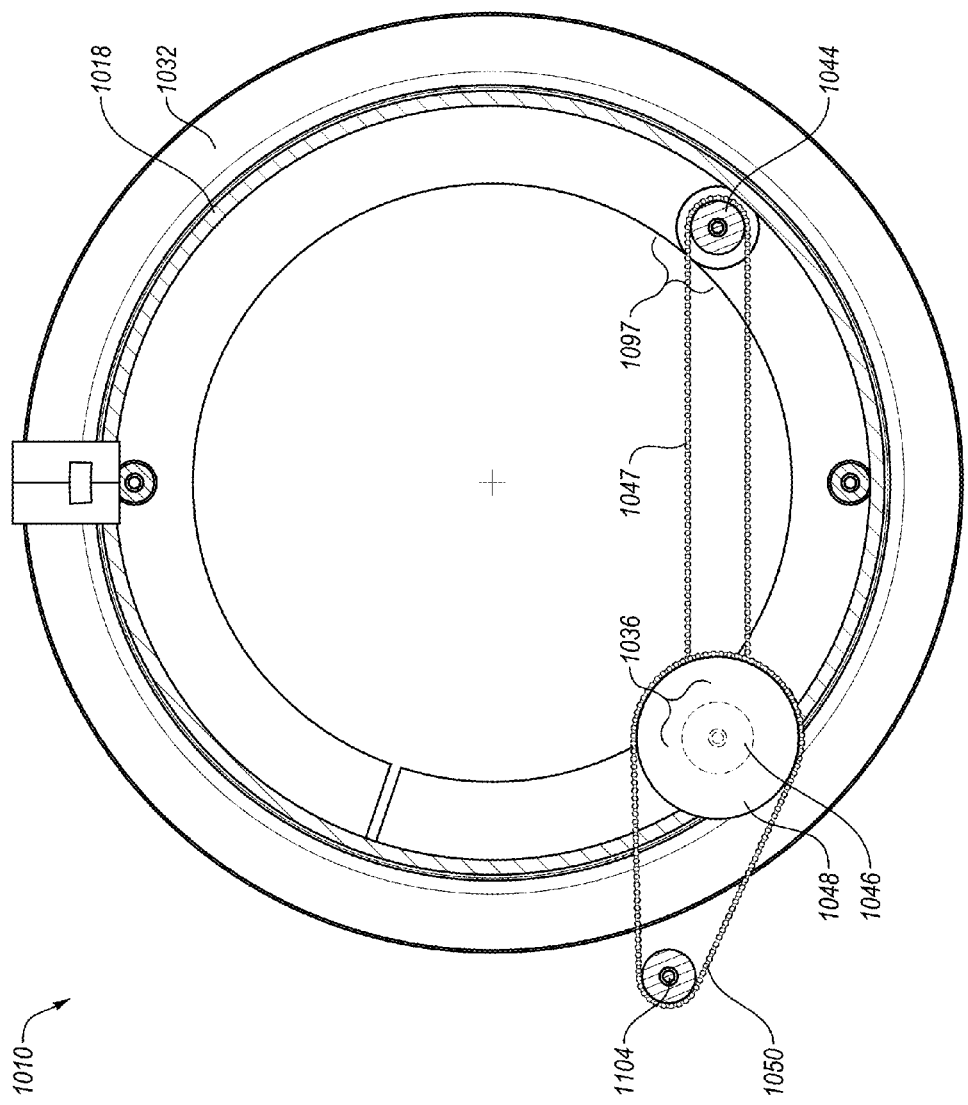
FIG. 10B illustrates a diagram of the dual-driving centerless wheel assembly of FIG. 10A.

FIGS. 10A and 10B illustrate a top cutaway view and a diagram, respectively, of a dual-driving example wheel assembly 1010 (which may be similar to the wheel assemblies 10, 210, 310, 410, 510, 610a, 610b, 710, 810, and/or 910 of FIGS. 1, 2, 3, 4, 5, 6A, 6B, 7, 8A, 8B, and/or 9). In some embodiments, the wheel assembly 1010 may include dual-driving friction roller guide assemblies. For example, the wheel assembly 1010 may include a first friction roller guide assembly 1097 (which may be similar or analogous to the first friction roller guide 697a of FIG. 6A), which may include one or more of the following: a first bridging driven shaft 1095 (which may be similar or analogous to the first bridging driven shaft 695a of FIG. 6A) with a key, one or more first one-way bearings 1091 (which may be similar or analogous to the one way bearings 691 of FIG. 6A), and a first friction roller guide 1099 (which may be similar or analogous to the first friction roller guide 699a of FIG. 6A). In some embodiments, the wheel assembly 1010 may also include a second friction roller guide assembly 1036, which may include one or more of the following: a second bridging driven shaft 1038 with a key, one or more second one-way bearings 1040, and a second friction roller guide 1042. In some embodiments, the second centerless friction roller guide assembly 1036 may be similar or equivalent to the first centerless friction roller guide assembly 1097.

In some embodiments, the first bridging driven shaft 1095 may be coupled with a first sprocket, a first pulley, or a first right angle gear 1044, and a first end of the second bridging driven shaft 1038 may be coupled with a second sprocket, a second pulley, or a second right angle gear 1046. In some embodiments, the first right angle gear 1044 and the second right angle gear 1046 may be operably coupled to a first chain, first drive shaft, or first belt 1047. In some embodiments, a second end of the second bridging driven shaft 1038 may be coupled to a third sprocket, a third pulley, or a third right angle gear 1048. In some embodiments, a second chain, second drive shaft, or second belt 1050 may be coupled to the third right angle gear 1048 and an output shaft of an engine or electric motor 1004.

The electric motor 1004 may be used as an external source of energy or power, which may be used to rotate the first bridging driven shaft 1095 and the second bridging driven shaft 1038. For example, as the electric motor 1004 operates and causes the second belt 1050 to rotate, the second belt 1050 may cause the third right angle gear 1048 to rotate. Rotation of the third right angle gear 1048 may cause the second bridging shaft 1038 and the second right angle gear 1046 to rotate. Rotation of the second right angle gear 1046 may cause the first belt 1047 to rotate, which may cause the first right angle gear 1044 and the first bridging driven shaft 1095 to rotate. In some embodiments, a gearing ratio between the first right angle gear 1044 and the second right angle gear 1046 may be approximately 1:1 such that the first bridging driven shaft 1095 and the second bridging driven shaft 1038 may rotate at approximately the same speed.

In some embodiments, rotation of the first bridging driven shaft 1095 may rotate the first one-way bearings 1091 and the first friction roller guide 1099, which may be coupled with the first one-way bearings 1091. Similarly, in some embodiments, rotation of the second bridging driven shaft 1038 may rotate the second one-way bearings 1040 and the second friction roller guide 1042, which may be coupled with the second one-way bearings 1040. In some embodiments, rotation of the first and second friction roller guides 1099, 1040 may be used to drive rotation of the rim 1018 due to friction between the first and second friction roller guides 1099, 1040 and the interior of the rim 1018. In some embodiments, the second friction roller guide assembly 1036 may be used to increase the area of contact between the interior of the rim 1018 and the roller guides in instances where an increased driving friction may be desired. For example, by spreading the driving force over a larger area, the torque may be increased. Additionally or alternatively, a larger roller guide may be used with a similar effect. However, a larger roller guide may introduce a different gear ratio than that experienced by two smaller roller guides.

Modifications, additions, or omissions may be made to FIGS. 10A and/or 10B without departing from the scope of the present disclosure. For example, the centerless wheel assembly 1010 may include more or fewer elements than those illustrated and described in the present disclosure. For example, the centerless wheel assembly 1010 may include any number of friction roller guide assemblies, including less than or more than two, as illustrated. As another example, there may be more than one driving motor (e.g., each of the first and second friction roller guide assemblies 1097, 1036 may be coupled to their own driving motor).

Figure 11:
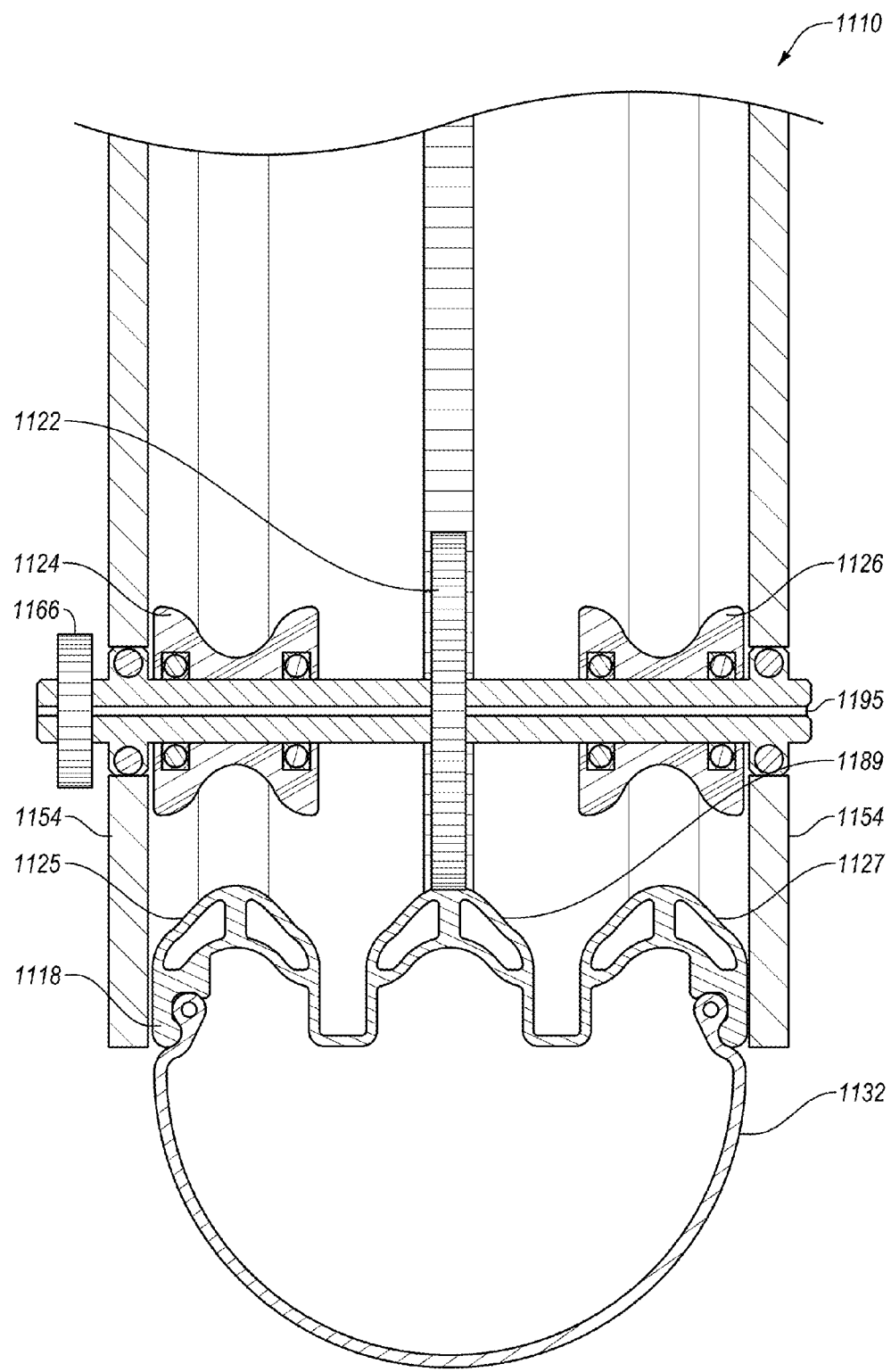
FIG. 11 illustrates a cutaway view of an example centerless wheel assembly that may include multiple roller guide assemblies.

FIG. 11 may illustrate a cutaway view of an example wheel assembly 1110 (which may be similar to the wheel assemblies 10, 210, 310, 410, 510, 610a, 610b, 710, 810, 910, and/or 1010 of FIGS. 1, 2, 3, 4, 5, 6A, 6B, 7, 8A, 8B, 9, 10A, and/or 10B). In some embodiments, the wheel assembly 1110 may include multiple roller guide assemblies, with, for example, a first roller guide 1124, a second roller guide 1126, and a third roller guide 1188. The first roller guide 1124 and the second roller guide 1126 may be similar to the first and second roller guides 24, 26 of FIG. 1. The third roller guide 1188 may be similar to the input gear 118 of FIG. 8A. The wheel assembly 1110 may also include a first exoskeleton plate 1113 and a second exoskeleton plate 1154, which may be similar to the first and second exoskeleton plates 13, 54 of FIG. 4, respectively. The wheel assembly 1110 may additionally include an output gear 1122, which may be similar to the output gear 22 of FIG. 8A.

The wheel assembly 1110 may include a centerless rim 1118 that interfaces with a tire 1132. The rim 1118 may include a profile with multiple features for interacting with the roller guides. For example, the rim 1118 may include a first protrusion 1125 sized, shaped, and/or configured to interface with the first roller guide 1124 and a second protrusion 1127, sized, shaped, and/or configured to interface with the second roller guide 1126. The rim 1118 may also include a set of teeth 1189 that may function as the output gear 1122 to interface with the third roller guide 1188, which may be implemented as a toothed gear.

In some embodiments, one or more of the roller guide assemblies of the wheel assembly 1110 may be operably coupled to a driven bridging shaft 1195 which may function as an axle for one or more of the roller guide assemblies. In these and other embodiments, one or more of the roller guide assemblies may be coupled to the driven bridging shaft 1195 such that as the driven bridging shaft 1195 rotates, the roller guide assemblies coupled to the driven bridging shaft 1195 also rotate. Additionally or alternatively, one or more of the roller guide assemblies may not be coupled to the driven bridging shaft 1195 and may spin freely about the driven bridging shaft 1195. For example, in some embodiments the first and/or second roller guides 1124, 1126 may be coupled to one-directional bearings and may be keyed to the driven bridging shaft 1195. As another example, in some embodiments the first and/or second roller guides 1124, 1126 may be coupled to free-rolling bearings and may not be keyed to the drive bridging shaft 1195. In some embodiments, the third roller guide 1188 may be a unitary body with the drive bridging shaft 1195, or may include a gear keyed to the drive bridging shaft 1195.

The drive bridging shaft 1195 maybe operatively coupled to a sprocket, pulley, or right angle gear 1166. The right angle gear 1166 may be coupled (e.g., through a chain, drive shaft, or belt) to a source of motive power (e.g., an engine or electric motor such as the motor 104 of FIG. 8A). As the right angle gear 1166 is rotated, the driven bridging shaft 1195 may also be rotated. Rotation of the driven bridging shaft 1195 may cause any of the roller guide assemblies coupled to the driven bridging shaft 1195 to rotate as well. Rotation of the driven bridging shaft 1195 may not cause rotation of any roller guide assemblies not keyed or otherwise operatively connected to the driven bridging shaft 1195. For example, if one of the roller guide assemblies includes free-rolling bearings, rotation of the driven bridging shaft 1195 may cause the free-rolling bearings to rotate without rotating the roller guide.

In some embodiments, the wheel assembly 1110 may include multiple roller guide assemblies that are on different bridging shafts. For example, one or more of the roller guide assemblies may be disposed on the driven bridging shaft 1195 and others of the roller guide assemblies may be disposed on another bridging shaft (not illustrated).

Modifications, additions, or omissions may be made to FIG. 11 without departing from the scope of the present disclosure. For example, the wheel assembly 1110 may include more or fewer elements than those illustrated and described in the present disclosure. For example, the profile of the rim 1118 may take any form or shape, for example, including concave rather than convex features for interacting with roller guide assemblies. As another example, the wheel assembly 1110 may include any combination of friction-based and/or toothed-gear based roller guide assemblies. As an additional example, any number of roller guide assemblies may be disposed across the profile of the rim 1118 and any number of roller guide assemblies may be disposed across a bridging shaft.

Wheelchair Embodiments

Figure 12A:
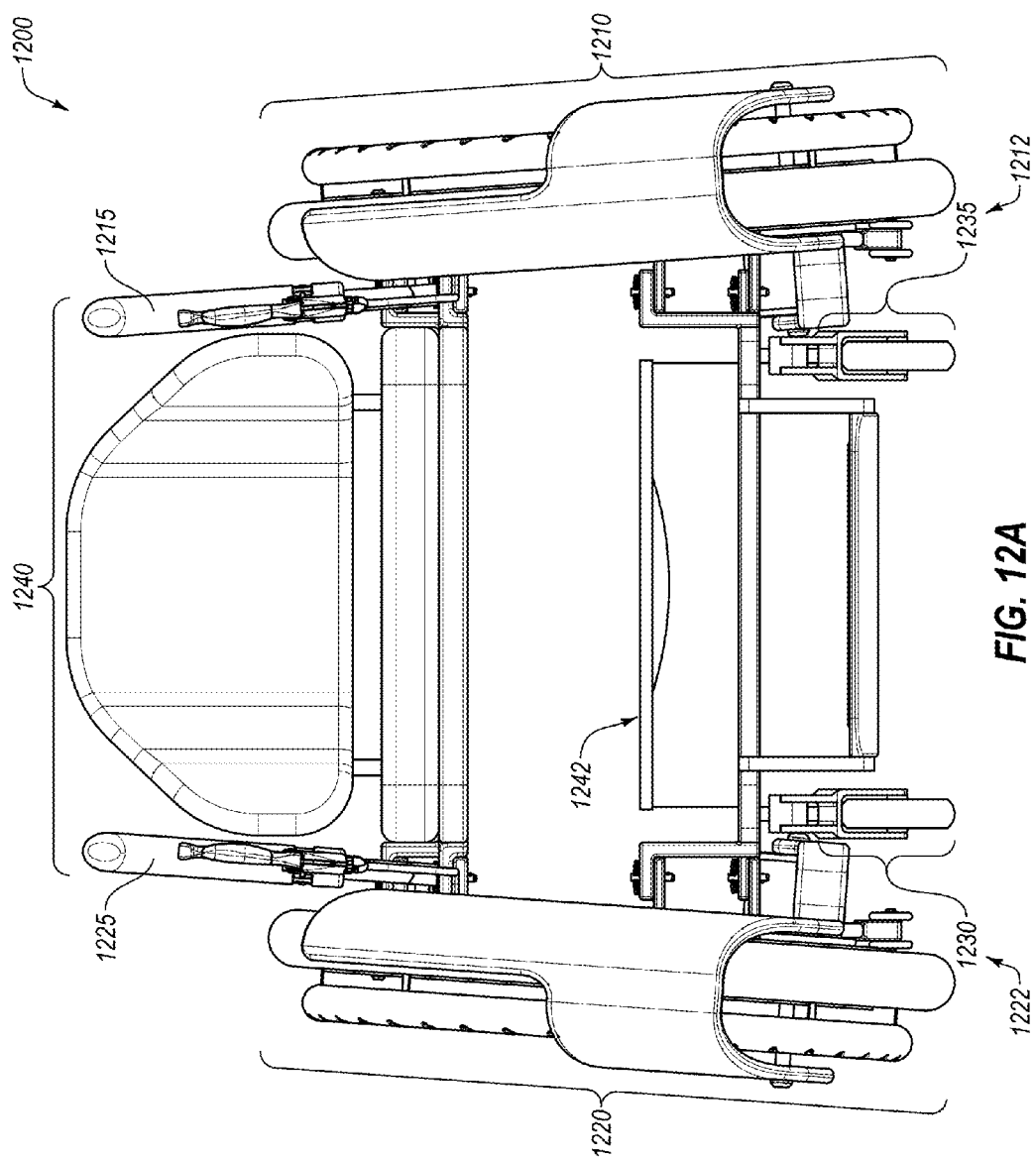
FIG. 12A illustrates a front view of an example wheelchair.
Figure 12B:
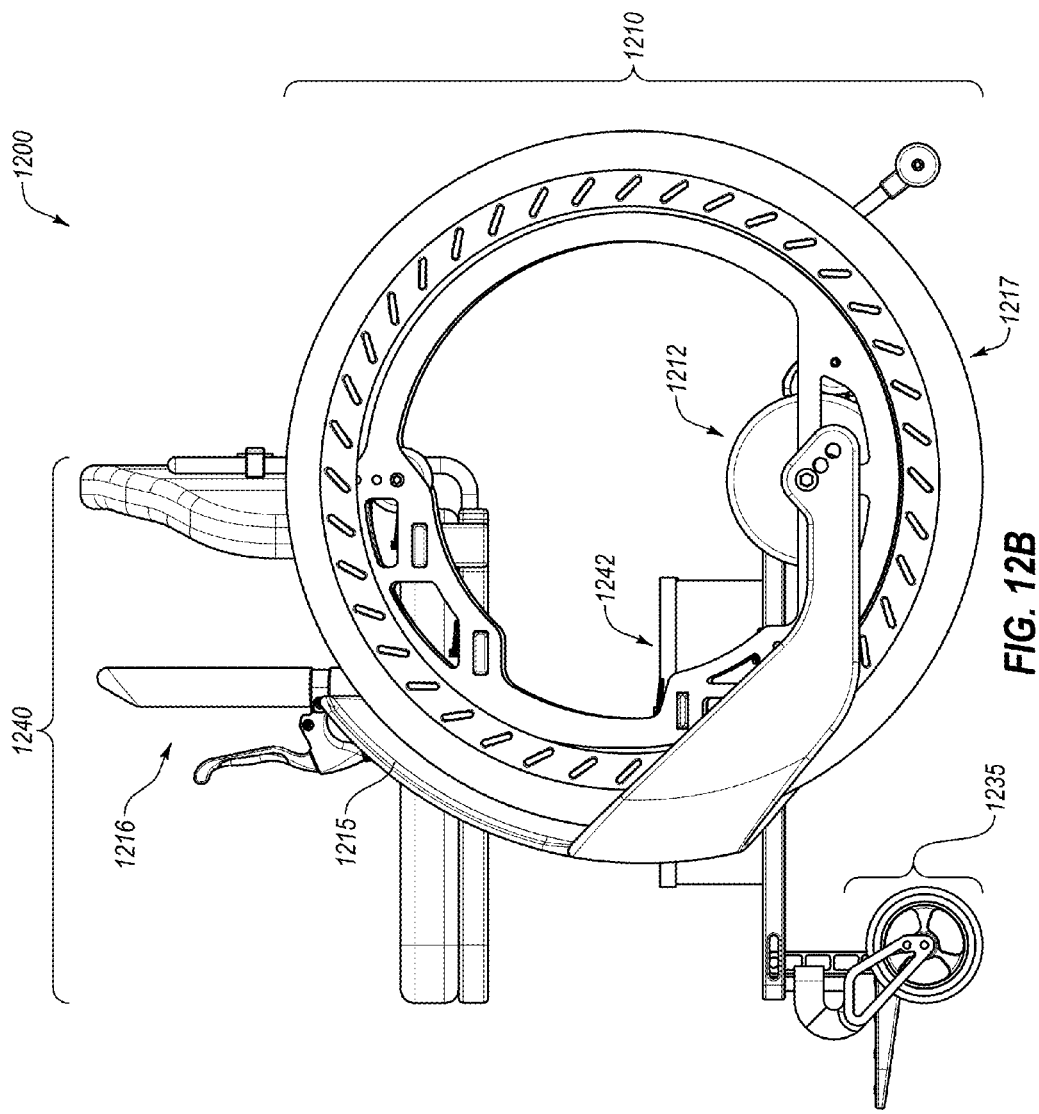
FIG. 12B illustrates a side view of the example wheelchair of FIG. 12A.

FIG. 12A illustrates a front view of an example wheelchair 1200, and FIG. 12B illustrates a side view of the wheelchair 1200 of FIG. 12A, in accordance with at least one embodiment of the present disclosure. The wheelchair 1200 may include a first wheel assembly 1210 with an associated first drive mechanism 1212 and a second wheel assembly 1220 with an associated second drive mechanism 1222. The wheelchair 1200 may additionally include a third wheel assembly 1230, a fourth wheel assembly 1235, and a payload region 1240.

The first wheel assembly 1210 and/or the second wheel assembly 1220 may be similar or analogous to the wheel assemblies 10, 210, 310, 410, 510, 610a, 610b, 710, 810, 910, 1010, and/or 1110 of FIGS. 1, 2, 3, 4, 5, 6A, 6B, 7, 8A, 8B, 9, 10A, 10B, and/or 11. In some embodiments, the first wheel assembly 1210 and the second wheel assembly 1220 may be similar or identical. In some embodiments, the first and the second wheel assemblies 1210, 1220 may be mirror images of each other. For convenience in discussing operation, relative positions, etc. of the present disclosure, the side of the first wheel assembly 1210 facing the payload region 1240 may be referred to as an inside face, and the opposite side may be referred to as an outside face. Similarly, the side of the second wheel assembly 1220 facing the payload region 1240 may be referred to as an inside face and the opposite side may be referred to as an outside face. The operation of the first and second wheel assemblies 1210 and 1220 may be described with greater detail with respect to FIG. 13.

Figure 17:
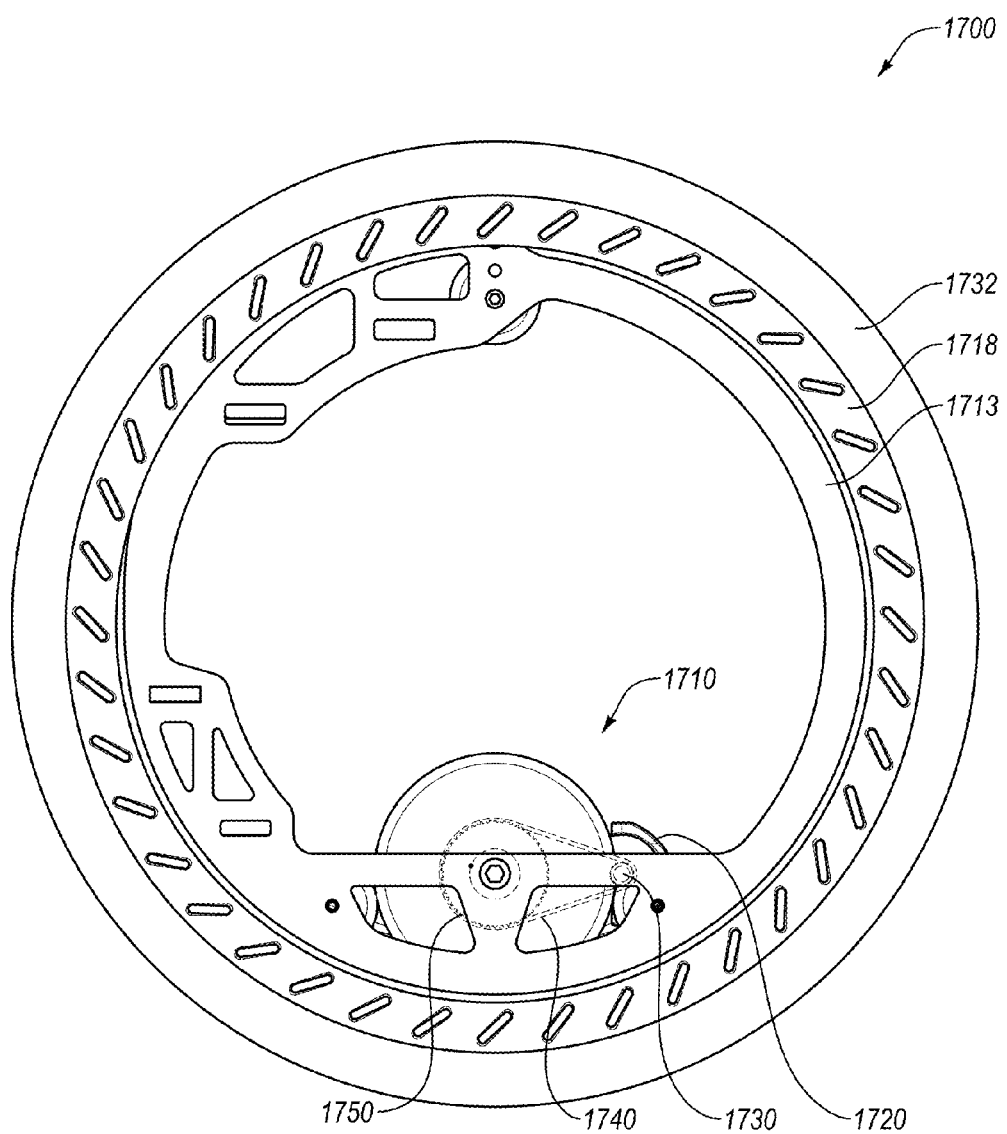
FIG. 17 illustrates an example wheel assembly and associated drive mechanism of a wheelchair.
Figure 18:
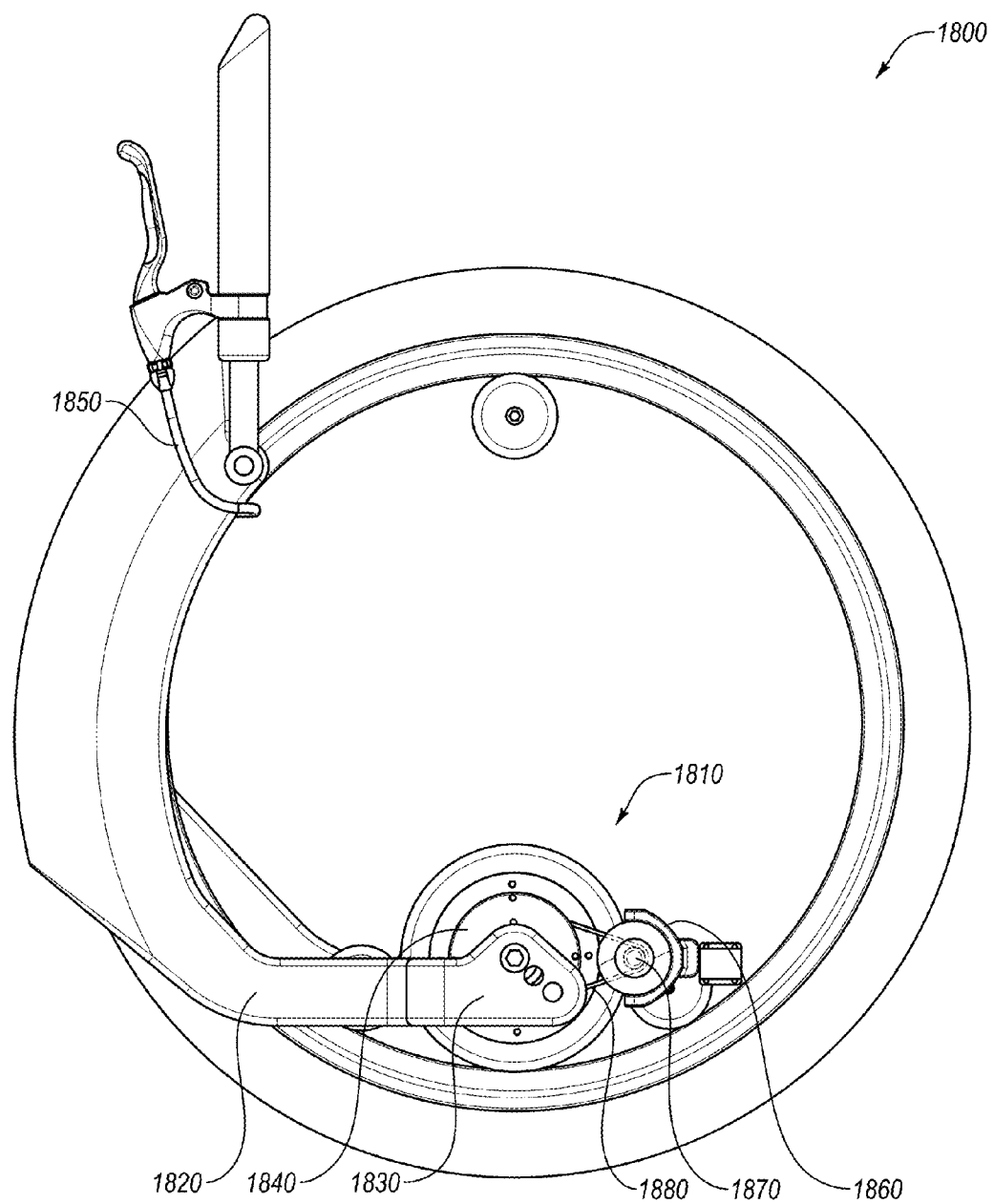
FIG. 18 illustrates an example wheel assembly and associated drive mechanism of a wheelchair.

The first drive mechanism 1212 and the second drive mechanism 1222 may be similar or identical. In some embodiments, the first and the second drive mechanisms 1212, 1222 may be mirror images of each other. For convenience, reference will be made to the first drive mechanism 1212 with an understanding that the description may be equally applicable to the second drive mechanism 1222. The first drive mechanism 1212 may be implemented as a manual drive mechanism (for example, as illustrated in FIGS. 12A and 12B), as a powered drive mechanism (for example, as illustrated in FIG. 17), or both (for example, as illustrated in FIG. 18). In some embodiments (for example, as illustrated in FIG. 12B), a first lever arm 1215 may be coupled to the first drive mechanism 1212 with a first end 1216 of the first lever arm 1215 disposed proximate a seat of the payload region 1240 and a second end 1217 coupled to the first drive mechanism 1212. The first end 1216 of the first lever arm 1215 may include a handle or other feature for a user of the wheelchair 1200 to grasp or otherwise interface with the first lever arm 1215 to push or pull the first lever arm 1215, causing the drive mechanism 1212 to drive the first wheel assembly 1210. An example of using the lever arm 1215 to drive the drive mechanism 1212 to drive the first wheel assembly 1210 may be discussed below with reference to FIGS. 15A, 15B, and 16.

In some embodiments, the first drive mechanism 1212 and the second drive mechanism 1222 may be operatively coupled to operate at the same speed, or to otherwise work in a cooperative manner (e.g., the first wheel assembly 1210 driven forward while the second wheel assembly 1220 is driven backward to turn). In some embodiments, the first lever arm 1215 may have a generally arced shape that follows the general outer circumference of the first wheel assembly 1210, such as illustrated in FIG. 12B. Additionally or alternatively, the first lever arm 1215 may follow a generally straight line from a handle location to the first drive mechanism 1212.

In some embodiments, the first drive mechanism 1212 and the second drive mechanism 1222 may operate independently of each other. For example, the first drive mechanism 1212 may operate to drive the first wheel assembly 1210 without the second drive mechanism 1222 operating to drive the second wheel assembly 1220, and vice versa. In these and other embodiments, the first drive mechanism 1212 and the second drive mechanism 1222 may be configured to operate cooperatively to perform a maneuver in the wheelchair 1200. For example, to turn in a particular direction, the first drive mechanism 1212 may drive the first wheel assembly 1210 forward and the second drive mechanism 1222 may drive the second wheel assembly 1220 backward. An example of using the lever arm 1215 to drive the drive mechanism 1212 to drive the first wheel assembly 1210 in either a forward or a backward direction may be discussed below with reference to FIGS. 15A, 15B and 16.

The third and/or fourth wheel assemblies 1230 and 1235 may include any wheel assembly configured to provide balance, stability, and/or support to the wheelchair 1200. For example, the third and/or fourth wheel assemblies 1230 and 1235 may include a canister wheel. Additionally or alternatively, the third and/or fourth wheel assemblies 1230 and 1235 may be a centerless wheel. In some embodiments, the third and/or fourth wheel assemblies 1230 and 1235 may be disposed generally behind the first and second wheel assemblies 1210, 1220. Additionally or alternatively, the third and/or fourth wheel assemblies 1230 and 1235 may be disposed generally in front of the first and second wheel assemblies 1210, 1220 (for example, as illustrated in FIG. 12B). In these and other embodiments, a distance between the third wheel assembly 1230 and the second wheel assembly 1220 may be approximately equal to a between the fourth wheel assembly 1235 and the first wheel assembly 1210.

In some embodiments, the wheelchair 1200 may omit the fourth wheel assembly 1235. In these and other embodiments, the third wheel assembly 1230 may be disposed approximately equidistance between the first and second wheel assemblies 1210, 1220. Additionally or alternatively, the third wheel assembly 1230 may be disposed in front of or behind the first and second wheel assemblies 1210, 1220.

In some embodiments, the inclusion or exclusion of the fourth wheel assembly and the location of the third and/or fourth wheel assemblies may depend on the circumstance and/or environment in which the wheelchair 1200 is likely to be used. For example, in hospital use, the wheelchair 1200 may include the fourth wheel assembly and the third and fourth wheel assemblies may be disposed in front or in back with a relatively short wheel base (e.g., the third and fourth wheel assemblies are within approximately eighteen to forty inches of the first and second wheel assemblies 1210, 1220, including approximately twenty four inches). As another example, for off-road use, the wheelchair 1200 may not include the fourth wheel assembly and the third wheel assembly 1230 may be disposed on an arm of the wheelchair with a longer wheel base (e.g., the third wheel assembly 1230 may be at least within approximately twenty four to forty eight inches of the first and second wheel assemblies 1210, 1220, including approximately thirty six inches). In some embodiments, the third wheel assembly 1230 may be a caster wheel.

The payload region 1240 may include any space, region, or area in which a payload may be disposed. In some embodiments, the payload region 1240 may include a sitting area with a seat, back, arm rest, and/or foot rest where a user of the wheelchair 1200 may sit when operating the wheelchair 1200. In some embodiments, the payload region 1240 may also include a storage compartment 1242 or region for stowing of goods or materials, (e.g., goods that a user of the wheelchair 1200 desires to transport, and/or motors, batteries, etc. or other components that may facilitate the operation of the wheelchair 1200).

Modifications, additions, or omissions may be made to FIGS. 12A and/or 12B without departing from the scope of the present disclosure. For example, the wheelchair 1200 may include more or fewer elements than those illustrated and described in the present disclosure. For example, the wheelchair 1200 may include a fourth wheel assembly. As another example, the wheelchair 1200 may include a motor and/or a battery. As an additional example, the seat and back illustrated are only examples and the sitting area may take any form factor.

Figure 13:
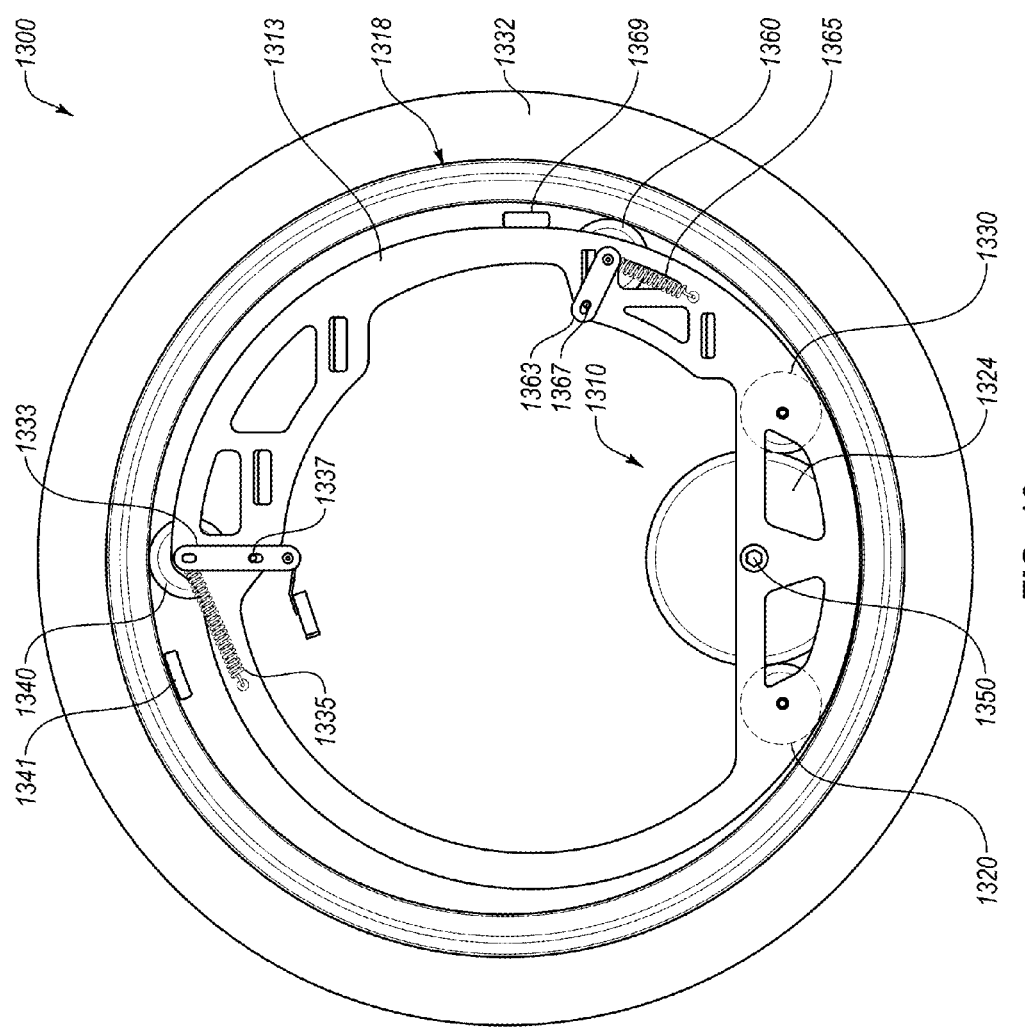
FIG. 13 illustrates a side cutaway view of an example wheel assembly of a wheelchair.

FIG. 13 illustrates a side cutaway view of an example wheel assembly 1300 of a wheelchair in accordance with at least one embodiment of the present disclosure. The wheel assembly 1300 may be similar or analogous to the wheel assemblies 10, 210, 310, 410, 510, 610a, 610b, 710, 810, 910, 1010, and/or 1110 of FIGS. 1, 2, 3, 4, 5, 6A, 6B, 7, 8A, 8B, 9, 10A, 10B, and/or 11. In some embodiments, the wheel assembly 1300 may be used for the wheel assembly 1210 or the wheel assembly 1220 described above with respect to FIGS. 12A and 12B. The view of the wheel assembly 1300 illustrated in FIG. 13 is with respect to looking at an inside face of the wheel assembly 1300.

The wheel assembly 1300 may include a first roller guide assembly 1310 that may be driven, a second roller guide assembly 1320, a third roller guide assembly 1330, and a fourth roller guide assembly 1340. The wheel assembly 1300 may also include a tire 1332 (which may be similar or analogous to the tire 32 of FIG. 1), a centerless rim 1318 (which may be similar or analogous to the centerless rim 18 of FIG. 1), and an outside face exoskeleton plate 1313 (which may be similar or identical to the exoskeleton plate 13 of FIG. 1).

The first roller guide assembly 1310 may include a roller guide 1324 shaped and sized to interface with and roll along the centerless rim 1318. The first roller guide assembly 1310 may also include a bridging shaft 1350 that may function as an axle for the roller guide 1324. The bridging shaft 1350 may be keyed such that as the bridging shaft 1350 is rotated, the roller guide 1324 may also rotate a corresponding amount. The bridging shaft 1350 may be coupled to a driving mechanism (e.g., the first driving mechanism 1212 of FIGS. 12A-12C). The first roller guide assembly 1310 may be similar or analogous to the first friction roller guide assembly 597 of FIG. 5. For example, the first roller guide assembly 1310 may include bearings and a key. As another example, static friction between the roller guide 1324 and the centerless rim 1318 may cause rotation of the roller guide 1324 to rotate the centerless rim 1318 and thus drive the wheel assembly 1300.

The second roller guide assembly 1320 and the third roller guide assembly 1330 may be similar or analogous to the first roller guide assembly 14 and/or the second roller guide assembly 16 of FIG. 1. For example, the second and third roller guide assemblies 1320, 1330 may be configured to roll along the centerless rim 1318 during normal operation.

The fourth roller guide assembly 1340 may be similar or analogous to the first limiter 28 of FIG. 1. For example, the fourth roller guide assembly 1340 may be spaced apart from an interior circumference or edge of the rim 1318 by a gap. For example, there may be a gap of approximately at least one, two, three, four, five, ten, fifteen, etc. thousandths of an inch. The gap may be reduced or eliminated in response to the wheel assembly 1300 experiencing a drop from an elevation and/or a compression due to a great force or impact such as, for example, an abrupt or sudden stop. The fourth roller guide assembly 1340 may contact the centerless rim 1318 in response to the drop and/or the compression, which may mitigate effects of the drop and/or the compression.

The wheel assembly 1300 may also include a brake mechanism 1341. The brake mechanism 1341 may include any feature, component, or combination thereof configured to slow, stop, or prevent the rotation of the tire 1332. For example, the brake mechanism 1341 may include a brake shoe coupled to at least one of the exoskeleton plates (e.g., the exoskeleton plate 1313 or the corresponding exoskeleton plate not illustrated) and positioned such that as the brake mechanism 1341 is engaged, the brake shoe contacts the centerless rim 1318. As another example, the brake mechanism 1341 may include a physical stop coupled at least one of the exoskeleton plates (e.g., the exoskeleton plate 1313 or the corresponding exoskeleton plate not illustrated) and positioned to engage the tire 1332 to prevent it from rotating relative to the exoskeleton plate 1313 or the corresponding exoskeleton plate not illustrated. Additionally or alternatively, hand rails (e.g., as illustrated and discussed in FIG. 22) may also be utilized as a braking mechanism by a user of a wheelchair.

In some embodiments, using an analogy of the inside face of the wheel assembly 1300 as a clock, the first roller guide 1310 may be disposed at a six o'clock position, the second roller guide assembly 1320 may be at a seven o'clock position, the third roller guide assembly 1330 may be at a five o'clock position, and the fourth roller guide assembly 1340 may be at a twelve o'clock position. In some embodiments, the second and third roller guide assemblies 1320, 1330 may be disposed generally symmetrically about the location of the first roller guide assembly 1310. For example, an angle between the second roller guide assembly 1320 and the third roller guide assembly 1330 with reference to a center of the centerless rim 1318 may include between ten degrees and one hundred and forty degrees and generally symmetric about the six o'clock position. In some embodiments, the first roller guide assembly 1310 may be disposed at other locations, for example, between an eight o'clock position and a four o'clock position. Additionally or alternatively, the fourth roller guide assembly 1340 may be disposed at other locations, for example, between a ten o'clock position and a two o'clock position.

In some embodiments, the wheel assembly 1300 may include a first lever arm 1333 and an associated first spring 1335 and first pivot point 1337. As described above with respect to FIG. 1, the first spring 1335 may bias the fourth roller guide assembly 1340 towards the centerless rim 1318, and the first lever arm 1333 may be used to pivot about the first pivot point 1337 to overcome the spring force of the first spring 1335 to remove the tire 1332 and the centerless rim 1318 from the wheel assembly 1300.

In some embodiments, the wheel assembly 1300 may include an anti-tipping feature, for example, to prevent a user of the wheelchair from tipping over backwards while using the wheelchair. The anti-tipping feature may include a fifth roller guide assembly 1360, a second lever arm 1363, a second spring 1365, a second pivot point 1367, and a brake block 1369. In operation, when a user of the wheelchair tips backwards, the center of gravity of the person goes back beyond the roller guide 1324. As the center of gravity goes beyond the roller guide 1324, the spring force of the first spring 1335 may pull the exoskeleton plate 1313 around, contracting the first spring 1335. Such a spring force may be stronger and counteract the spring force of the second spring 1365. As the exoskeleton plate 1313 is rotated around, the second lever arm 1363 rotates about the pivot point 1367 and moves the fifth roller guide 1360 into contact with the centerless rim 1318. As the user of the wheelchair continues to rotate backwards, further moving the center of gravity off of the roller guide 1324, the fifth roller guide assembly 1360 continues to move until it abuts against the brake block 1369, at which point the person in the wheelchair may be prevented from tipping backwards any further. In some embodiments, the material of the fifth roller guide assembly 1360 may be selected to increase friction between the roller guide and the centerless rim 1318. For example, the roller guide may be made of a polyurethane or other polymer.

Modifications, additions, or omissions may be made to FIG. 13 without departing from the scope of the present disclosure. For example, the wheel assembly 1300 may include more or fewer elements than those illustrated and described in the present disclosure. For example, the wheel assembly 1300 may include fewer roller guide assemblies (e.g., three instead of four) or additional roller guide assemblies. As another example, the roller guide assemblies may be located and/or spaced apart in any configuration about the wheel assembly 1300 and proximate the centerless rim 1318.

Figure 14A:
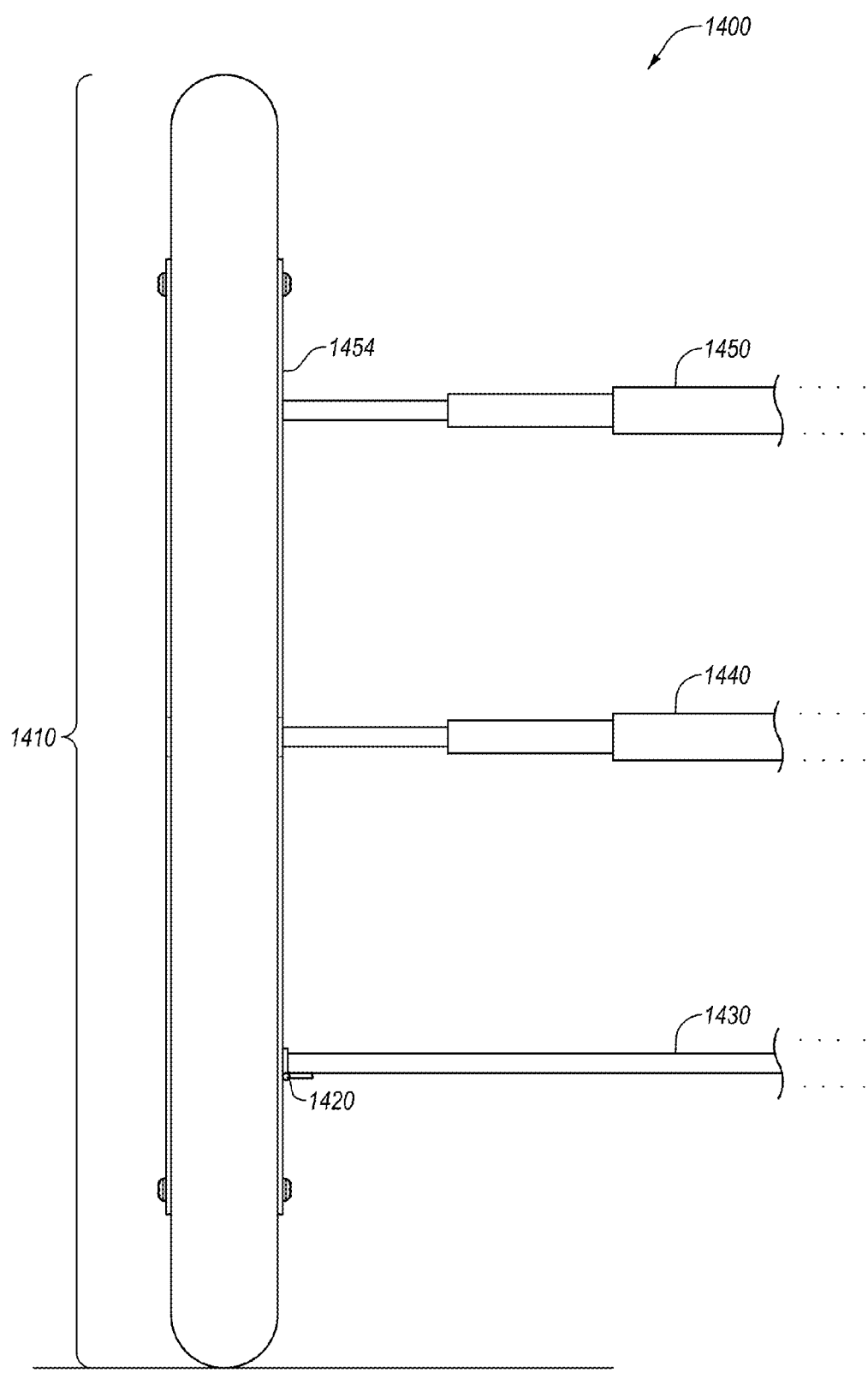
FIG. 14A illustrates a front view of an example wheel assembly of a wheelchair in a first position.
Figure 14B:
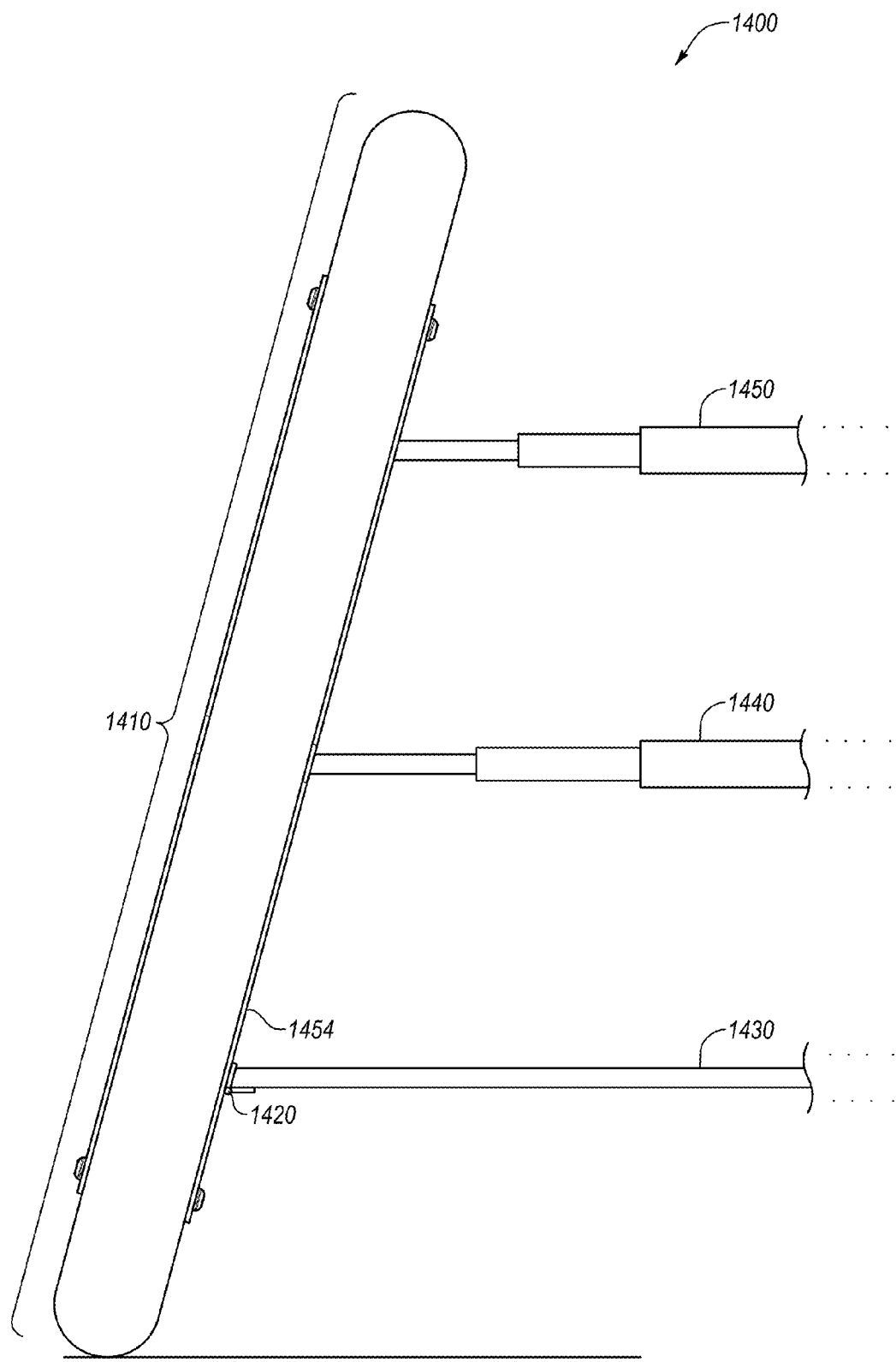
FIG. 14B illustrates a front view of an example wheel assembly of a wheelchair in a second position.
Figure 14C:
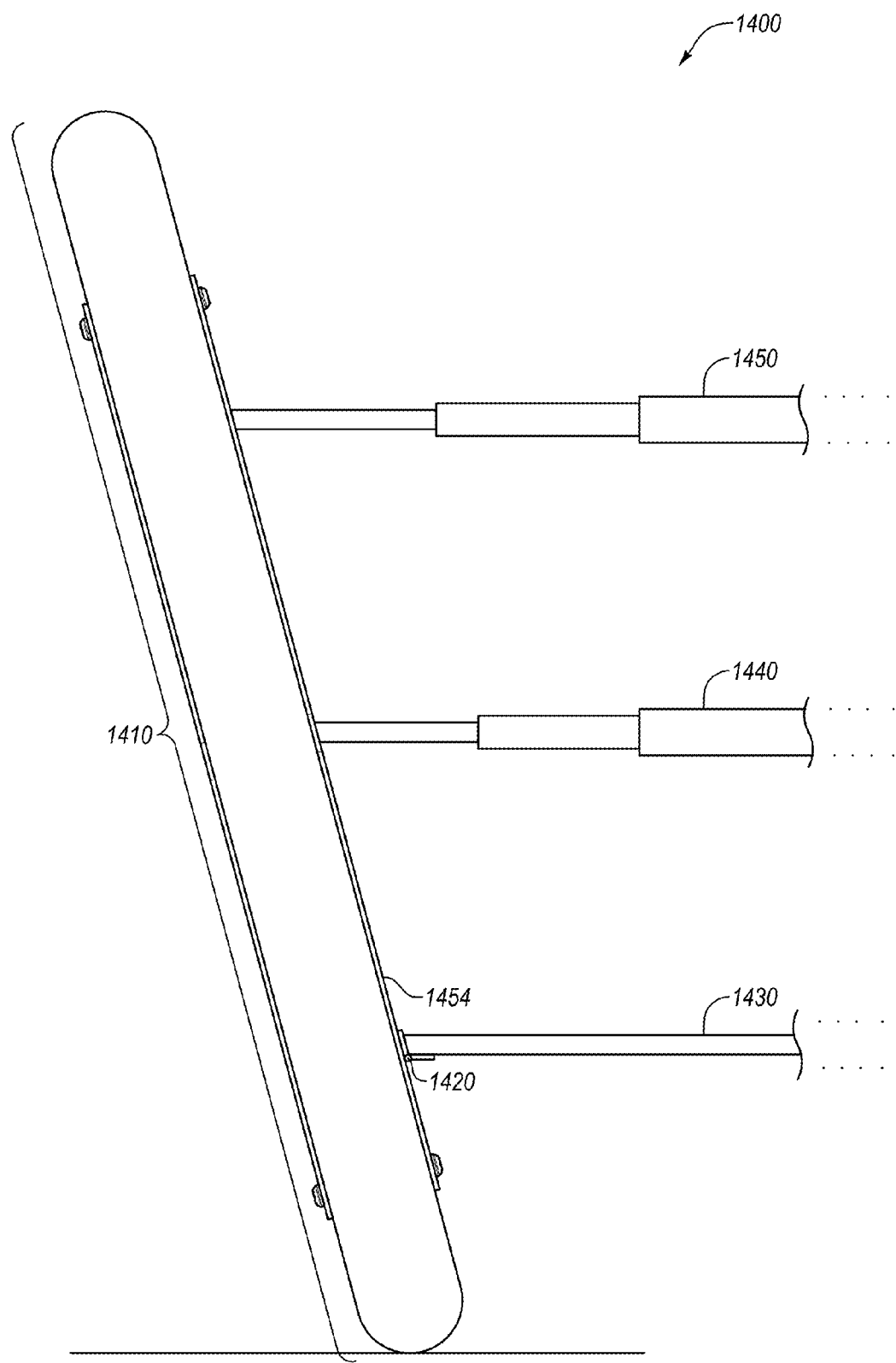
FIG. 14C illustrates a front view of an example wheel assembly of a wheelchair in a third position.
Figure 14D:
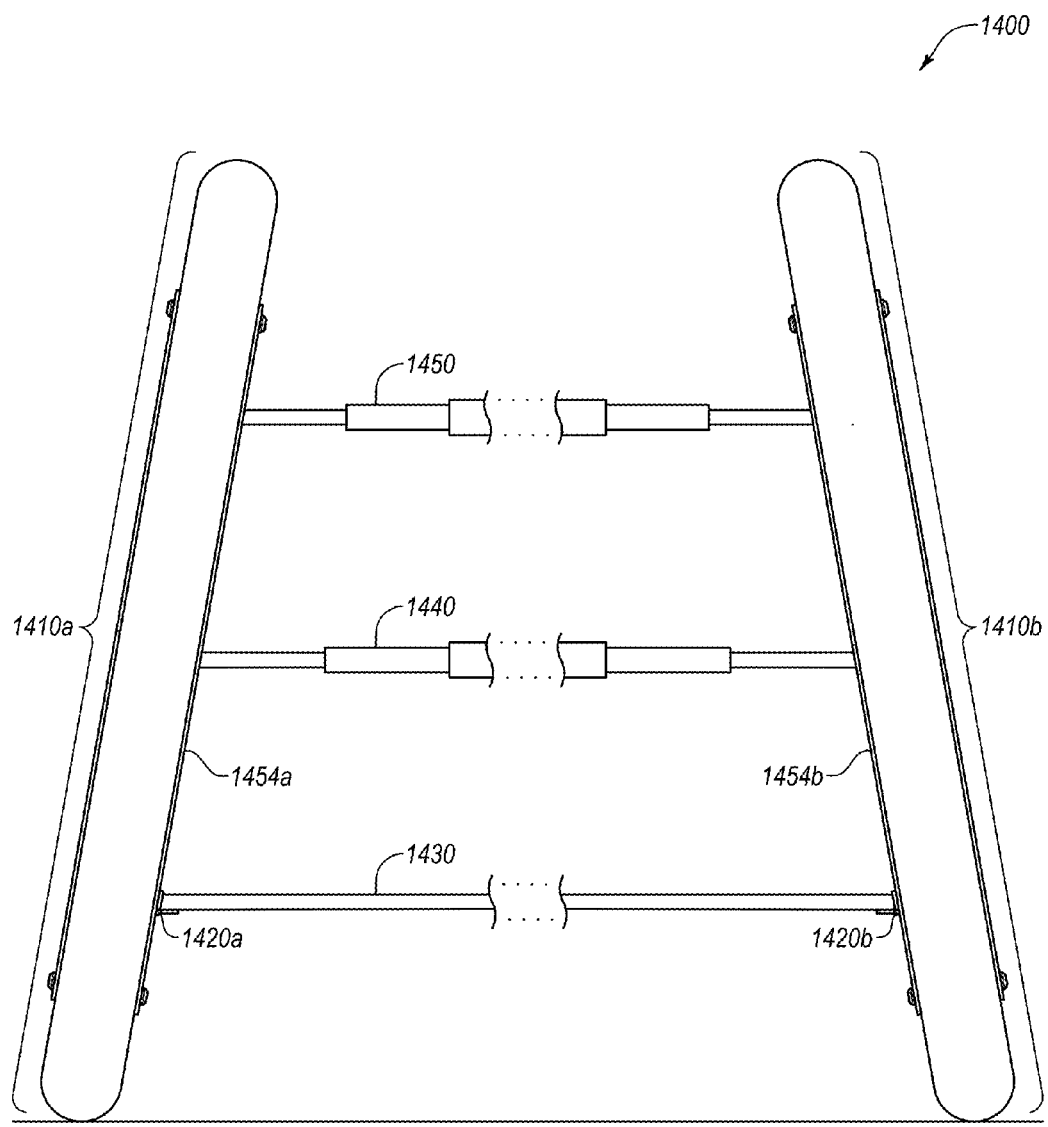
FIG. 14D illustrates a front view of an example wheelchair.

FIGS. 14A-14D may illustrate embodiments of the present disclosure in which a camber angle of the wheel assembly may be modified. FIG. 14A illustrates an embodiment with a camber angle of approximately zero, FIG. 14B illustrates an example of a negative camber angle, FIG. 14C illustrates an example of a positive camber angle, and FIG. 14D illustrates an additional embodiment of negative camber angle.

FIG. 14A illustrates a front view of an example wheel assembly 1410 of a wheelchair 1400 in a first position in accordance with at least one embodiment of the present disclosure. The wheel assembly 1410 may be similar or analogous to the first wheel assembly 1210 of FIG. 12. Additionally or alternatively, the wheelchair 1400 may be similar or analogous to the wheelchair 1200 of FIG. 12. The wheelchair 1400 may include a first horizontal strut 1430, a second horizontal strut 1440, and a third horizontal strut 1450. The first horizontal strut 1430 may be coupled to an inside face exoskeleton plate 1454 via a hinge 1420. In some embodiments, the horizontal struts (e.g., 1430, 1440, 1450) may provide structural support for various components of the wheelchair 1400, such as a seat, a footboard, a storage compartment, etc.

The hinge 1420 may include any device, component, or mechanical feature configured to allow the first horizontal strut 1430 to interface with the exoskeleton plate 1454 while maintaining substantially the same orientation with respect to the ground. For example, the first horizontal strut 1430 may remain generally parallel with the ground as the camber angle of the wheel assembly 1410 is modified because of the hinge 1420. For example, the hinge 1420 may include a mechanical component to allow the angle of the wheel assembly 1410 to change relative to the ground while remaining coupled to the first horizontal strut 1430 and the exoskeleton plate 1454 and maintaining the first horizontal strut 1430 in an original orientation with respect to the ground. The hinge 1420 may be implemented as a flag hinge, a barrel hinge, a butt/mortise hinge, a continuous hinge, a concealed hinge, a butterfly hinge, a strap hinge, an "H" hinge, a tee hinge, a coach hinge, a flush hinge, etc. Additionally or alternatively, the hinge 1420 may be implemented as a ball joint or other spherical bearing connection. In some embodiments, the second horizontal strut 1440 and the third horizontal strut 1450 may be coupled to the exoskeleton plate 1454 via a hinge (such as the hinge 1420). In some embodiments, the hinge 1420 may be lockable at a target angle. In some embodiments, any of the first, second, or third horizontal struts 1430, 1440, 1450 may be coupled to the exoskeleton plate 1454 via spring-loaded quick release pins or similar features that may allow rapid disassembly or adjustment of the wheelchair, with or without tools.

The first position of the first wheel assembly 1410 may include approximately a zero degree camber angle. In some embodiments, the first horizontal strut 1430 may have a fixed length. At a zero camber degree, the hinge 1420 may be locked in a partially opened position, such as approximately a ninety degree bend in the hinge. In some embodiments, the second and/or the third horizontal struts 1440, 1450 may have a telescoping feature such that as the camber angle is adjusted, the length of the second and/or third horizontal struts 1440, 1450 are adjusted as the first horizontal strut 1430 remains a fixed length. Additionally or alternatively, the second horizontal strut 1440 may have a fixed length and the first and third horizontal struts 1430, 1450 may include a telescoping feature.

FIG. 14B illustrates a front view of the example wheel assembly 1410 of the wheelchair 1400 in a second position in accordance with at least one embodiment of the present disclosure. The second position as illustrated in FIG. 14B illustrates a negative camber angle.

In some embodiments, as the wheel assembly 1410 changes camber angle, the hinge 1420 may rotate such that the first horizontal strut 1430 may maintain its orientation with respect to the ground, such as generally parallel with the ground. In addition, the second horizontal strut 1440 and the third horizontal strut 1450 may also maintain their orientation with respect to the ground, such as generally parallel with the ground. In these and other embodiments, the first horizontal strut 1430 may maintain a fixed length while the second and third horizontal struts 1440, 1450 may telescope such that the camber angle of the wheel assembly 1410 changes and the struts maintain their orientation. For example, the second horizontal strut 1440 may shorten a first amount, and the third horizontal strut 1450 may shorten a second amount that is shorter than the first amount that the second horizontal strut 1440 telescoped.

FIG. 14C illustrates a front view of the example wheel assembly 1410 of the wheelchair 1400 in a third position in accordance with at least one embodiment of the present disclosure. The third position as illustrated in FIG. 14C illustrates a positive camber angle.

In some embodiments, as the wheel assembly 1410 changes camber angle, the hinge 1420 may rotate such that the first horizontal strut 1430 may maintain its orientation with respect to the ground, such as generally parallel with the ground. In addition, the second horizontal strut 1440 and the third horizontal strut 1450 may also maintain their orientation with respect to the ground, such as generally parallel with the ground. In these and other embodiments, the first horizontal strut 1430 may maintain a fixed length while the second figure and third horizontal struts 1440, 1450 may telescope such that the camber angle of the wheel assembly 1410 changes and the struts maintain their orientation. For example, the second horizontal strut 1440 may lengthen a first amount, and the third horizontal strut 1450 may lengthen a second amount that is longer than the first amount that the second horizontal strut 1440 telescoped.

FIG. 14D illustrates a front view of the example wheelchair 1400 in accordance with at least one embodiment of the present disclosure. The wheelchair 1400 may include a first wheel assembly 1410a and a second wheel assembly 1410b. As illustrated in FIG. 14D, both the first and second wheel assemblies 1410a, 1410b may include a negative camber angle. In these and other embodiments, the first, second, and third horizontal struts 1430, 1440, and 1450 may generally maintain their orientation with respect to the ground, such as generally parallel with the ground. The first horizontal strut 1430 may be coupled to a first inside exoskeleton plate 1454a of the first wheel assembly 1410a via a first hinge 1420a and may be coupled to a second inside exoskeleton plate 1454b of the second wheel assembly 1410b via a second hinge 1420b. In these and other embodiments, the second and third horizontal struts 1440, 1450 may be coupled to the first exoskeleton plate 1454a and the second exoskeleton plate 1454b, via hinges, ball joints, etc.

In some embodiments, the wheel assemblies may be configured to fold up for storage or transportation. For example, all but one of the horizontal struts (e.g., all but the first horizontal strut 1430) may be configured to be disengaged from the first exoskeleton plate 1454a and the first wheel assembly 1410a may be configured to rotate towards a positive camber angle for approximately ninety degrees, or even further, such as approximately one hundred and ten or one hundred and twenty degrees.

Additionally or alternatively, all but one of the horizontal struts (e.g., the first horizontal strut 1430) may be disengaged from the second exoskeleton plate 1454b and the second wheel assembly 1410b may be configured to rotate towards a positive camber angle for approximately ninety degrees, or even further, such as approximately one hundred and ten or one hundred and twenty degrees. In these and other embodiments, interference of the second wheel assembly 1410b with the first wheel assembly 1410a may limit the rotation of the second wheel assembly 1410b. For example, the first wheel assembly 1410a may rotate approximately ninety degrees such that it is approximately parallel with the ground, and the second wheel assembly 1410b may rotate approximately eighty degrees rather than ninety degrees because of interference with the first wheel assembly 1410a.

Modifications, additions, or omissions may be made to any of FIGS. 14A-14D without departing from the scope of the present disclosure. For example, the wheelchair 1400 may include more or fewer elements than those illustrated and described in the present disclosure. For example, the wheel assembly 1410 may be configured to adjust across a wide range of camber angles, positive or negative. For example, the wheel assembly 1410 may be adjustable from approximately negative forty degrees camber to approximately positive forty degrees camber (−40° to 40°). As an additional example, any mechanical joint that allows motion about the joint may be used in place of the hinge 1420 or at any of the other interfaces with the horizontal struts. As an additional example, there may be more than three horizontal struts (e.g., four, five, six, etc.) and there may be fewer than three horizontal struts (e.g., two or one).

Figure 15A:
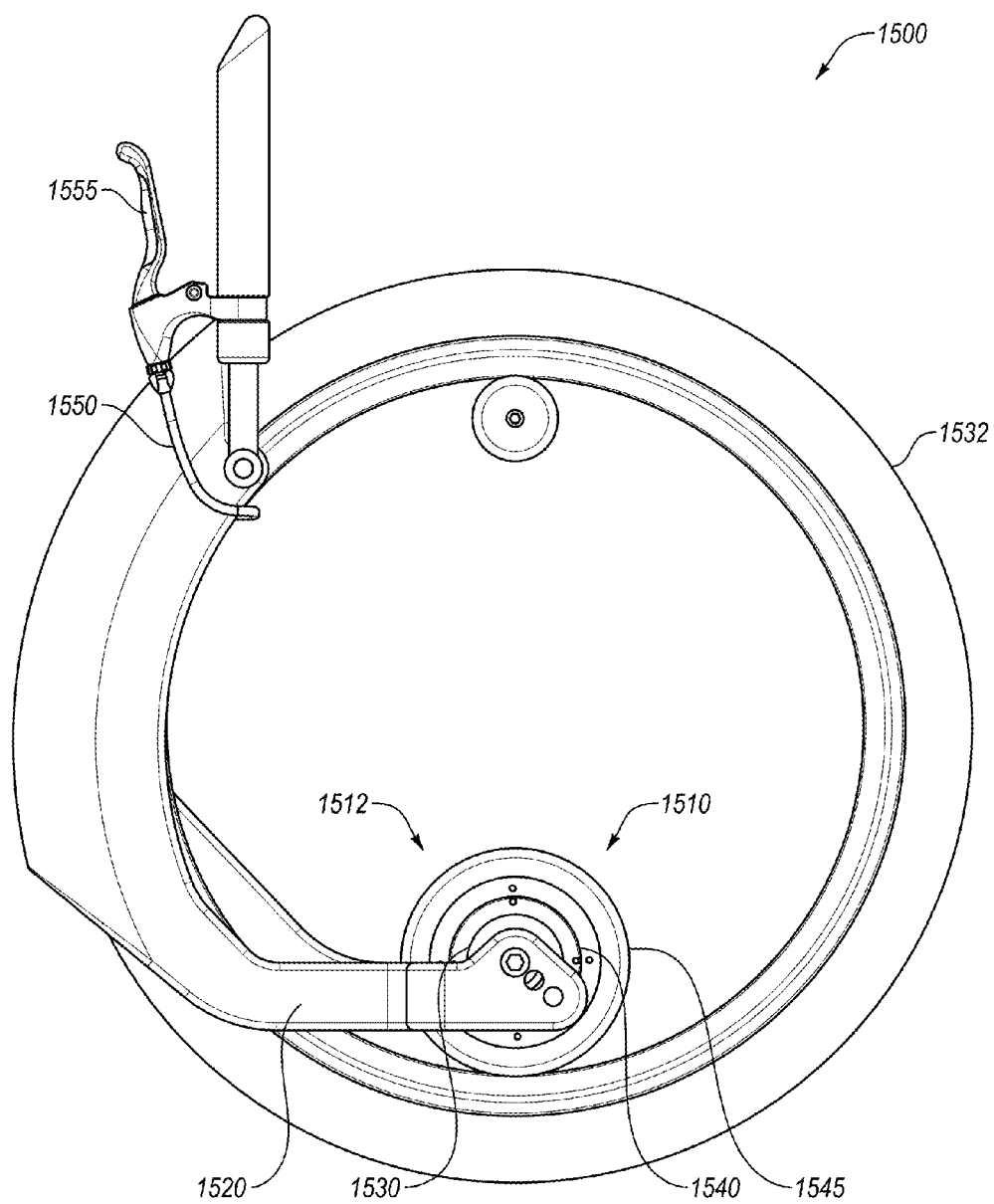
FIG. 15A illustrates an example wheel assembly and associated drive mechanism of a wheelchair.
Figure 15B:
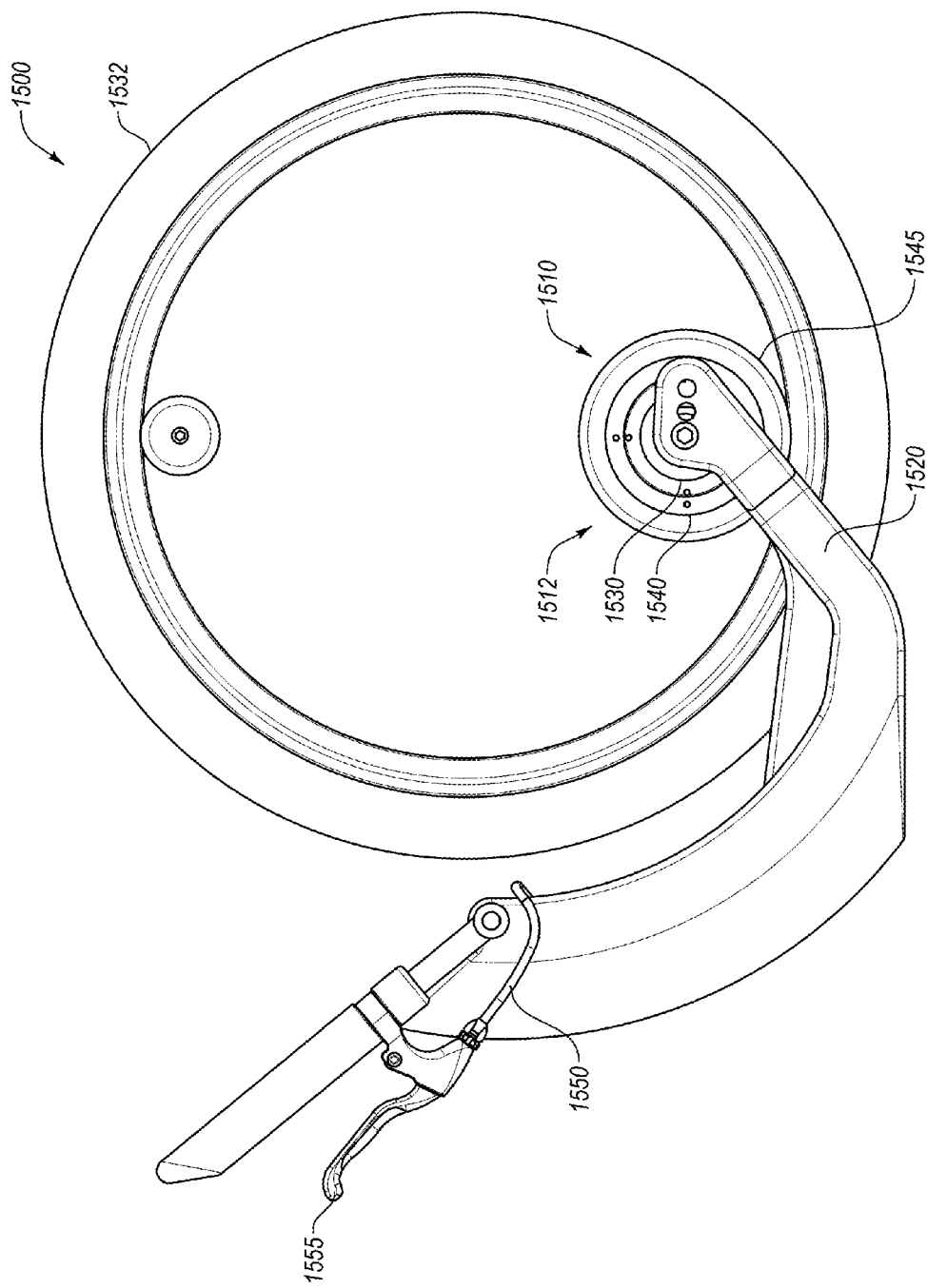
FIG. 15B illustrates the example wheel assembly and associated drive mechanism of a wheelchair of FIG. 15A.

FIGS. 15A and 15B illustrate an example wheel assembly 1500 and associated drive mechanism 1510 of a wheelchair (e.g., the wheelchair 1200 of FIGS. 12A and 12B) in accordance with at least one embodiment of the present disclosure. FIG. 15A illustrates the wheel assembly 1500 with a lever arm 1520 in a first position and FIG. 15B illustrates the lever arm 1520 in a second position. The wheel assembly 1500 may be similar or analogous to 10, 210, 310, 410, 510, 610a, 610b, 710, 810, 910, 1010, 1110, 1300, and/or 1410 of FIGS. 1, 2, 3, 4, 5, 6A, 6B, 7, 8A, 8B, 9, 10A, 10B, 11, 13, and/or 14A-D.

In some embodiments, the wheel assembly 1500 may include a drive mechanism 1510 that may be coupled to a lever arm 1520. In particular, the drive mechanism 1510 may include a ratchet mechanism 1530 that may be coupled to a first end 1521 of the lever arm 1520. The ratchet mechanism 1530 may be coupled to a planetary gear 1540 that may also be included with the drive mechanism 1510. The planetary gear 1540 may be coupled to a drive roller 1545 (which may be similar or analogous to the first roller guide assembly 1310 of FIG. 13) of the wheel assembly 1500. The lever arm 1520 may be used to provide manual power to drive the wheelchair. The drive mechanism 1510 may convert the manual power from the lever arm 1520 into a rotational force to drive the drive roller 1545, thereby driving a wheel 1532 of the wheelchair. The ratchet mechanism 1530 may be used to provide manual power from the lever arm 1520 to the drive mechanism 1510 when moved in a first direction, while allowing the lever arm 1520 to return to an original position without turning the drive mechanism 1510 in the other direction.

In some embodiments, the drive mechanism 1510 and the lever arm 1520 may be disposed proximate an inside face of the wheel assembly 1500 such that at least a portion of the lever arm 1520 may be disposed between the wheel assembly 1500 and a payload region of the corresponding wheelchair. Additionally or alternatively, in some embodiments, the lever arm 1520 may have a generally arced shape that follows the general outer circumference of the first wheel assembly 1210 towards the front of the wheel chair (e.g., the direction a user of the wheelchair is facing when sitting in the wheelchair). In some embodiments, the lever arm 1520 may have a first position that may be a starting position as illustrated in FIG. 15, with the top of the lever arm 1520 approximately half way between a twelve o'clock position and a nine o'clock position.

In some embodiments, as the lever arm 1520 is rotated from the first position to a second position (such as that illustrated in FIG. 15 B), the ratchet mechanism 1530 may drive the planetary gear 1540. For example, the lever arm 1520 may be coupled to the ratchet mechanism 1530 such that as the lever arm 1520 is pushed by a user of the wheelchair towards the front of the wheelchair (e.g., from the first position to the second position), the ratchet mechanism 1530 may be engaged such that the ratchet mechanism 1530 rotates with the lever arm 1520. The ratchet mechanism 1530 may be coupled to the planetary gear 1540 such that the rotation of the ratchet mechanism 1530 may cause the planetary gear 1540 to rotate. In these and other embodiments, rotation of the planetary gear 1540 may drive a roller guide to rotate a wheel 1532 of the wheel assembly 1500.

In addition, the ratchet mechanism 1530 may be configured such that as the lever arm 1520 is pulled back towards the first position from the second position (e.g., starting as shown in FIG. 15B), the ratchet mechanism 1530 may allow the lever arm 1520 to rotate back to the first position (e.g., ending as shown in FIG. 15A). The ratchet mechanism 1530 may also be configured such that the ratchet mechanism 1530 may not engage the planetary gear 1540 as the lever arm 1520 is moving in the direction from the second position toward the first position such that the ratchet mechanism 1530 may not cause the planetary gear 1540 to rotate. As such, the ratchet mechanism 1530 may allow for use of the lever arm 1520 in propelling the corresponding wheelchair. One example of such a ratchet mechanism may include a one-way bearing system. A set of bearings may be disposed about a member of the lever arm 1520 engaging with the planetary gear 1540. As the lever arm 1520 is rotated from the first position to the second position, the bearings lock the lever arm 1520 with the planetary gear 1540 such that movement of the lever arm 1520 also causes movement of the planetary gear 1540. As the lever arm 1520 is rotated from the second position to the first position, the bearings disengage so that the lever arm 1520 moves independently of the planetary gear 1540. Any ratchet mechanism may be used within the scope of the present disclosure.

In some embodiments, the wheelchair may include a feature to reverse the direction of the ratchet mechanism 1530, such as a cable 1550. For example, by squeezing a handle 1555, the cable may be pulled to reverse the direction of the ratchet mechanism 1530. If the cable 1550 is engaged to reverse the direction of the ratchet mechanism 1530, as the lever arm 1520 is pulled from the first position (e.g., starting as shown in FIG. 15A), the ratchet mechanism 1530 may allow the lever arm 1520 to rotate to the second position (e.g., finishing as shown in FIG. 15B) and the ratchet mechanism 1530 may be configured such that the ratchet mechanism 1530 may not engage the planetary gear 1540 as the lever arm 1520 is moving in the direction from the first position toward the second position such that the ratchet mechanism 1530 may not cause the planetary gear 1540 to rotate. The ratchet mechanism 1530 may be further configured that as the ratchet mechanism 1530 is moved from the second position (e.g., starting as shown in FIG. 15B) to the first position (e.g., ending as shown in FIG. 15A), the ratchet mechanism may engage the planetary gear 1540 such that the ratchet mechanism 1530 may cause the planetary gear 1540 to rotate as the lever arm 1520 is moving in the direction from the second position to the first position. As such, the ratchet mechanism 1530 in the reverse direction may allow for use of the lever arm 1520 in propelling the corresponding wheelchair in a reverse direction. When, the ratchet mechanism 1530 is operating in a reverse direction configuration, the planetary gear 1540 may rotate in a reverse direction such that the driven roller guide 1545 and the wheel 1532 may be propelled in the reverse direction as well.

Modifications, additions, or omissions may be made to FIGS. 15A and 15B without departing from the scope of the present disclosure. For example, the wheel assembly 1500 and the associated drive mechanism 1510 may include more or fewer elements than those illustrated and described in the present disclosure. For example, the drive mechanism 1510 may include any number of gears, connections, or other mechanical joints when transferring the motion of the lever arm 1520 to driving of the roller guide assembly. As an additional example, the lever arm 1520 may take any shape or form, such as a straight lever from the starting position to the ratchet mechanism 1530.

FIG. 16 illustrates a view of an example drive mechanism 1600 of a wheelchair (e.g., the wheelchair 1200 of FIGS. 12A and 12B) in accordance with at least one embodiment of the present disclosure. The drive mechanism 1600 may be coupled to a lever arm 1620 (which may be similar or analogous to the lever arm 1520 of FIGS. 15A and 15B) that may be coupled to a ratchet mechanism 1630 (which may be similar or analogous to the ratchet mechanism 1530 of FIGS. 15A and 15B). The ratchet mechanism 1630 may be coupled to a planetary gear 1640 (which may be similar or analogous to the planetary gear 1540 of FIGS. 15A and 15B). The planetary gear 1640 may be coupled to a drive roller 1624 of a wheel assembly.

As described with similar components in FIGS. 15A and 15B, as the lever arm 1620 is rotated, the ratchet mechanism 1630 may also rotate, causing the planetary gear 1640 to rotate. Rotation of the planetary gear 1640 may rotate the drive roller 1624. Static friction between the drive roller 1624 and a rim of the wheel assembly may rotate the rim such that rotation of drive roller 1624 may cause the wheel assembly to roll along the ground. Thus, by using the lever arm 1620, the wheel assembly may roll along the ground.

Modifications, additions, or omissions may be made to FIG. 16 without departing from the scope of the present disclosure. For example, the drive mechanism 1600 and associated drive roller 1624 may include more or fewer elements than those illustrated and described in the present disclosure. For example, the drive mechanism 1600 may include any number of gears, connections, or other mechanical joints when transferring the motion of the lever arm 1620 to driving of the drive roller 1624. As an additional example, the lever arm 1620 may take any shape or form, such as a straight lever from the starting position to the ratchet mechanism 1630.

FIG. 17 illustrates an example wheel assembly 1700 and associated drive mechanism of a wheelchair in accordance with at least one embodiment of the present disclosure. The wheel assembly 1700 may be similar or analogous to 10, 210, 310, 410, 510, 610a, 610b, 710, 810, 910, 1010, 1110, 1300, 1410, and/or 1500 of FIGS. 1, 2, 3, 4, 5, 6A, 6B, 7, 8A, 8B, 9, 10A, 10B, 11, 13, 14A-D, and/or 15. The wheel assembly 1700 may include a tire 1732 (which may be analogous to the tire 32 of FIG. 1), a centerless rim 1718 (which may be analogous to the centerless rim 18 of FIG. 1), and an exoskeleton plate 1713 (which may be analogous to the exoskeleton plate 13 of FIG. 1). The wheel assembly 1700 may include a roller guide assembly 1710 (which may be similar or analogous to the first friction roller guide assembly 597 of FIG. 5).

In some embodiments, the wheel assembly 1700 may include an engine or a motor 1720 with an output shaft coupled to a first output gear 1730 (e.g., a sprocket, pulley, right-angle gear, etc.). In some embodiments, the output gear 1730 may be coupled with a chain, drive shaft, or belt 1740, which may be operably coupled with a second output gear 1750 (e.g., a sprocket, pulley, right-angle gear, etc.). For example, the first output gear 1730 may be configured to provide an engaging member to output motive force of the motor 1720. The belt 1740 may be coupled to the first output gear 1730 to change the location of the output motive force of the motor 1720 such that as the belt is drawn around the first output gear 1730, a corresponding movement is experienced at the opposite end of the belt. The second output gear 1750 may be configured to apply the motive force from the belt to the location of the second output gear 1750. In some embodiments, the second output gear 1750 may be operably coupled with a bridging shaft, such as, for example, a bridging driven shaft of the roller guide assembly 1710 (which may be similar or analogous to the bridging driven shaft 695 of the first friction roller guide assembly 697a of FIG. 6A).

In some embodiments, as the motor 1720 drives the first right-angle gear 1730, it may rotate the belt 1740. Rotation of the belt 1740 may cause the second right-angle gear 1750 to rotate. Rotation of the second right-angle gear 1750 may drive the roller guide assembly 1710. In these and other embodiments, motive force of the motor 1720 may drive the roller guide assembly 1710 such that a roller guide of the roller guide assembly may roll along the centerless rim 1718. For example, static friction between the roller guide of the assembly 1710 and the centerless rim 1718 may facilitate rotation of the roller guide causing a corresponding rotation of the centerless rim 1718, which may drive the wheel assembly 1700.

In some embodiments, a control may be provided to a user of the wheelchair such that as the user operates the control, the speed and/or direction of the motor 1720 may be varied. For example, the user may be provided with a joystick control, a series of buttons with directions and/or speeds, a touch screen control interface, voice-activated controls, a brain to computer interface, etc. Additionally or alternatively, the user may be provided with controls as described with respect to FIGS. 23A-23C.

Modifications, additions, or omissions may be made to FIG. 17 without departing from the scope of the present disclosure. For example, the wheel assembly 1700 may include more or fewer elements than those illustrated and described in the present disclosure. For example, the wheel assembly 1700 may include any number of gears, connections, or other mechanical joints when transferring the motive force of the motor 1720 to driving of the roller guide assembly 1710. As an additional example, any number of motors or engines may be used to drive the roller guide assembly 1710. As an additional example, a fuel source, battery pack, etc. may also be included in the wheel assembly 1700 to power the engine or motor 1720.

FIG. 18 illustrates an example wheel assembly 1800 and associated drive mechanism 1810 of a wheelchair in accordance with at least one embodiment of the present disclosure. In particular, FIG. 18 illustrates a hybrid system including both a manual portion of the drive mechanism 1810 (for example, as illustrated in FIGS. 15A and 15B) and a powered portion of the drive mechanism 1810 (for example, as illustrated in FIG. 17). The wheel assembly 1800 may be similar or analogous to the wheel assemblies 10, 210, 310, 410, 510, 610a, 610b, 710, 810, 910, 1010, 1110, 1300, 1410, 1500, and/or 1700 of FIGS. 1, 2, 3, 4, 5, 6A, 6B, 7, 8A, 8B, 9, 10A, 10B, 11, 13, 14A-D, 15A and 15B, and/or 17.

The manual portion of the drive mechanism 1810 may include a lever arm 1820 (which may be similar or analogous to the lever arm 1520 of FIGS. 15A and 15B). The lever arm 1820 may be coupled to a ratchet mechanism 1830 (which may be similar or analogous to the ratchet mechanism 1530 of FIGS. 15A and 15B). The ratchet mechanism 1830 may be coupled to a planetary gear 1840 (which may be similar or analogous to the planetary gear 1540 of FIGS. 15A and 15B). In these and other embodiments, the drive mechanism 1810 may include a cable 1850 for reversing the direction of the ratchet mechanism 1830 (which may be similar or analogous to the cable 1550 of FIGS. 15A and 15B).

The powered portion of the drive mechanism 1810 may include a motor 1860 (which may be similar or analogous to the motor 1720 of FIG. 17). An output shaft of the motor 1860 may be coupled to a first sprocket, first pulley, or first right-angle gear 1870 (which may be similar or analogous to the first right-angle gear 1730 of FIG. 17). In some embodiments, the first right-angle gear 1870 may be coupled with a chain, drive shaft, or belt 1880 (which may be similar or analogous to the belt 1740 of FIG. 17). The belt 1880 may be operably coupled with the planetary gear 1840 and/or the ratchet mechanism 1830.

In some embodiments, a gear of the planetary gear 1840 to which the ratchet mechanism 1830 is coupled may have a width sufficient such that the belt 1880 may also be coupled with the same gear of the planetary gear 1840. For example, the ratchet mechanism 1830 may couple with a first end of the gear of the planetary gear 1840, and the belt 1880 may go around a middle portion of the gear of the planetary gear 1840, and the planetary gear 1840 may be configured with a sufficient width to allow both couplings.

In some embodiments, manual driving of the wheel assembly 1800 via the lever arm 1820 may be supplemented by the motive force of the motor 1860. For example, the motor 1860 may stop operating while the lever arm 1820 is driving the roller guide assembly, but as the lever arm 1820 is being rotated back towards a starting position and no longer driving the roller guide assembly, the motor 1860 may engage and continue to drive the roller guide assembly. As another example, the motor 1860 may provide additional torque to the planetary gear 1840, which may make it easier for a user of the wheelchair to push the lever arm 1820. In these and other embodiments, controls such as a potentiometer may be coupled to the motor 1860 to control the amount of driving power that may be output by the motor 1860. The potentiometer may be controlled or adjusted independently to compensate for physical or neurological disabilities. For example, for a person suffering from tremors, hemispherical paralysis, etc., directional control may be compensated for independently by the potentiometer for one or more sides of the wheelchair. In these and other embodiments, the potentiometer may be controlled via an on-board device, software, or controller, or via a remote device or server (e.g., a cloud-based control system).

Modifications, additions, or omissions may be made to FIG. 18 without departing from the scope of the present disclosure. For example, the wheel assembly 1800 may include more or fewer elements than those illustrated and described in the present disclosure. For example, the drive mechanism 1810 may include any number of gears, connections, or other mechanical joints when transferring the motive force of the motor 1860 to driving of the roller guide assembly. As an additional example, a fuel source, battery pack, etc. may also be included in the wheel assembly 1800 to power the engine or motor 1860. As another example, the drive mechanism 1810 may include any number of gears, connections, or other mechanical joints when transferring the motion of the lever arm 1820 to driving of the roller guide assembly. As an additional example, the lever arm 1820 may take any shape or form, such as a straight lever from the starting position to the ratchet mechanism 1830.

Figure 19:
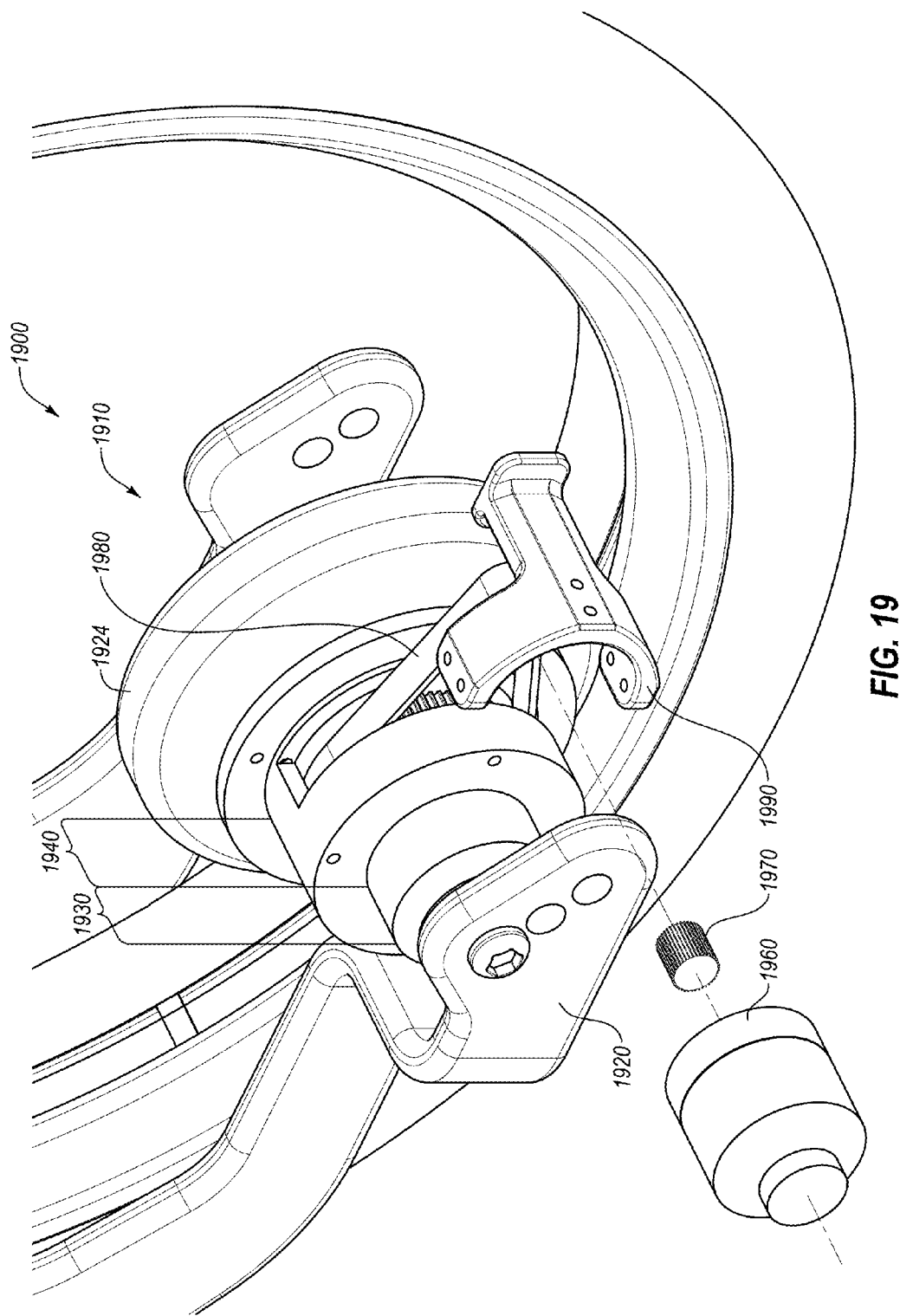
FIG. 19 illustrates an exploded view of an example wheel assembly and associated drive mechanism of a wheelchair.

FIG. 19 illustrates an exploded view of example wheel assembly 1900 and associated drive mechanism 1910 of a wheelchair in accordance with at least one embodiment of the present disclosure. FIG. 19 may be similar to the embodiment illustrated in FIG. 18, but may provide an alternative view of how various components are connected. In particular, FIG. 19 illustrates a hybrid system including both a manual portion of the drive mechanism 1910 (for example, as illustrated in FIG. 15) and a powered portion of the drive mechanism 1910 (for example, as illustrated in FIG. 17). The wheel assembly 1900 may be similar or analogous to the wheel assemblies 10, 210, 310, 410, 510, 610*a*, 610*b*, 710, 810, 910, 1010, 1110, 1300, 1410, 1500, 1700, and/or 1800 of FIGS. 1, 2, 3, 4, 5, 6A, 6B, 7, 8A, 8B, 9, 10A, 10B, 11, 13, 14A-D, 15, 17, and/or 18.

The manual portion of the drive mechanism 1910 may include a lever arm 1920 (which may be similar or analogous to the lever arm 1520 of FIG. 15). The lever arm 1920 may be coupled to a ratchet mechanism 1930 (which may be similar or analogous to the ratchet mechanism 1530 of FIG. 15). The ratchet mechanism 1930 may be coupled to a planetary gear 1940 (which may be similar or analogous to the planetary gear 1540 of FIG. 15). The powered portion of the drive mechanism 1910 may include a motor 1960 (which may be similar or analogous to the motor 1720 of FIG. 17). An output shaft of the motor 1960 may be coupled to a first sprocket, first pulley, or first right-angle gear 1970 (which may be similar or analogous to the first right-angle gear 1730 of FIG. 17). In some embodiments, the first right-angle gear 1970 may be coupled with a chain, drive shaft, or belt 1980 (which may be similar or analogous to the belt 1740 of FIG. 17). The belt 1980 may be operably coupled with the planetary gear 1940. The powered portion of the drive mechanism 1910 may also include a mounting bracket 1990 which may support the motor 1960 and be coupled to the motor 1960 and an exoskeleton plate of the wheel assembly 1900.

Modifications, additions, or omissions may be made to FIG. 19 without departing from the scope of the present disclosure. For example, the wheel assembly 1900 may include more or fewer elements than those illustrated and described in the present disclosure.

Figure 20:
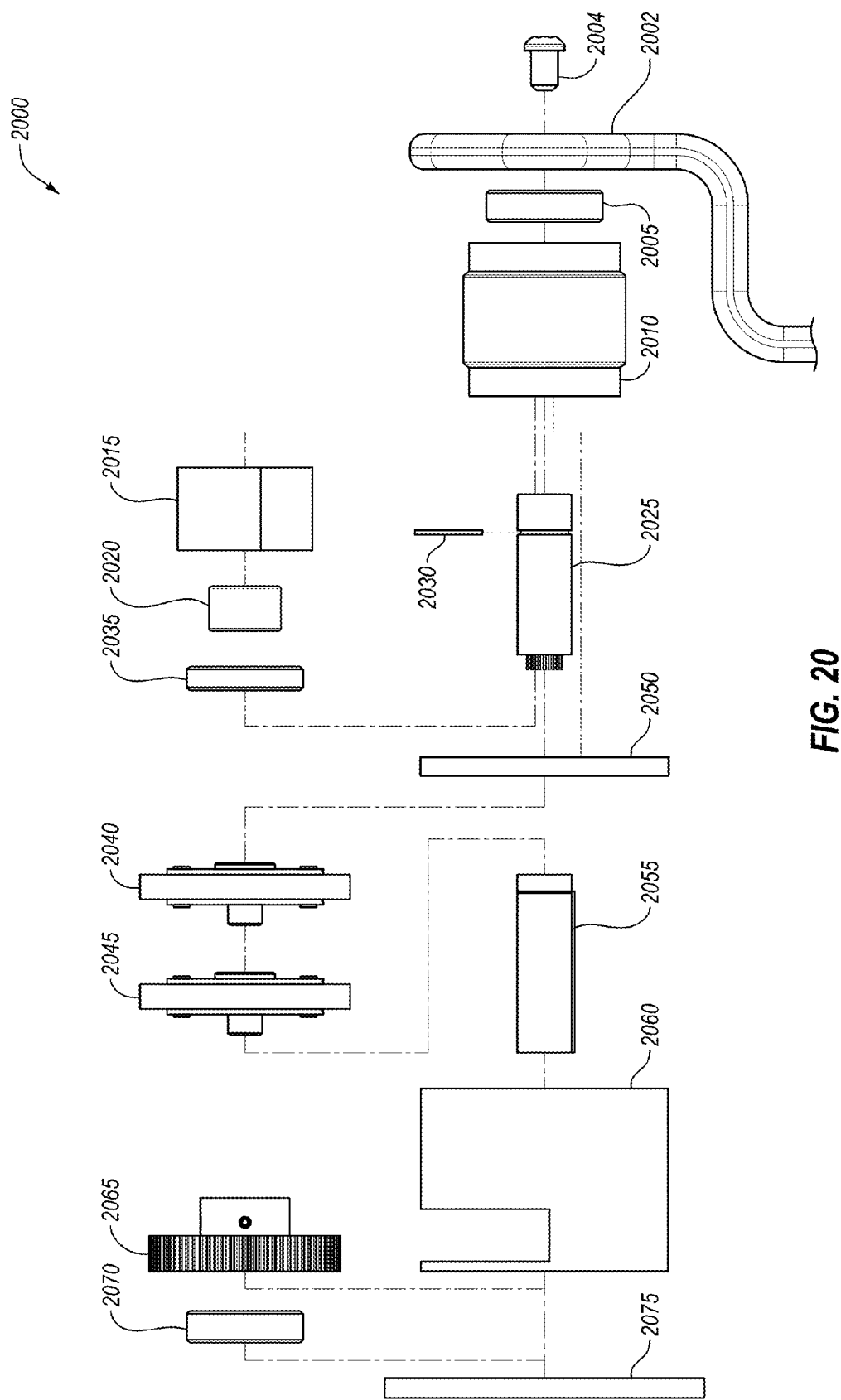
FIG. 20 illustrates an exploded view of an example drive mechanism.

FIG. 20 illustrates an exploded view of an example drive mechanism 2000, in accordance with at least one embodiment of the present disclosure. The drive mechanism 2000 may be similar or analogous to the drive mechanism 1810 of FIG. 18 and 1910 of FIG. 19. The operation of the drive mechanism 2000 may also be similar to the drive mechanism 1810 of FIG. 18 and 1910 of FIG. 19, and FIG. 20 may be provided to illustrate how various components of the drive mechanism 2000 may be connected.

The drive mechanism 2000 may include an outer casing plug 2005 that may be coupled to an outer casing 2010 of the ratchet mechanism. The outer casing 2010 may include a gap through which a lever interface component 2015 may protrude. A lever arm 2002 (e.g., the lever arms described above) may couple with the lever interface component 2015 (e.g., by being bolted via bolt 2004 to the lever interface component 2015). A ratchet gear assembly 2020 may be disposed within the lever interface component 2015 such that rotation of the lever interface component 2015 (e.g., through movement of the lever arm) may cause the ratchet output gear 2025 to rotate. For example, the ratchet gear assembly 2020 may include a one-way bearing system as described with respect to FIGS. 15A and 15B. Using the ratchet gear assembly 2020, as the lever arm 2002 is rotated in one direction, the ratchet gear assembly 2020 may cause rotation of the ratchet output gear 2025 while rotation in an opposite direction may not cause rotation of the ratchet output gear 2025.

A washer 2030 may be disposed within the lever interface component 2015 to lock the lever interface component 2015 and the ratchet gear assembly 2020 in relative position with each other. Another outer casing plug 2035 may be disposed proximate an output end of the ratchet output gear 2025 to enclose the ratchet components (e.g., the ratchet gear assembly 2020). The ratchet output gear 2025 may protrude out of the outer casing 2010 and interface with a first planetary gear component 2040 such that rotation of the ratchet output gear 2025 may cause the first planetary gear component 2040 to rotate. The first planetary gear component 2040 may be coupled to a second planetary gear component 2045.

The ratchet output gear 2025 may protrude through a central casing member 2050. The central casing member may interface with the outer casing 2010 of the ratchet mechanism and a slotted casing member 2060. The slotted casing member 2060 may encase the first and second planetary gear components 2040, 2045 and an output axle 2055. The output axle 2055 may be coupled to the second planetary gear assembly 2045 as well as a motor interface gear 2065. The motor interface gear 2065 may occupy the slot of the slotted casing member 2060. A belt, chain, or driveshaft may engage the motor interface gear 2065 through the slot of the slotted casing member 2060. The slotted casing member may be capped by an inside casing member 2075 and an inside casing plug 2070. The output axle (coupled to both the second planetary gear component 2040 and the motor interface gear 2065) may protrude out of the inside casing member 2075 to be coupled with a drive roller.

In some embodiments, as the output axle 2055 is rotated, a drive roller (such as the drive rollers described above) may also be caused to rotate. In these and other embodiments, the output axle 2055 may be keyed to facilitate locking with the second planetary gear component 2045, the motor interface gear 2065, and/or the drive roller such that the components may move as a single body.

Modifications, additions, or omissions may be made to FIG. 20 without departing from the scope of the present disclosure. For example, the drive mechanism 2000 may include more or fewer elements than those illustrated and described in the present disclosure.

Figure 21:
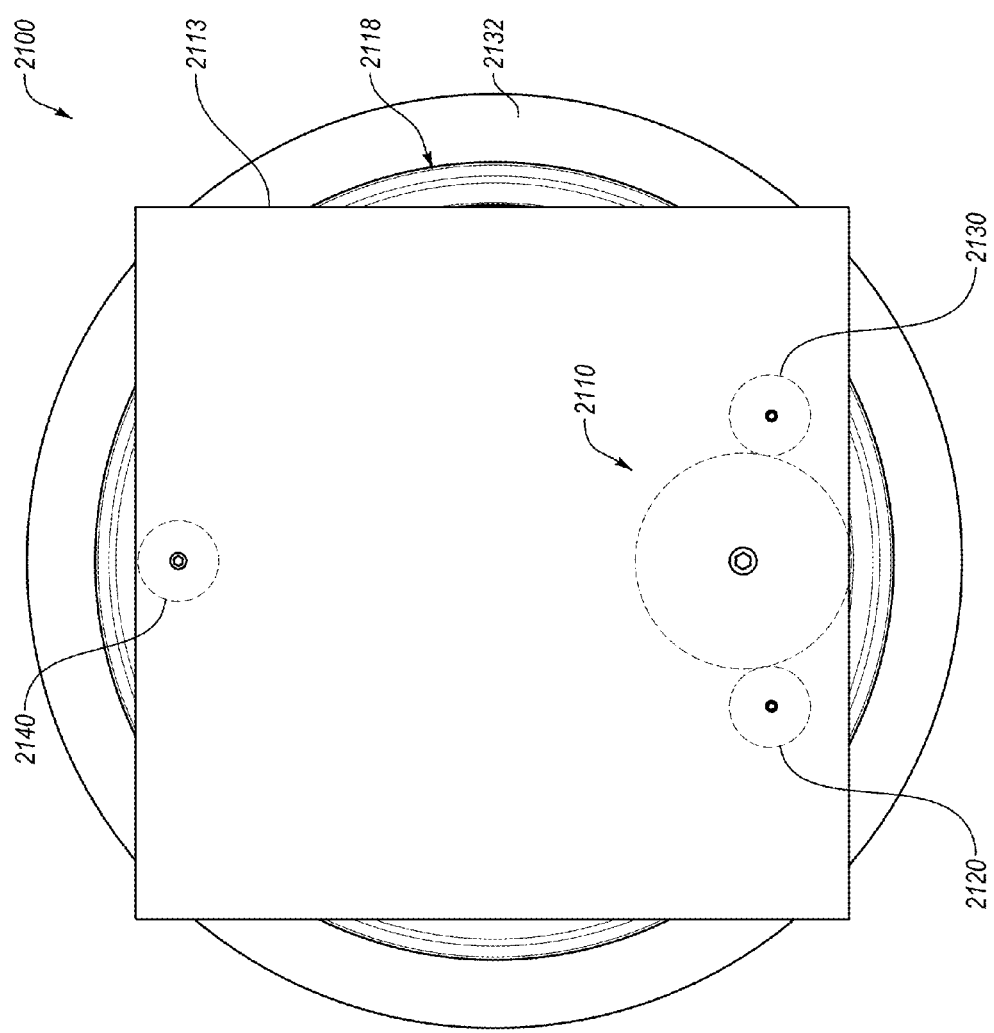
FIG. 21 illustrates an example wheel assembly.

FIG. 21 illustrates an example wheel assembly 2100 in accordance with at least one embodiment of the present disclosure. FIG. 21 may illustrate an alternative configuration of an exoskeleton plate 2113.

The wheel assembly 2100 may be similar or analogous to the wheel assemblies 10, 210, 310, 410, 510, 610a, 610b, 710, 810, 910, 1010, 1110, 1300, 1410, 1500, 1700, and/or 1800 of FIGS. 1, 2, 3, 4, 5, 6A, 6B, 7, 8A, 8B, 9, 10A, 10B, 11, 13, 14A-D, 15, 17, and/or 18. The wheel assembly may include a first roller guide assembly 2110 (which may be similar or analogous to the first roller guide assembly 1310 of FIG. 13), a second roller guide assembly 2120 (which may be similar or analogous to the second roller guide assembly 1320 of FIG. 13), a third roller guide assembly 2130 (which may be similar or analogous to the third roller guide assembly 1330 of FIG. 13), and a fourth roller guide assembly 2140 (which may be similar or analogous to the fourth roller guide assembly 1340 of FIG. 13). The wheel assembly 2100 may include a tire 2132 (which may be similar or analogous to the tire 32 of FIG. 1) and a centerless rim 2118 (which may be similar or analogous to the centerless rim 18 of FIG. 1).

As illustrated in FIG. 21, the exoskeleton plate 2113 may be rectangular in shape, including, for example, a square. The exoskeleton plate 2113 may take any shape or form that provides support for the roller guide assemblies. For example, the exoskeleton plate 2113 may extend to each of the areas where a roller guide assembly is located. For example, the exoskeleton plate 2113 extends to cover each of the first, second, third and fourth roller guide assemblies 2110, 2120, 2130, 2140. Additionally or alternatively, the exoskeleton plate 2113 may not extend to a particular roller guide assembly but may include a support member or other component extending beyond the exoskeleton plate 2113 to provide support to the particular roller guide. In these and other embodiments, the exoskeleton plate 2113 may be produced from any material, including wood, metal, plastic, etc.

Modifications, additions, or omissions may be made to FIG. 21 without departing from the scope of the present disclosure. For example, the wheel assembly 2100 may include more or fewer elements than those illustrated and described in the present disclosure. As an additional example, the exoskeleton plate 2113 may take any shape or form (e.g., an octagon, a hexagon, an oblong rectangle, an irregular shape, etc.).

Figure 22:
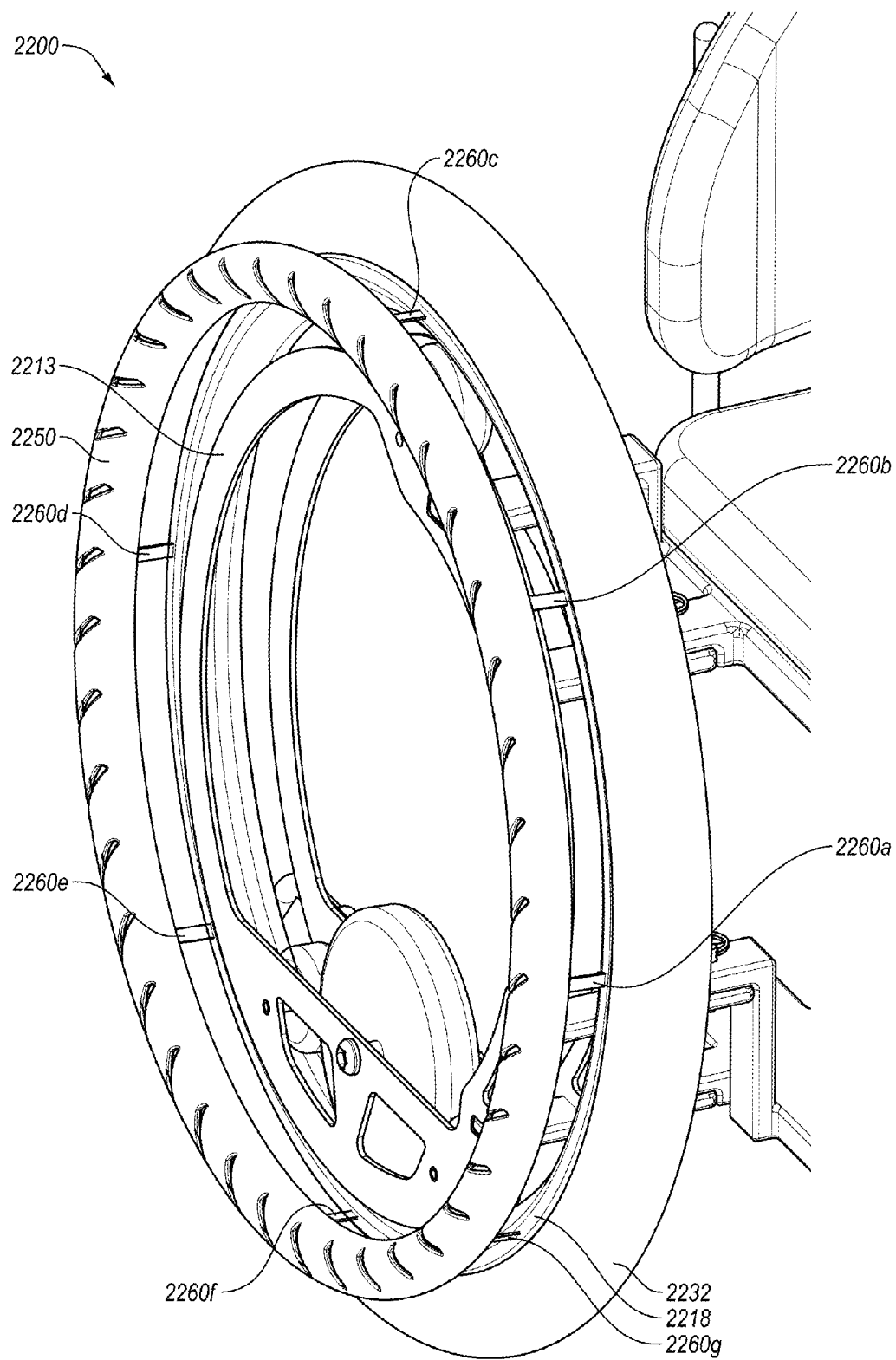
FIG. 22 illustrates an example wheel assembly with an example hand rail.

FIG. 22 illustrates an example wheel assembly 2200 with an example hand rail 2250. The wheel assembly 2200 may be similar or analogous to the wheel assemblies 10, 210, 310, 410, 510, 610a, 610b, 710, 810, 910, 1010, 1110, 1300, 1410, 1500, 1700, 1800, and/or 2100 of FIGS. 1, 2, 3, 4, 5, 6A, 6B, 7, 8A, 8B, 9, 10A, 10B, 11, 13, 14A-D, 15, 17, 18, and/or 21. The wheel assembly 2200 may include a tire 2232 (which may be similar or analogous to the tire 32 of FIG. 1), a centerless rim 2218 (which may be similar or analogous to the centerless rim 18 of FIG. 1), and a first exoskeleton plate 2213 (which may be similar or analogous to the first exoskeleton plate 13 of FIG. 1).

The wheel assembly 2200 may additionally include the hand rail 2250 that may be coupled to the centerless rim 2218 such that the hand rail 2250 and the tire 2232 may move as a unitary body. Stated another way, a motion or force on the hand rail 2250 may cause a corresponding motion or force on the tire 2232. For example, a user of a wheelchair including the wheel assembly 2200 may grasp the hand rail 2250 and turn the hand rail 2250, which may in turn cause the tire 2232 to rotate, providing a motive force to the wheelchair.

Figure 23A:
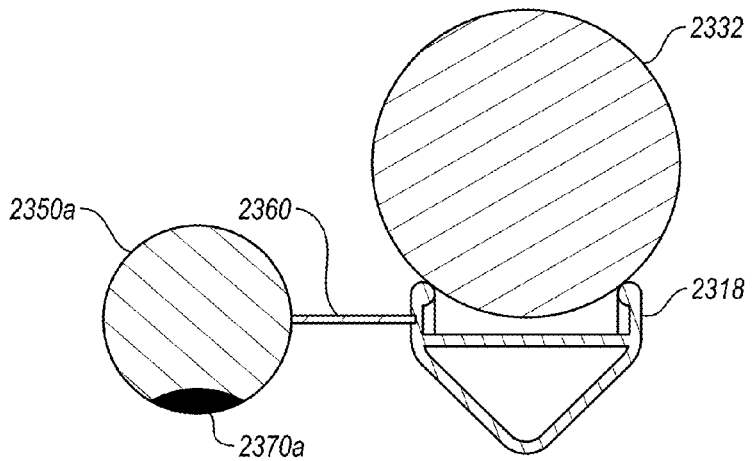
FIGS. 23A, 23B, and 23C illustrate cutaway views of example hand rails.
Figure 23B:
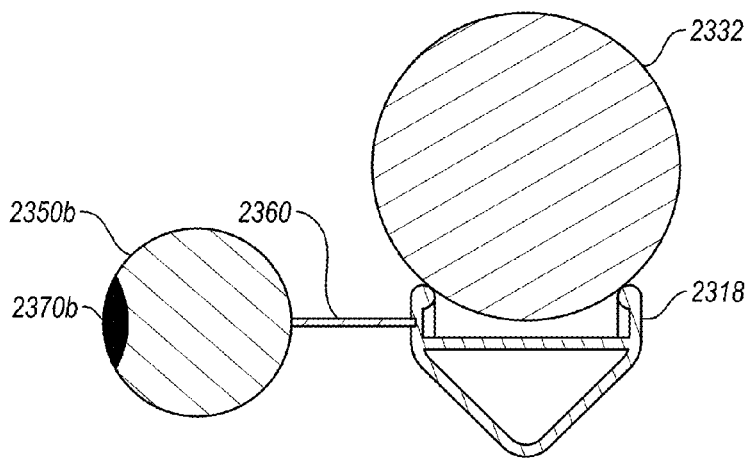
Figure 23C:
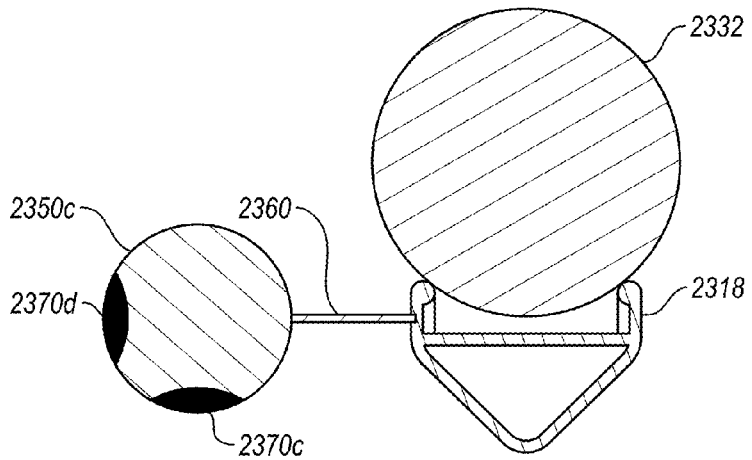

The hand rail 2250 may be coupled to the centerless rim 2218 along one side of the centerless rim 2218 via one or more posts 2260 (such as the posts 2260a-2260f) (examples of such a coupling are also illustrated in FIGS. 23A-23C). The posts 2260 may be placed at regular intervals around the wheel assembly 2200. The posts 2260 may span from the hand rail 2250 to the centerless rim 2218 and may be coupled to the centerless rim 2218. In these and other embodiments, the posts 2260 may be coupled in such a way and in such a location that the posts 2260 do not cause any interference with any roller guides that may roll along the centerless rim 2218.

While only one wheel assembly 2200 is illustrated, it will be appreciated that a wheelchair may include a hand rail (such as the hand rail 2250) on both sides of a wheel chair. For example, a wheelchair may be configured so that a user of the wheelchair may use hand rails on both sides of the wheelchair to drive the wheelchair.

Modifications, additions, or omissions may be made to FIG. 22 without departing from the scope of the present disclosure. For example, the wheel assembly 2200 may include more or fewer elements than those illustrated and described in the present disclosure.

FIGS. 23A, 23B, and 23C illustrate cutaway views of example hand rails 2350. In some embodiments, a wheelchair may include a hand control 2370 on the handrail 2350 to signal a motor of the wheelchair to provide motive force to the wheelchair. For example, the hand control may cause a motor of the wheelchair to drive the wheelchair when a user of the wheelchair activates the hand control 2370.

As illustrated in FIG. 23A, a hand rail 2350a (which may be similar or analogous to the handrail 2250 of FIG. 22) may be coupled to a centerless rim 2318 (which may be similar or analogous to the centerless rim 18 of FIG. 1) via one or more posts 2360 (which may be similar or analogous to the posts 2260 of FIG. 22). A tire 2332 (which may be similar or analogous to the tire 32 of FIG. 1) may be coupled to the centerless rim 2318.

The hand rail 2350a may include a hand control 2370a along at least a portion of the hand rail 2350a. In some embodiments, the hand control 2370a may be offset approximately ninety degrees from the post 2360. In these and other embodiments, the hand control 2370a may include a touch activated panel or surface, a touch-responsive material, one or more manual buttons, an electrically conductive panel or surface, an electrically conductive material, any combinations thereof, etc. In some embodiments, the hand control 2370a may go along the entire circumference of the hand rail 2350a, along a portion of the circumference of the hand rail 2350a, or intermittent segments along the circumference of the hand rail 2350a.

For example, as a user of a wheelchair including the hand rail 2350a uses the hand rail 2350a to provide motive force to the wheelchair, the user grasping the hand rail 2350a may invoke the hand control 2370a. By invoking the hand control 2370a, the user may cause a motor associated with the wheelchair to provide motive force to the wheelchair. For example, the motor may be coupled to a drive roller as described and illustrated with respect to FIG. 17.

FIG. 23B may be similar or analogous to FIG. 23A, with a variation in the placement of the hand control 2370b on the hand rail 2350b. FIG. 23A includes the hand control 2370a offset from the post 2360 by roughly ninety degrees. FIG. 23B includes the hand control 2370b offset from the post 2360 by roughly one hundred and eighty degrees. With the embodiment illustrated in FIG. 23A, a user of a wheelchair may use their fingers when grasping the hand rail 2350a to touch, press, or otherwise invoke the hand control 2370a when desired. With the embodiment illustrated in FIG. 23B, a user of the wheelchair may use their palm or fingers to touch, press, or otherwise invoke the hand control 2370b. Additionally, with the placement of the hand control 2370b, a user may to touch, press, or otherwise invoke the hand control 2370b nearly every time the hand rail 2350b is used.

FIG. 23C may be similar or analogous to FIGS. 23A and 23b, with a variation in the hand controls 2370c and 2370d on the hand rail 2350c. As illustrated in FIG. 23C, in some embodiments the hand rail 2350c may include more than one hand control 2370, such as the hand controls 2370c and 2370d. In these and other embodiments, the hand controls 2370c and 2370d may operate such that either may activate the motor, or both must be invoked simultaneously to invoke the motor. For example, by including the hand control 2370c and 2370d, incidental contact with either of the touch controls 2370c and 2370d may not activate the motor.

In some embodiments, the hand controls 2370 may include a selectively responsive material. For example, the hand controls may only be responsive to particular materials, such as skin, a particular type of metal woven into a glove worn by the user, etc.

The hand controls 2370 may be communicatively coupled with a motor associated with the wheel of the wheelchair. For example, there may be a wired electrical connection from the hand controls 2370 to the motor, or there may be a wireless connection between the hand controls and/or associated circuitry and the motor.

Modifications, additions, or omissions may be made to FIGS. 23A, 23B, and 23C without departing from the scope of the present disclosure. For example, the embodiments illustrated may include more or fewer elements than those illustrated and described in the present disclosure. As an additional example, the hand rail 2350 may take any shape or profile, and the hand control 2370 may take any shape or profile.

Figure 24:
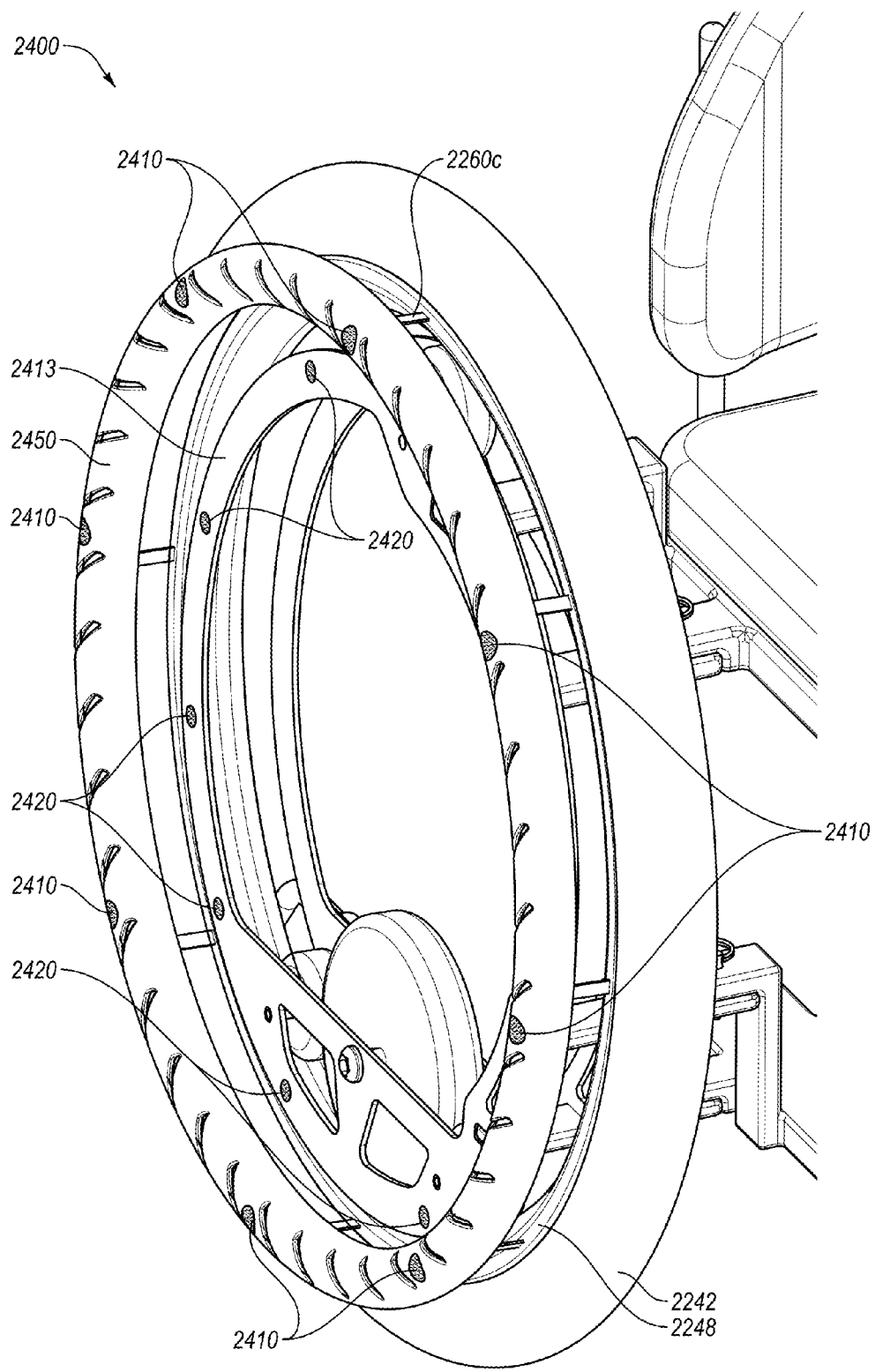
FIG. 24 illustrates an example wheel assembly with an example hand rail with various sensors.

FIG. 24 illustrates an example wheel assembly 2400 with an example hand rail 2450 with various sensors. The wheel assembly 2400 may be similar or analogous to the wheel assemblies 10, 210, 310, 410, 510, 610a, 610b, 710, 810, 910, 1010, 1110, 1300, 1410, 1500, 1700, 1800, 2100, and/or 2200 of FIGS. 1, 2, 3, 4, 5, 6A, 6B, 7, 8A, 8B, 9, 10A, 10B, 11, 13, 14A-D, 15, 17, 18, 21, and/or 22. The wheel assembly 2400 may include a tire 2432 (which may be similar or analogous to the tire 32 of FIG. 1), a centerless rim 2418 (which may be similar or analogous to the centerless rim 18 of FIG. 1), and a first exoskeleton plate 2413 (which may be similar or analogous to the first exoskeleton plate 13 of FIG. 1). The hand rail 2450 may be similar or analogous to the hand rail 2250 of FIG. 22.

In some embodiments, there may be one or more sensors 2410 disposed along the hand rail 2450. Additionally or alternatively, there may be one or more sensors 2420 disposed along the first exoskeleton plate 2413. The sensors 2410 and the sensors 2420 may include any device, component, or combination thereof configured to sense position, velocity, acceleration, or any combinations thereof. For example, the sensors 2410 and the sensors 2420 may include a capacitive sensor, a potentiometer, a proximity sensor, an inductive sensor, an accelerometer, a gyroscope, a magnetometer, etc., or any combinations thereof. In some embodiments, the sensors 2410 and the sensors 2420 may work together to determine any of position, velocity, and/or acceleration.

In some embodiments, the sensors 2410 and/or the sensors 2420 may be utilized to control the amount of power supplied to a motor associated with a wheel of a wheelchair. For example, if the hand rail 2450 is rotated relatively slowly by a user, causing a low acceleration, a relatively low amount of power may be provided to the motor. As another example, if the hand rail 2450 is rotated relatively quickly by a user, causing a larger acceleration, a larger amount of power may be provided to the motor. As another example, more power may be provided by the motor when the wheel 2242 is turning slowly and less power may be provided by the motor when the wheel 2242 is turning quickly.

Modifications, additions, or omissions may be made to FIG. 24 without departing from the scope of the present disclosure. For example, the wheel assembly 2400 may include more or fewer elements than those illustrated and described in the present disclosure. As another example, only a single sensor on the hand rail 2450, the wheel 2432, or the centerless rim 2418 may be used to sense any of position, velocity, or acceleration. As an additional example, the control based on the sensors may also be coupled to and applied to an electronically controlled braking system, which may include the motor running in reverse.

Slippage Control

FIG. 25A illustrates an example of a centerless wheel assembly 2510a able to invoke a corrective action, in accordance with one or more embodiments of the present disclosure. The centerless wheel assembly 2510a may be similar or comparable to the wheel assembly 710 of FIG. 7, and may illustrate one embodiment of implementing a corrective action in response to slippage. The wheel 2532, the rim 2518 and the computing device 2545 may be similar or comparable to the wheel 732, the rim 718, and the computing device 745, respectively.

In some embodiments, the roller guide 2599a may be disposed on an extending device 2520. The extending device 2520 may be in communication with the computing device 2545. The computing device 2545 may be configured to send signals to cause the extending device 2520 to extend or retract the roller guide 2599a relative to the rim 2518. For example, if slippage is detected, the computing device 2545 may extend the extending device 2520 towards the rim 2518 such that the roller guide 2599a is further compressed against the rim 2518, increasing the likelihood of the slippage ending. After the slippage has ended, the extending device 2520 may be retracted back to an original position.

The extending device 2520 may include any device or component configured to mechanically displace the roller guide 2599a towards and/or away from the rim 2518 in a controlled manner. For example, the extending device 2520 may include one or more spring-loaded pivots, pneumatic arms, telescoping arms, etc. In some embodiments, the extending device 2520 may be configured to receive a signal from the computing device 2545 and adjust the amount of extension of the extending device 2520 based on the signal. For example, the computing device 2545 may monitor a variety of sensors of the wheel assembly 2510a. After detecting that slippage has occurred (e.g., because the roller guide 2599a is spinning faster than normal compared to the speed of the rim 2518), the computing device 2545 may send a message to the extending device 2520 to move the roller guide 2599a closer to the rim 2518 as a corrective action. For example, the signal may direct the extending device 2520 to compress a spring, forcing the roller guide 2599a towards the rim 2518. By forcing the roller guide 2599a towards the rim 2518, the roller guide 2599a may overcome the slippage.

In some embodiments, forcing the roller guide 2599a towards the rim 2518 may be a part of the corrective action. For example, the corrective action may include decreasing or removing power to the roller guide 2599a. In these and other embodiments, the combination of decreasing or removing power in addition to forcing the roller guide 2599a towards the rim 2518 may increase the likelihood of overcoming slippage as compared to either of the parts of the corrective action on their own.

In some embodiments, the extending device 2520 may be configured to retract the roller guide 2599a away from the rim 2518. In these and other embodiments, the computing device 2545 may monitor for ending of slippage after a corrective action has been undertaken (e.g., after forcing the roller guide 2599a towards the rim 2518 and/or reducing power to the roller guide 2599a). After detecting that slippage has ended (e.g., because the speed of the roller guide 2599a and the rim 2518 are back within normal operating speeds relative to each other), the corrective action may be ended as well. For example, ending the corrective action may include retracting the extending device 2520 such that the roller guide 2599a moves back away from the rim 2518 to an original position. In these and other embodiments, the roller guide 2599a may continue to maintain contact with the rim 2518 such that the roller guide 2599a may continue to drive the wheel assembly 2510a.

Figure 25B:
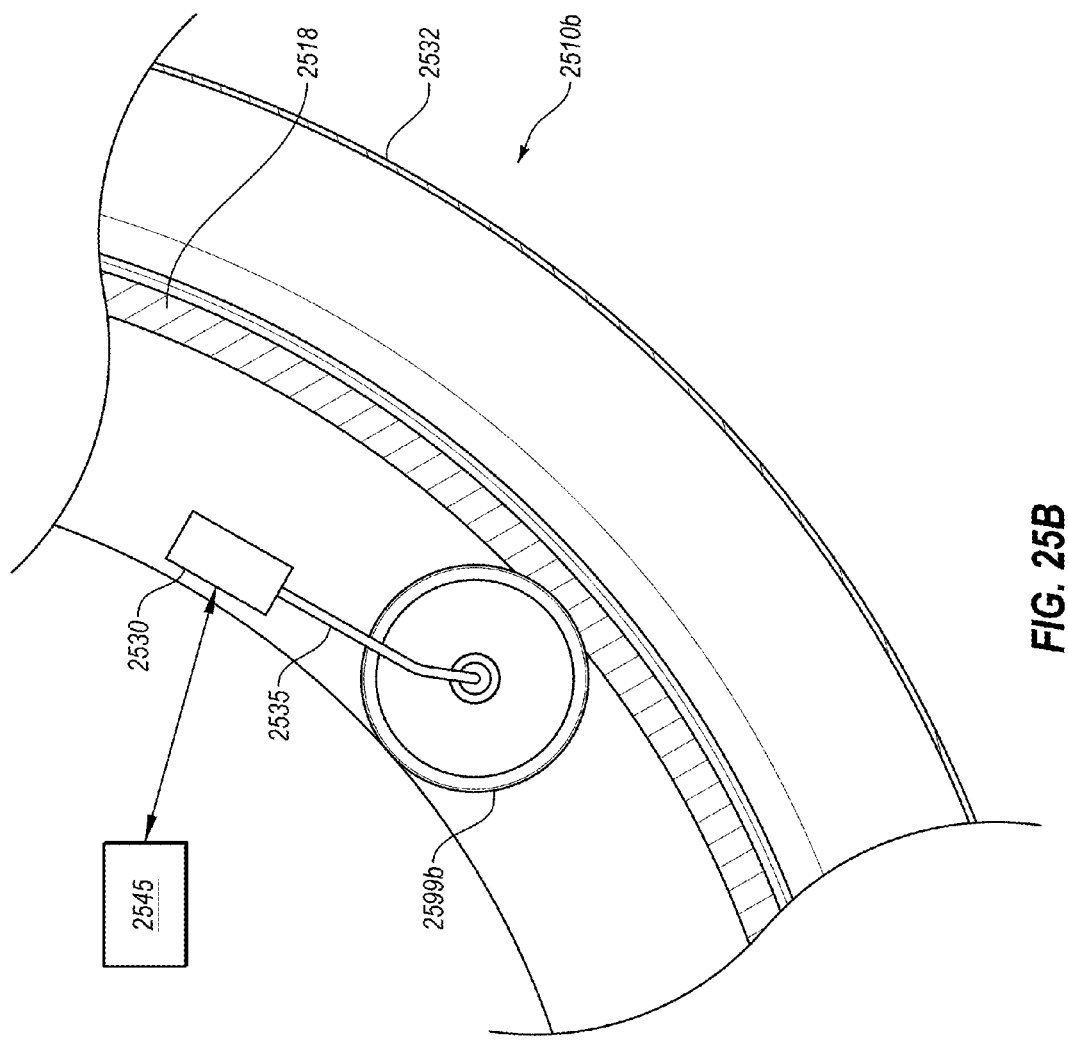
FIG. 25B illustrates another example of a centerless wheel assembly able to invoke a corrective action.

FIG. 25B illustrates another example of a centerless wheel assembly 2510b able to invoke a corrective action. The wheel assembly 2510b may include the tire 2532, the rim 2518, and the computing device 2545 that may be the same or comparable to the like-numbered components of FIG. 25A. The wheel assembly 2510b may additionally include a roller guide 2599b that may be similar or comparable to one or more roller guides of the present disclosure (e.g., the roller guide 2599a of FIG. 25A). The wheel assembly 2510b may include a pneumatic device 2530 and a hose 2535.

As described in the present disclosure, the computing device 2545 may monitor for conditions indicative of slippage. For example, the computing device 2545 may monitor the speed of the roller guide 2599b, the tire 2532, the rim 2518, another idler roller guide (not illustrated), or any other component of the wheel assembly 2510b. In these and other embodiments, the computing device 2545 may compare the speed of various components to determine whether or not slippage is occurring. For example, if the roller guide 2599b is rotating faster than a threshold speed relative to the rim 2518 (e.g., outside of a normal relationship of the two speeds), the computing device 2545 may determine that slippage is occurring. After detecting that slippage is occurring, the computing device 2545 may undertake a corrective action.

In some embodiments, the roller guide 2599b may be an inflatable device, such as a rubber/polymer-based wheel such that as a gas or liquid is added to the roller guide 2599b, the pressure within the roller guide 2599b may increase or the size of the roller guide 2599b may increase. For example, the pneumatic device 2530 may pump a gas through the hose 2535 and into the roller guide 2599b. As the roller guide 2599b increases in pressure, the slippage may be more likely to end. For example, if the roller guide 2599b is a fixed distance from the rim 2518, inflating the roller guide 2599b may expand the roller guide 2599b, forcing the roller guide 2599b against the rim 2518. In some embodiments, the pneumatic device 2530 may be in communication with the computing device 2545 and may be responsive to signals from the computing device 2545. For example, the computing device 2545 may detect that slippage is occurring and may send a signal to the pneumatic device 2530 to pump a gas or liquid into the roller guide 2599b.

In some embodiments, the wheel assembly 2510b may be configured to reduce, reverse, or stop the corrective after detecting that slippage has ended. For example, the computing device may detect that slippage has ended and may send a message to the pneumatic device 2530 to withdraw the gas or liquid through the hose 2535 from the roller guide 2599b.

FIGS. 25A and 25B illustrate two potential embodiments for increasing static friction between a roller guide 2599 and the rim 2518 in an effort to overcome slippage. However, the present disclosure contemplates any number of alternative approaches to increase the static friction between the roller guide 2599 and the rim 2518 to overcome slippage. Such approaches may include combinations of one or more of the embodiments of the present disclosure.

In some embodiments, a combination of the embodiments of FIGS. 25A and 25B may be included in a wheel assembly. For example, the extending device 2520 may be coupled to the roller guide 2599b that may be inflatable. If the computing device 2545 detects slippage is occurring, the pneumatic device 2530 may withdraw gas or liquid from the roller guide 2599b while the extending device 2520 forces the roller guide 2599b towards the rim 2518. Such a combination may cause the roller guide 2599b to be more deformable and forced against the rim 2518, effectively increasing the surface area contact between the roller guide 2599b and the rim 2518. In these and other embodiments, such a combination may be further combined with reducing power or speed of the roller guide 2599b. For example, the computing device 2545 may simultaneously and in a coordinated manner send a first message to the pneumatic device 2530 to decrease the amount of gas or liquid in the roller guide 2599b, send a second message to the extending device 2520 to force the roller guide 2599b towards the rim, and send a third message to a motor driving the roller guide 2599b (not illustrated) to reduce the speed and/or power applied to the roller guide 2599b. After the computing device 2545 detects that slippage has ended, the computing device 2545 may send a fourth message to the pneumatic device 2530 to increase the amount of gar or liquid in the roller guide 2599b to an original amount, a fifth message to the extending device 2520 to retract the roller guide 2599b back away from the rim 2518 to an original position, and a sixth message to the motor to increase the speed and/or power applied to the roller guide 2599b back to an original amount.

Modifications, additions, or omissions may be made to FIGS. 25A and 25B without departing from the scope of the present disclosure. For example, the wheel assemblies 2510a and/or 2510b may include more or fewer elements than those illustrated and described in the present disclosure. For example, any combination of features or elements of any of the embodiments of the present disclosure may be included in the wheel assemblies 2510a and/or 2510b.

Figure 26:
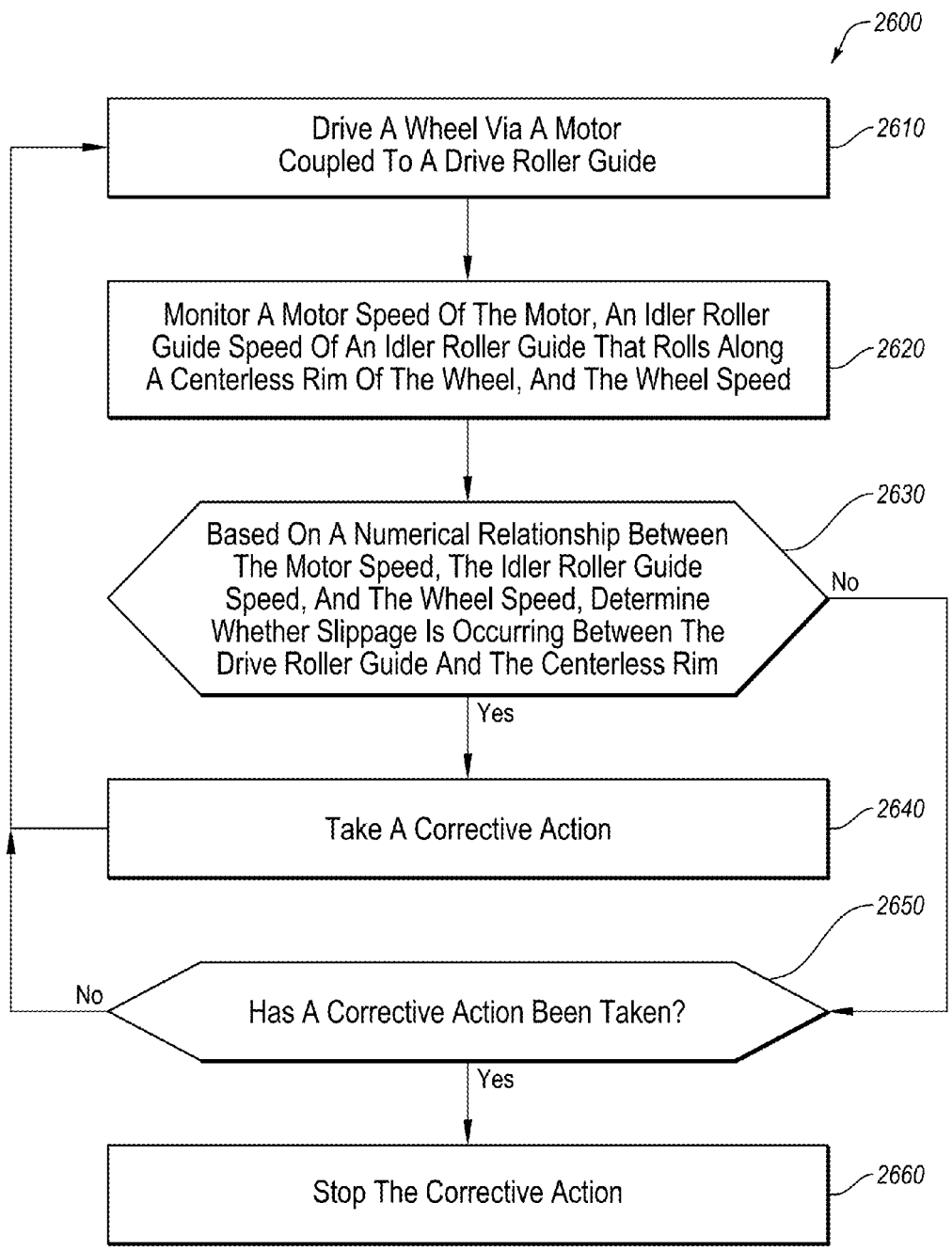
FIG. 26 illustrates a flow chart of an example method of addressing slippage.

FIG. 26 illustrates a flow chart of an example method 2600 of addressing slippage, in accordance with one or more embodiments of the present disclosure. The method 700 may be performed by any suitable system, apparatus, or device. For example, the wheel assembly 710, the computing device 745 of FIG. 7, the wheel assemblies 2510a, 2510b, and/or the computing device 2545 of FIGS. 25A and 25B may perform one or more of the operations associated with the method 2600. Although illustrated with discrete blocks, the steps and operations associated with one or more of the blocks of the method 2600 may be divided into additional blocks, combined into fewer blocks, or eliminated, depending on the desired implementation.

At block 2610, a wheel (e.g., the wheel assembly 710 of FIG. 7) may be driven by a drive roller guide (e.g., the drive roller guide 799) coupled to a motor (e.g., the motor 704 of FIG. 7). For example, a centerless wheel with a centerless rim may be driven by the drive roller guide coupled to the motor. In these and other embodiments, the drive roller guide may drive the centerless wheel by the motor imparting motive force to the drive roller guide, and static friction between the drive roller guide and the centerless rim causing the centerless rim to rotate as the drive roller guide rotates (e.g., the centerless rim may roll along the drive roller guide). In some embodiments a computing device (e.g., the computing device 745 of FIG. 7)

The centerless wheel may include one or more idler roller guides as well as one or more limiters. Multiple sensors to measure position, velocity, and/or acceleration may be distributed throughout the wheel assembly, for example, as illustrated and described with reference to FIG. 7. For example, the motor and/or an output gear of the motor may include a sensor, the drive roller guide may include a sensor, the rim may include a sensor, one or more of the idler roller guides may include a sensor, and/or the wheel may include a sensor.

At block 2620, a variety of parameters may be monitored, including motor speed of the motor, idler roller guide speed of the idler roller guide, and wheel speed of the wheel. For example, the computing device may receive or otherwise monitor signals from the multiple sensors throughout the wheel assembly. The computing device may monitor the speed of the various components as RPM, or as some other measure of speed.

At block 2630, a determination may be made as to whether slippage is occurring between the drive roller guide and the centerless rim based on a numerical relationship between the motor speed, the idler roller guide speed, and/or the wheel speed. For example, the computing device may have stored one or more relationships regarding speed among the various components. For example, without slippage, a certain number of RPMs of the drive roller guide would correspond to a certain number of RPMs of the centerless rim and/or the wheel. In some embodiments, such a relationship may be based on a gearing ratio of the drive roller guide and the centerless rim. In these and other embodiments, a mismatch in that relationship may indicate that slippage is occurring. For example, a threshold speed relationship may be stored by the computing device, and if the speed of the drive roller guide exceeds that threshold, the computing device may determine that slippage is occurring. If it is determined that slippage has occurred or is occurring, the method 2600 may proceed to the block 2640. If no slippage has been detected, the method 2600 may proceed to the block 2650.

While it is the relationship in speed differences between the centerless rim and the drive roller guide that may indicate slippage, any number of other components may be utilized to determine whether slippage has occurred indirectly. For example, if a drive chain or other component that avoids slippage is connecting the motor and the drive roller guide, the speed of the motor may be measured and that speed correlated to determine the speed of the drive roller. In these and other embodiments, such a relationship may be based on the gearing ratio between the motor and the drive roller guide. In some embodiments, if a belt or other connecting drive component couples the motor to the drive roller guide, slippage may be possible between the belt and the drive roller guide and so monitoring the motor speed may be less favorable than measuring the drive roller guide directly. As another example, the idler roller guide may roll along the centerless rim, even if the torque applied to the drive roller guide overcomes the static friction and causes slippage. In these and other embodiments, the speed of the idler roller guide may be monitored to determine the speed of the centerless rim. If the idler roller guide is the same size as the driver roller guide, such a relationship may be based on the gearing ratio of the drive roller guide and the wheel.

At block 2640, a corrective action may be taken. For example, the computing device may send a message to an extending device (e.g., the extending device 2520 of FIG. 25A). As another example, the computing device may send a message to a pneumatic device (e.g., the pneumatic device of FIG. 25B). As an additional example, the computing device may send a message to the motor to decrease or remove power to the drive roller guide. In some embodiments, the corrective action may include any combination of the foregoing, or any other action that may facilitate an increase in friction between the drive roller guide and the centerless rim to restore a rolling situation (e.g., to restore static friction between the drive roller guide and the centerless rim such that the drive roller guide may drive the wheel). In some embodiments, the extent of the corrective action (e.g., the amount of extension, the decrease in power, the amount of inflation) may be proportional to how far the speed of the drive roller guide exceeded the speed of the centerless rim. After taking the corrective action, the method 2600 may proceed to block 2620 to continue to monitor the various speed parameters. If the computing device determines that slippage continues to occur, the corrective action may be extended or enhanced, additional corrective actions may be taken, etc. For example, the extending device may be extended further if slippage continues to occur.

At block 2650, a determination may be made as to whether a corrective action has been taken. For example, if normal operation has occurred and no slippage was occurring at block 2630 and no corrective action has been taken at block 2640, the method 2600 may proceed to block 2620 to continue to monitor the various parameters of the wheel assembly. If a corrective action had been taken at the block 2640, and there is no longer slippage as determined at the block 2630, the method 2600 may proceed to block 2660. For example, the computing device may have a flag, a bit, or some other storage feature that may track whether a corrective action is currently being used.

At block 2660, the corrective action may be stopped. For example, the computing device may lessen, remove, or cease one or more of the corrective actions that may have been taken. For example, if an extending device had been extended at block 2640, the extending device may be retracted to an original position of normal operation at the block 2660. As another example, if the pneumatic device had inflated the roller guide at block 2640, the pneumatic device may deflate the roller guide back to an original pressure for normal operation at the block 2660. As an additional example, if the computing device had decreased or limited the power or energy provided to the motor at block 2640, the computing device may reinstate normal operating conditions to the motor at the block 2660. Any combination of the foregoing is also contemplated, as well as any other corrective action undertaken at the block 2640.

Modifications, additions, or omissions may be made to the method 2600 without departing from the scope of the present disclosure. For example, the operations of the method 2600 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," the term "containing" should be interpreted as "containing, but not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A wheel assembly comprising:
   first and second exoskeleton plates, wherein the first and second exoskeleton plates are spaced apart and have generally circular configurations;
   a first roller guide assembly, wherein the first roller guide assembly includes:
      a first plurality of bearings;
      a first roller guide coupled with the first plurality of bearings; and
      a first shaft spanning the first and second exoskeleton plates and coupled with the first roller guide such that the first shaft is an axle for the first roller guide and the first bearings facilitate rotation of the first roller guide about the first shaft;
   a second roller guide assembly, wherein the second roller guide assembly includes:
      a second plurality of bearings;
      a second roller guide coupled with the second plurality of bearings; and
      a second shaft spanning the first and second exoskeleton plates and coupled with the second roller guide such that the second shaft is an axle for the second roller guide and the second bearings facilitate rotation of the second roller guide about the second shaft;
   a tire;
   a centerless rim coupled with the tire, the centerless rim configured to have a shape that corresponds to a shape of the first roller guide and the second roller guide, wherein the first roller guide is configured to roll along the centerless rim as the centerless rim rotates;
a first limiter coupled to the first and second exoskeleton plates and spaced apart from the centerless rim by a gap that is maintained during normal operation and is closed such that the second roller guide contacts the centerless rim to prevent the first roller guide from being dislodged from the centerless rim; and
a second limiter coupled to the first and second exoskeleton plates.

2. The wheel assembly of claim 1, wherein an angle between the first roller guide assembly and the second roller guide assembly is between approximately ten degrees and one hundred and forty degrees with respect to a center of the centerless rim.

3. The wheel assembly of claim 2, wherein the angle between the first roller guide assembly and the second roller guide assembly is approximately symmetrical about a six o'clock position of the wheel assembly.

4. The wheel assembly of claim 1, wherein the first limiter comprises a third roller guide assembly coupled with an upper portion of the first and the second exoskeleton plates.

5. The wheel assembly of claim 1, wherein at least one of the first roller guide and the second roller guide is spring-loaded to be biased towards the centerless rim.

6. The wheel assembly of claim 1, wherein the first limiter is disposed on a lever arm coupled to at least one of the first and second exoskeleton plates and positioned such that the lever arm operates as a quick release mechanism.

7. The wheel assembly of claim 1, wherein the first and second exoskeleton plates are made of a single unitary body.

8. The wheel assembly of claim 1, further comprising:
an engine or motor coupled to the first shaft;
wherein the first roller guide assembly further comprises a key to lock the first roller guide to the first shaft;
wherein the one or more bearings include one-way bearings; and
wherein static friction between the first roller guide and the centerless rim causes rotation of the first roller guide to rotate the centerless rim.

9. The wheel assembly of claim 8, wherein a gear ratio between the first roller guide assembly and the centerless rim includes a ratio of between approximately 5:1 and 125:1.

10. The wheel assembly of claim 1, wherein the second roller guide assembly includes:
a second key to lock the second roller guide to the second shaft;
a first gear coupled to the first shaft; and
a second gear coupled to the second shaft and connected to the first shaft such that rotation of the first gear causes a corresponding rotation of the second gear.

11. The wheel assembly of claim 1, wherein the first and second exoskeleton plates have a void in material in a middle of the wheel assembly.

12. The wheel assembly of claim 11, further comprising a storage region within the void in material.

13. The wheel assembly of claim 1, wherein:
the first and the second exoskeleton plates include one or more pairs of corresponding slots; and
the first shaft is removably disposed within one of the one or more pairs of corresponding slots such that the first shaft may be moved to any position within the one of the one or more pairs of corresponding slots.

14. The wheel assembly of claim 13, wherein the one or more pairs of corresponding slots include one or more of arc-shaped slots, straight slots, or angled slots.

15. The wheel assembly of claim 1, wherein the centerless rim includes one or more grooves in relief on an outer surface of the centerless rim such that one or more of gravitational and centrifugal forces cause foreign material to gravitate along the one or more grooves to an edge of the centerless rim.

16. The wheel assembly of claim 1, wherein the centerless rim includes a generally concave shape and the roller guide includes a generally convex shape.

17. The wheel assembly of claim 1, wherein the centerless rim includes a generally convex shape and the roller guide includes a generally concave shape.

18. The wheel assembly of claim 1, wherein:
the centerless rim includes an output gear along a center line of the centerless rim; and
the roller guide includes an input gear that interfaces with the output gear.

19. The wheel assembly of claim 18, wherein a gear ratio between the input gear and the output gear may include between approximately 5:1 and 125:1.

20. The wheel assembly of claim 1, further comprising a third roller guide assembly coupled to the first shaft.

21. The wheel assembly of claim 20, wherein:
the first shaft is coupled to a motor or engine; and
the first roller guide assembly is locked to the shaft such that rotation of the first shaft causes the first roller guide to rotate.

22. The wheel assembly of claim 1, further comprising:
an external friction roller shaped to correspond to a shape of an outer surface of the tire and to roll along the tire as the external friction roller is rotated; and
an engine or motor coupled to the external friction roller.

23. The wheel assembly of claim 1, wherein a profile of the centerless rim includes a plurality of features for interacting with a plurality of roller guide assemblies, the plurality of roller guide assemblies including the first roller guide assembly.

24. The wheel assembly of claim 1, further comprising cladding coupled to the first and second exoskeleton plates to aerodynamically improve the wheel assembly.

25. A wheel assembly comprising:
first and second exoskeleton plates, wherein the first and second exoskeleton plates are spaced apart and have generally circular configurations;
a roller guide assembly, wherein the roller guide assembly includes:
a plurality of bearings;
a roller guide with a first profile including a first gap, the roller guide coupled with the plurality of bearings; and
a shaft spanning the first and second exoskeleton plates and coupled with the roller guide such that the shaft is an axle for the roller guide and the bearings facilitate rotation of the roller guide about the shaft;
a tire;
a centerless rim coupled with the tire, the centerless rim configured to have a shape that corresponds to a shape of the roller guide and a rim profile that corresponds to the first profile, the rim profile including a rail that corresponds to the first gap while leaving a second gap between a peak of the rail and the roller guide, wherein the roller guide is configured to roll along the centerless rim as the centerless rim rotates, and to maintain the second gap unless the centerless rim oscillates; and
an expansion bushing coupled to the first and second exoskeleton plates and configured to maintain the first and second exoskeleton plates in a target configuration such that the centerless rim and the roller guide maintain contact despite expansion or contraction of the first and second exoskeleton plates.

26. A system, comprising:

a wheel assembly comprising:
- an exoskeleton plate;
- a roller guide assembly, wherein the roller guide assembly includes:
  - a plurality of bearings;
  - a roller guide coupled with the plurality of bearings;
  - a shaft coupled to the exoskeleton plate and coupled with the roller guide such that the shaft is an axle for the roller guide and the bearings facilitate rotation of the roller guide about the shaft; and
  - a first sensor disposed on the roller guide;
- a tire;
- a centerless rim coupled with the tire, the centerless rim configured to have a shape that corresponds to a shape of the roller guide, wherein the roller guide is configured to roll along the centerless rim as the centerless rim rotate;
- a second sensor disposed on the centerless rim or the tire;

a motor; and a computing device communicatively coupled to the motor, the first sensor, and the second sensor, and configured to monitor the first sensor and the second sensor and to adjust the power delivered to the motor based on a comparison of readings of the first sensor and the second sensor.

\* \* \* \* \*